United States Patent
Mori et al.

(10) Patent No.: US 8,488,087 B2
(45) Date of Patent: Jul. 16, 2013

(54) LIQUID CRYSTAL DISPLAY DEVICE

(75) Inventors: Kenichi Mori, Nakaharu-ku (JP);
Michiaki Sakamoto, Nakaharu-ku (JP);
Ken Sumiyoshi, Nakahuru-ku (JP);
Hiroshi Nagai, Nakaharu-ku (JP);
Kenichirou Naka, Nakaharu-ku (JP);
Masayuki Jumonji, Nakaharu-ku (JP);
Hiroshi Tanabe, Nakaharu-ku (JP)

(73) Assignee: NLT Technologies, Ltd., Kanagawa (JP)

( * ) Notice: Subject to any disclaimer, the term of this patent is extended or adjusted under 35 U.S.C. 154(b) by 496 days.

(21) Appl. No.: 12/237,332

(22) Filed: Sep. 24, 2008

(65) Prior Publication Data

US 2009/0079921 A1    Mar. 26, 2009

(30) Foreign Application Priority Data

Sep. 26, 2007  (JP) ................ 2007-250060
May 9, 2008   (JP) ................ 2008-123276
May 9, 2008   (JP) ................ 2008-123277
Sep. 19, 2008 (JP) ................ 2008-241707

(51) Int. Cl.
*G02F 1/1343* (2006.01)
(52) U.S. Cl.
USPC ............... 349/114; 349/141; 349/147
(58) Field of Classification Search
USPC ......................... 349/114, 141, 147
See application file for complete search history.

(56) References Cited

U.S. PATENT DOCUMENTS

| | | | | |
|---|---|---|---|---|
| 6,030,729 A * | 2/2000 | Ito et al. | ............ | 430/5 |
| 6,576,375 B1 * | 6/2003 | Miyoshi et al. | .............. | 430/5 |
| 2002/0021393 A1 * | 2/2002 | Ochiai et al. | .................. | 349/137 |
| 2002/0140891 A1 * | 10/2002 | Tomioka et al. | ............... | 349/141 |
| 2003/0128323 A1 * | 7/2003 | Matsumoto et al. | .......... | 349/141 |
| 2005/0122452 A1 * | 6/2005 | Yoshida et al. | ............... | 349/114 |
| 2007/0002226 A1 * | 1/2007 | Sakamoto et al. | ............. | 349/114 |
| 2008/0013023 A1 * | 1/2008 | Ochiai et al. | .................. | 349/114 |

FOREIGN PATENT DOCUMENTS

| | | | |
|---|---|---|---|
| JP | 10-003092 A | | 1/1998 |
| JP | 2002311207 A | * | 10/2002 |
| JP | 3391312 B | | 1/2003 |
| JP | 2003-344837 A | | 12/2003 |
| JP | 2006-171376 A | | 6/2006 |
| JP | 2007-41572 A | | 2/2007 |
| JP | 2007-156019 A | | 6/2007 |
| JP | 2007-240752 A | | 9/2007 |
| JP | 4035992 B | | 11/2007 |
| WO | 97/06463 A | | 2/1997 |

OTHER PUBLICATIONS

Japanese Office Action issued Jan. 15, 2013 in corresponding Japanese Patent Application No. 2008-241707.

* cited by examiner

*Primary Examiner* — Jessica M Merlin
(74) *Attorney, Agent, or Firm* — Sughrue Mion, PLLC

(57) ABSTRACT

To suppress light leakage at the time of dark state, and to provide a liquid crystal display device whose electrodes in the reflection areas can be formed with high precision. The liquid crystal display device has a reflection area within a pixel unit by corresponding at least to a reflection plate forming part, and the reflection area is driven with a lateral electric field mode and normally-white. A driving electrode for forming an electric field to a liquid crystal layer of the reflection area is formed on the reflection plate via an insulating film by using a non-transparent electric conductor.

15 Claims, 56 Drawing Sheets

FIG. 5A   FIG. 5B   FIG. 5C
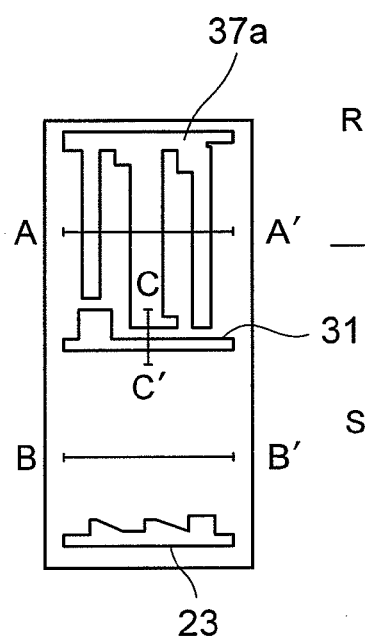
REFLECTION AREA 1   TRANSMISSION AREA 2
FIG. 5D
STEP PART BETWEEN REFLECTION AREA
AND TRANSMISSION AREA
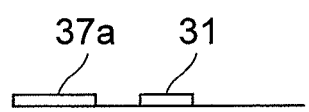

FIG. 6A
FIG. 6B
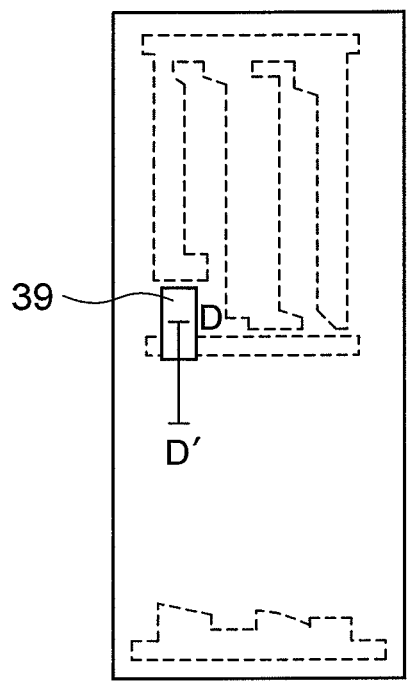
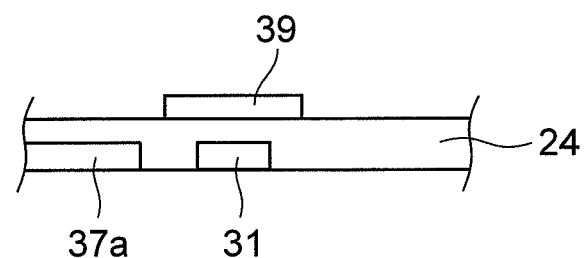

FIG. 7A  FIG. 7B  FIG. 7C
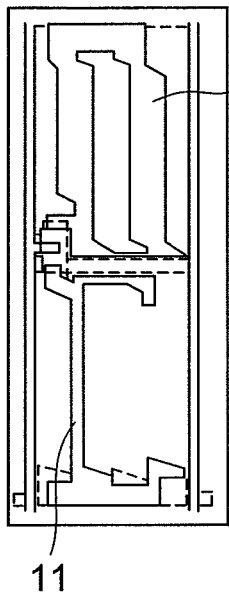
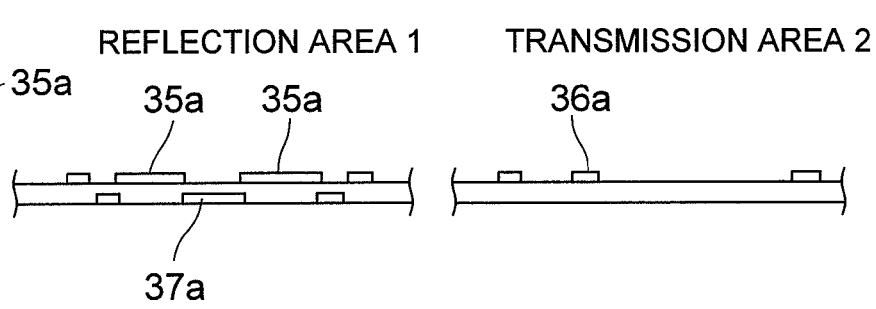
FIG. 7D
STEP PART BETWEEN REFLECTION AREA
AND TRANSMISSION AREA
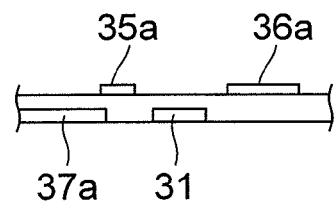

FIG. 8A
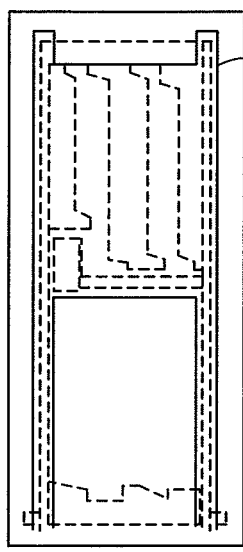
FIG. 8B
REFLECTION AREA 1
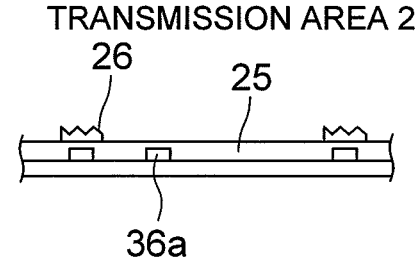
35a 37a
FIG. 8C
TRANSMISSION AREA 2
36a
FIG. 8D
STEP PART BETWEEN REFLECTION AREA
AND TRANSMISSION AREA
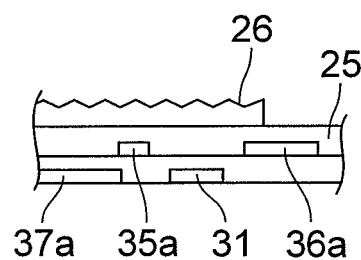
37a 35a 31 36a

FIG. 9A  FIG. 9B  FIG. 9C
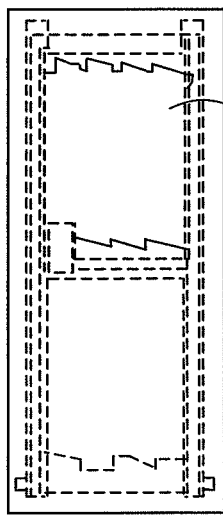
REFLECTION AREA 1     TRANSMISSION AREA 2
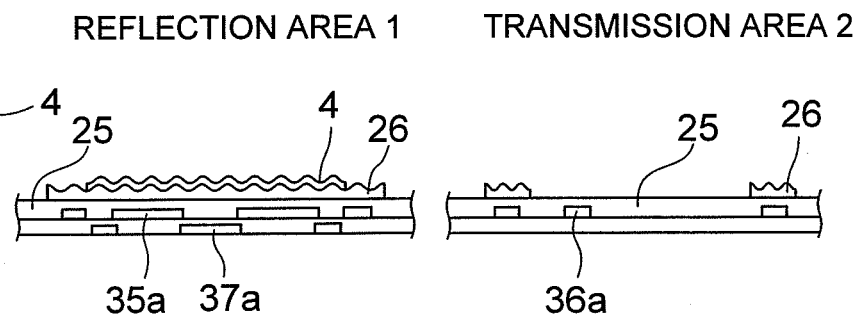
FIG. 9D
STEP PART BETWEEN REFLECTION AREA AND TRANSMISSION AREA
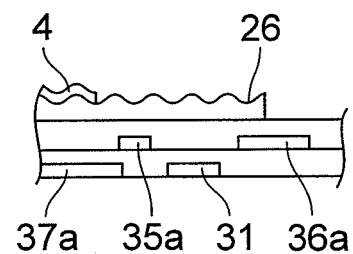

REFLECTION AREA 1   TRANSMISSION AREA 2

STEP PART BETWEEN REFLECTION
AREA AND TRANSMISSION AREA

FIG. 12A    FIG. 12B    FIG. 12C
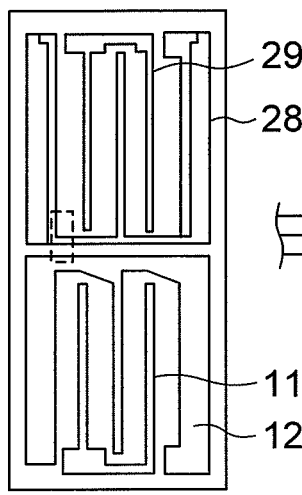
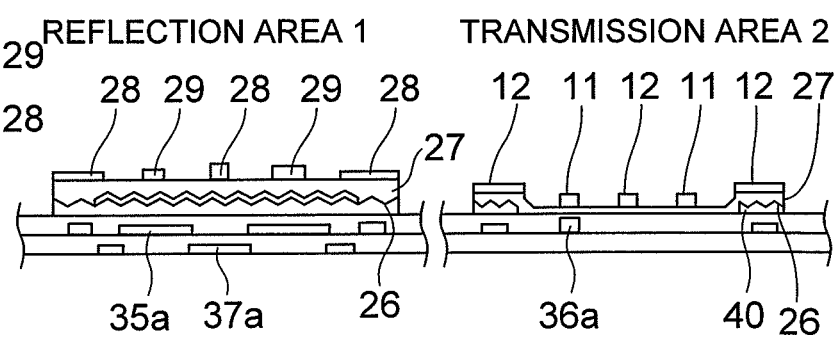
FIG. 12D
STEP PART BETWEEN REFLECTION AREA AND TRANSMISSION AREA
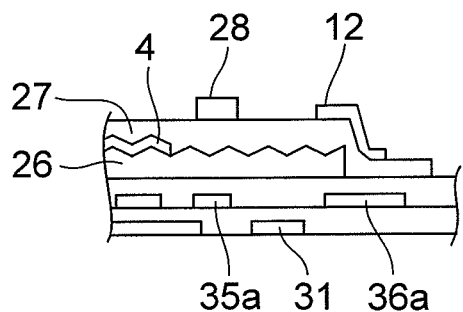

FIG. 16

|  | REFLECTANCE AT BRIGHT STATE (%) | REFLECTANCE AT DARK STATE (%) |
|---|---|---|
| ITO PANEL | 36.4 | 6.6 |
| Mo PANEL | 34.7 | 4.6 |

FIG. 48

550nm      ※ VALUES OF MATERIALS ARE MEAN VALUES

| MATERIALS | NON-TRANSPARENT ELECTRIC CONDUCTOR | | ANTIREFLECTION LAYER | |
|---|---|---|---|---|
| | REFRACTIVE INDEX n | EXTINCTION COEFFICIENT k | REFRACTIVE INDEX n | EXTINCTION COEFFICIENT k |
| ITO | | | 1.9 | 0.01 |
| Ni OXIDE | | | 2.2 | 0.0 |
| Cr OXIDE | | | 1.9 | 3.0 |
| ZnO | | | 1.7 | 0.01 |
| Mo | 2.7 | 3.3 | | |
| Cr | 2.5 | 2.3 | | |
| Ni | 1.9 | 3.3 | | |
| Ti | 2.3 | 3.2 | | |
| RANGES | 1.0~4.0 | 0.25~5.5 | 1.5~3.0 | 0~3.5 |
| PREFERABLE RAGES | 1.3~2.5 | 1.6~3.3 | 2.0~3.0 | 0.01~2.0 |
| MINIMUM VALUES | 0.7 | 1.6 | 1.9 | 0.0 |
| MAXIMUM VALUES | 3.6 | 4.7 | 2.2 | 3.0 |

LIQUID CRYSTAL DISPLAY DEVICE

CROSS-REFERENCE TO RELATED APPLICATIONS

This application is based upon and claims the benefit of priority from Japanese patent application No. 2007-250060, filed on Sep. 26, 2007, Japanese patent application No. 2008-123276, filed on May 9, 2008, Japanese patent application No. 2008-123277, filed on May 9, 2008, and Japanese patent application No. 2008-241707, filed on Sep. 19, 2008 the disclosure of which is incorporated herein in its entirety by reference.

BACKGROUND OF THE INVENTION

1. Field of the Invention

The present invention relates to a transflective liquid crystal display device in which each pixel has a light-reflective type reflection area and light-transmissive type transmission area, and to a reflective liquid crystal display device in which each pixel only has a reflection area. Moreover, the present invention relates to terminal devices that are provided with the transflective liquid crystal display device and the reflective liquid crystal display device.

2. Description of the Related Art

As a liquid crystal display device having both a function of a transmissive liquid crystal display device and a function of a reflective liquid crystal display device, there is known a transflective liquid crystal display device (for example, Japanese Unexamined Patent Publication 2003-344837 (Patent Document 1)). This kind of semi-transmissive liquid crystal display device has a transmission area and a reflection area within each pixel. The transmission area transmits light from a backlight source, and uses the backlight source as a light source for display. The reflection area has a reflection plate, and uses light from the outside reflected by the reflection plate as a light source for display.

With the transflective liquid crystal display device, it is possible under bright surroundings to display an image similar to a print by turning on/off the light that reaches the reflection plate from the surroundings. At the same time, it is possible to reduce the power consumption by turning off the backlight source and display an image in the reflection area. Further, it is also possible to display an image in the dark surroundings by turning on the backlight source and displaying an image in the transmission area.

As display modes of liquid crystal display devices, there are lateral electric field modes such as IPS (In Plane Switching) mode and FFS (Field Fringe Switching) mode. A lateral electric field mode liquid crystal display device has a pixel electrode and a common electrode formed on a same substrate, and applies a lateral electric field to a liquid crystal layer. The lateral electric field mode liquid crystal display device can achieve a wider viewing angle compared to a TN (Twisted Nematic) mode liquid crystal display device, by displaying an image through rotating liquid crystal molecules in a direction in parallel to the substrate.

There is disclosed an example of a transflective lateral electric field mode liquid crystal display device which performs normally-black drive by setting retardation of a liquid crystal layer of a reflection area as ¼ wavelength, and setting retardation of a liquid crystal layer in a transmission area as ½ wavelength, and providing a ½ wavelength phase difference layer between a polarizing plate of the reflection area and the liquid crystal layer (For example, Japanese Unexamined Patent Publication 2006-171376 (Patent Document 2)). Further, there is also a transflective liquid crystal display device which performs display by inverting the drive between the reflection area and the transmission area without providing the ½ wavelength phase difference layer (for example, Japanese Unexamined Patent Publication 2007-41572 (Patent Document 3)).

In Patent Document 3, the reflection area and the transmission area of each pixel are provided, respectively, with a common electrode and a switching device for connecting a pixel electrode and a data line to which a data signal is supplied. The reflection area and the transmission area of each pixel are driven with substantially inverted on-off inversion signals, and the liquid crystal molecules are controlled to drive in different directions for the transmission area and the reflection area. The reflection area is normally-white, and the transmission area is normally-black. Thus, it is possible to make displays of both areas to be in bright states by not applying a voltage to the liquid crystal layer in the reflection area and applying a voltage to the liquid crystal layer in the transmission area.

FIG. 53 shows a sectional view of a unit pixel of a transflective liquid crystal display device, which drives the liquid crystal of the reflection area in a lateral electric field mode and the liquid crystal of the transmission area in the lateral electric field mode.

A reflection plate 4 is formed on a lower substrate 3 side of a reflection area 1, and an insulating film 5 is deposited on the reflection plate 4. A reflection common electrode 6 for forming an electric field in the reflection area 1, and a reflection pixel electrode 7 are formed on the insulating film 5. A liquid crystal layer 9 is provided between the lower substrate 3 and a counter substrate 8, and liquid crystal molecules are aligned homogeneously in a direction in parallel to a transmission axis of a polarizing plate 10 on the counter substrate 8 side. Further, retardation of the liquid crystal layer 9 in the reflection area 1 is set as ¼ wavelength, and retardation of the liquid crystal layer 9 in the transmission area 2 is set as ½ wavelength. Furthermore, a transmission pixel electrode 11 and a transmission common electrode 12 are formed on the insulating film 5 in the transmission area 2. Reference numeral 13 is a glass substrate included in the counter substrate 8, and 14 is a glass substrate included in the lower substrate 3.

FIG. 54 shows changes in the polarization state of the reflection area. When there is no electric field generated in the liquid crystal layer 9 of the reflection area 1, display on the reflection area 1 turns out as bright state. Light passing through the polarizing plate 10 becomes linearly polarized light of vertical direction (90 degrees), and the optical axis thereof is in parallel to the alignment direction of the liquid crystal, i.e., in parallel to the major axes of the liquid crystal molecules. Thus, the linearly polarized light passing through the polarizing plate 10 passes through the liquid crystal layer 9 and reaches the reflection plate 4 while keeping the polarized state. In a case of the linearly polarized light, the polarized state does not change even if it is reflected by the reflection plate 4. Thus, the reflected light is also in parallel to the major axes of the liquid crystal molecules. Therefore, even if the reflected light passes through the liquid crystal layer 9 again, it reaches the polarizing plate 10 while keeping the polarized state. Since the optical axis of the reflected light is in parallel to the transmission axis of the polarizing plate 10, the reflected light passes through the polarizing plate 10, thereby providing bright state. In the meantime, where there is an electric field generated in the liquid crystal layer 9 of the reflection area 1, display on the reflection area 1 turns out as dark state. The liquid crystal molecules are rotated within the substrate plane by the electric field, and the angle between the major axes of the liquid crystal molecules and the transmission axis of the polarizing plate 10 becomes 45 degrees. Therefore, the angle between the optical axis of the linearly polarized light passed through the polarizing plate 10 and the major axes of the liquid crystal molecules becomes 45 degrees. Since the retardation of the liquid crystal layer 9 is ¼ wavelength, the linearly polarized light is changed to clockwise circularly polarized light. This clockwise circularly polarized light is changed to counterclockwise circularly polarized light, when reflected by the reflection plate 4. When the counterclockwise circularly polarized light passes the liquid crystal layer 9 again, it is changed to linearly polarized light of lateral direction (0 degree). Since the optical axis of the reflected light is vertical to the transmission axis of the polarizing plate 10, the reflected light cannot pass through the polarizing plate 10, thereby providing dark state.

FIG. 55 shows a result of a simulation conducted regarding alignment of the liquid crystal molecules and the reflectance at the time of dark state, when a voltage is applied to the reflection common electrode 6 and the reflection pixel electrode 7. The lateral electric field that is in parallel to the substrate plane is not applied to the liquid crystal molecules on the reflection common electrode 6 or the reflection pixel electrode 7, so that rotation of the liquid crystal molecules within the substrate plane is insufficient. Thus, even when the light passed through the polarizing plate 10 passes the liquid crystal layer 9, it does not change to a circularly polarized state. That is, the light that passes through the liquid crystal layer 9 on the electrodes 6, 7, makes incident on the reflection plate 4, reflected by the reflection plate 4, and passes the liquid crystal layer 9 on the electrodes 6, 7 comes to be in a polarized state as if it is under no supplied voltage, even though a voltage is being supplied. Thus, the reflected light transmits the upper-side polarizing plate as in the case of bright state. When the electrodes 6, 7 are formed with a transparent electric conductor such as ITO (Indium Tin Oxide), light leaks from the areas on the electrodes 6, 7 even if a voltage is applied to the electrodes 6, 7 to provide dark state. Therefore, the visibility of the reflection display becomes deteriorated.

Further, when the reflection pixel electrode and the reflection common electrode on an uneven reflection plate are formed with the transparent electric conductor, those electrodes cannot be formed with high precision. Photolithography is used for patterning the reflection pixel electrode and the reflection common electrode. The reflection common electrode and the reflection pixel electrode are formed on the reflection plate via an insulating film.

As shown in FIG. 56, the surface of the reflection plate 4 is formed to have uneven shapes by an uneven film 15 so that the reflection plate 4 diffusively reflects the incident light. Thus, when a transparent electric conductor 16 is used as a material for the reflection common electrode 6 and the reflection pixel electrode 7, when resist 17 is exposed through photolithography by using a mask 18 and exposure light 19, the exposure light 19 transmitting through the transparent electric conductor 16 is diffusively reflected by the reflection plate 4. As a result, the resist 17 at an area that is not intended to be exposed becomes exposed as well. Therefore, the shapes of the reflection common electrode 6 and the reflection pixel electrode 7 which are patterned after being developed and etched become unstable. Thus, especially reduction in the electrode widths causes snapping of the wirings of the electrodes.

SUMMARY OF THE INVENTION

An exemplary object of the present invention is to suppress light leakage at the time of dark state, and to provide a liquid crystal display device in which the electrodes of the reflection area can be formed with high precision.

In order to achieve the foregoing exemplary object, a liquid crystal display device according to an exemplary aspect of the invention includes a reflection area within a pixel unit by corresponding at least to a reflection plate forming part, wherein: the reflection area is driven with a lateral electric field mode and normally-white; and a driving electrode for forming an electric field to a liquid crystal layer of the reflection area is formed on the reflection plate via an insulating film by using a non-transparent electric conductor.

BRIEF DESCRIPTION OF THE DRAWINGS

FIGS. 5A-5D show illustrations showing a process of creating a lower substrate in the unit pixel that forms the liquid crystal panel of the liquid crystal display device shown in FIG. 1, in which FIG. 5A is a plan view, FIG. 5B is a sectional view taken along a line A-A' of a reflection area shown in FIG. 5A, FIG. 5C is a sectional view taken along a line B-B' of a transmission area shown in FIG. 5A, and FIG. 5D is a sectional view taken along a line C-C' of a step part formed between the reflection area and the transmission area of FIG. 5A;

FIG. 6A and FIG. 6B show illustrations showing a process of creating the lower substrate in the unit pixel that forms the liquid crystal panel of the liquid crystal display device shown in FIG. 1, in which FIG. 6A is a plan view, and FIG. 6B is a sectional view taken along a line D-D' shown in FIG. 6A;

FIGS. 7A-7D show illustrations showing a process of creating the lower substrate in the unit pixel that forms the liquid crystal panel of the liquid crystal display device shown in FIG. 1, in which FIG. 7A is a plan view, FIG. 7B is a sectional view of the reflection area shown in FIG. 7A, FIG. 7C is a sectional view of the transmission area shown in FIG. 7A, and FIG. 7D is a sectional view of a step part formed between the reflection area and the transmission area of FIG. 7A;

FIGS. 8A-8D show illustrations showing a process of creating the lower substrate in the unit pixel that forms the liquid crystal panel of the liquid crystal display device shown in FIG. 1, in which FIG. 8A is a plan view, FIG. 8B is a sectional view of the reflection area shown in FIG. 8A, FIG. 8C is a sectional view of the transmission area shown in FIG. 8A, and FIG. 8D is a sectional view of a step part formed between the reflection area and the transmission area of FIG. 8A;

FIGS. 9A-9D show illustrations showing a process of creating the lower substrate in the unit pixel that forms the liquid crystal panel of the liquid crystal display device shown in FIG. 1, in which FIG. 9A is a plan view, FIG. 9B is a sectional view of the reflection area shown in FIG. 9A, FIG. 9C is a sectional view of the transmission area shown in FIG. 9A, and FIG. 9D is a sectional view of a step part formed between the reflection area and the transmission area of FIG. 9A;

FIGS. 10A-10D show illustrations showing a process of creating the lower substrate in the unit pixel that forms the liquid crystal panel of the liquid crystal display device shown in FIG. 1, in which FIG. 10A is a plan view, FIG. 10B is a sectional view of the reflection area shown in FIG. 10A, FIG. 10C is a sectional view of the transmission area shown in FIG. 10A, and FIG. 10D is a sectional view of a step part formed between the reflection area and the transmission area of FIG. 10A;

FIG. 11A and FIG. 11B show illustrations showing a process of creating the lower substrate in the unit pixel that forms the liquid crystal panel of the liquid crystal display device shown in FIG. 1, in which FIG. 11A is a plan view, and FIG. 11B is a sectional view taken along a line E-E' shown in FIG. 11A;

FIGS. 12A-12D show illustrations showing a process of creating the lower substrate in the unit pixel that forms the liquid crystal panel of the liquid crystal display device shown in FIG. 1, in which FIG. 12A is a plan view, FIG. 12B is a sectional view of the reflection area shown in FIG. 12A, FIG. 12C is a sectional view of the transmission area shown in FIG. 12A, and FIG. 12D is a sectional view of a step part formed between the reflection area and the transmission area of FIG. 12A;

FIG. 16 is a table showing the reflectance of the ITO panel and the Mo panel at the time of bright state and dark state;

FIG. 48 is a chart showing optical constants for measuring the reflectance;

DETAILED DESCRIPTION OF THE EXEMPLARY EMBODIMENTS (Explanations of Structures)

Hereinafter, exemplary embodiments of the invention will be described in detail by referring to the accompanying drawings.

Figure 1:
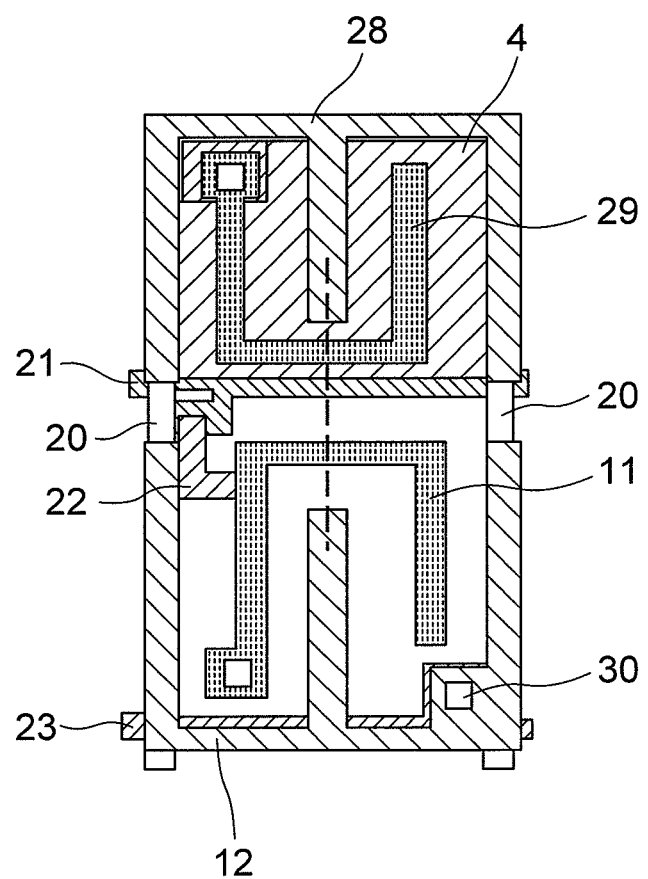
FIG. 1 is a plan view showing a unit pixel that forms a liquid crystal panel of a liquid crystal display device according to an exemplary embodiment 1 of the invention.
Figure 2:
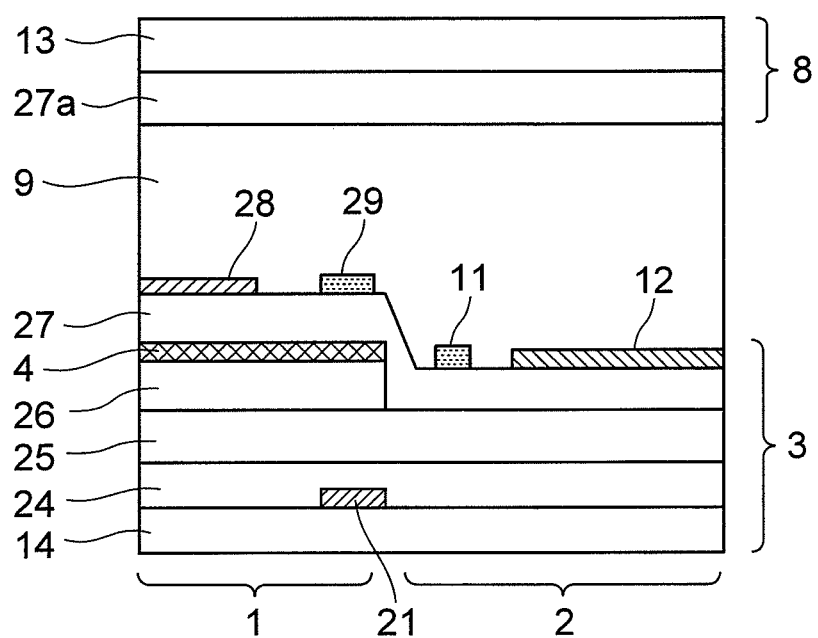
FIG. 2 is a sectional view taken along a dotted line of the unit pixel shown in FIG. 1.

As shown in FIG. 1 and FIG. 2, as a basic structure, a liquid crystal display device according to the exemplary embodiments of the invention has following features. That is, the liquid crystal display device has a reflection area 1 in a unit pixel that forms a liquid crystal panel. The reflection area 1 is driven with a lateral electric field mode and normally-white. Driving electrodes (reflection common electrode 28 and reflection pixel electrode 29) which form an electric field on a liquid crystal layer of the reflection area 1 are provided on a reflection plate 4 via an insulating film (flattening film 27), and the driving electrodes are formed with a non-transparent electric conductor.

Figure 3:
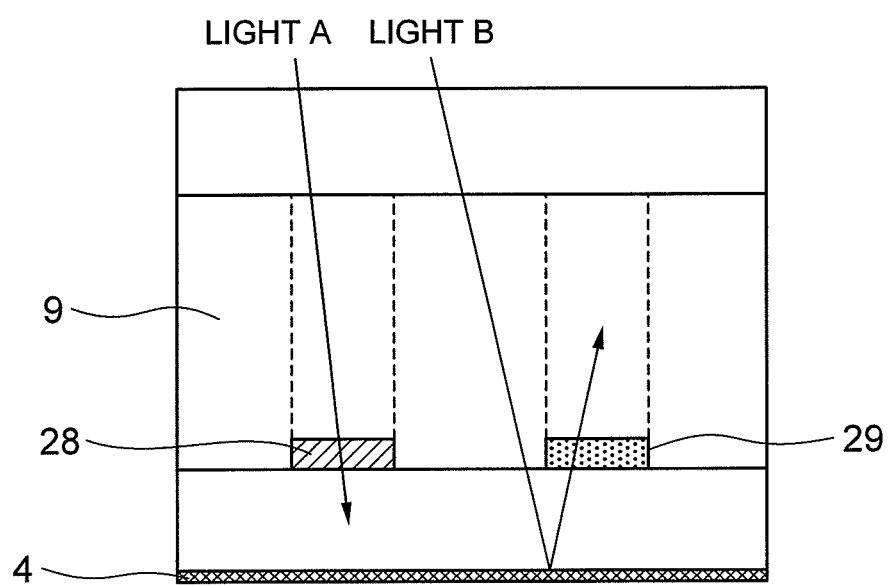
FIG. 3 is an illustration showing paths of light making incident on a reflection area of the unit pixel that forms a liquid crystal panel of a transflective liquid crystal display device according to the present invention.

In the exemplary embodiments of the invention, the reflection pixel electrode 29 or the reflection common electrode 28 as the driving electrode are formed with the non-transparent electric conductor. Thus, as shown in FIG. 3, it is possible to prevent light A passed through the liquid crystal layer 9 on the reflection common electrode 28 or the reflection pixel electrode 29 at the time of dark state from reaching the reflection plate 4. That is, there is no light that passes through the liquid crystal layer 9 on the electrodes 28, 29, makes incident on the refection plate 4 and reflected thereby, and passes through the liquid crystal layer 9. Thus, it is possible to prevent light leakage at the time of dark state.

Among the light rays making incident on the reflection plate 4 and reflected thereby, there is light B that passes through the liquid crystal layer 9 between the electrodes 28 and 29, reaches the reflection plate 4 and reflected thereby, and passes through the liquid crystal layer 9 on the electrodes 28, 29 as shown in FIG. 3. This light does not change to a polarized state to provide dark state in a process of making incident and being reflected, so that this light may be a cause for generating light leakage. However, this light can also be suppressed, since the electrodes 28 and 29 are non-transparent.

Further, the electrodes 28 and 29 are formed with a non-transparent material, so that exposure light does not reach the reflection plate 4 when performing exposure on the resist by photolithography in a patterning step of the electrodes. Therefore, the resist exposure can be performed according to the shape of the electrodes. This makes it possible to perform patterning of the electrodes with high precision.

Next, the liquid crystal display device according to the exemplary embodiments of the invention will be described in more details by referring to concrete examples.

Exemplary Embodiment 1

FIG. 1 is a plan view showing a unit pixel that forms a liquid crystal panel of a liquid crystal display device according to an exemplary embodiment 1 of the invention, and FIG. 2 is a sectional view taken along a dotted line of the unit pixel shown in FIG. 1.

As shown in FIG. 1 and FIG. 2, the unit pixel that forms the liquid crystal panel of the liquid crystal display device according to the exemplary embodiment 1 of the invention has the reflection area 1 and the transmission area 2, and the corresponding ranges are being sectioned by data lines 20 and scanning lines 21 that are provided in matrix on the whole surface of the liquid crystal panel.

First, the lower substrate 3 will be described. The lower substrate 3 is formed with laminated parts each having various functions mainly for driving displaying members. On an insulating film deposited on a glass substrate 14, provided are the scanning lines 21 to which scanning signals are inputted, the data lines 20 to which data signals are inputted, a transmission common electrode 1 to which a reference potential of the transmission area 2 is inputted, the reflection common electrode 28 to which a reference potential of the reflection area 1 is inputted, the reflection pixel electrode 29 or the transmission pixel electrode 11 for applying a prescribed electric field to the liquid crystal layer 9, switching devices formed corresponding to the respective unit pixels, etc. Further, there is an alignment film, not shown, provided on the liquid crystal layer 9 side.

The switching device has a gate electrode, a drain electrode, a source electrode, and an amorphous silicon layer, and it is provided in the vicinity of each intersection point between the scanning lines 21 and the data lines 20. The gate electrode of the switching device is connected electrically to the scanning line 21, the drain electrode to the data line 20, and the source electrode 22 to the pixels electrodes 11 and 29.

Reflection common wiring and transmission common wiring 23 as well as the scanning line 21 are formed, respectively, on the glass substrate 14, and an insulating film 24 is formed thereon. The data line 20, the drain electrode, the source electrode, the amorphous silicon layer of the switching device are formed on the insulating film 24, and an insulating film 25 is deposited thereon. An uneven film 26 having uneven shapes on the surface of the part corresponding to the reflection area 1 is provided on the insulating film 25, and the reflection plate 4 is formed thereon further. The reflection plate 4 is formed on the uneven film 26, so that the surface thereof comes to have the uneven shapes, thereby diffusively reflecting the light that makes incident on the liquid crystal panel. Further, the flattening film 27 is formed on the reflection plate 4. Furthermore, the flattening film 27 may be formed by including the transmission area 2.

Figure 4:
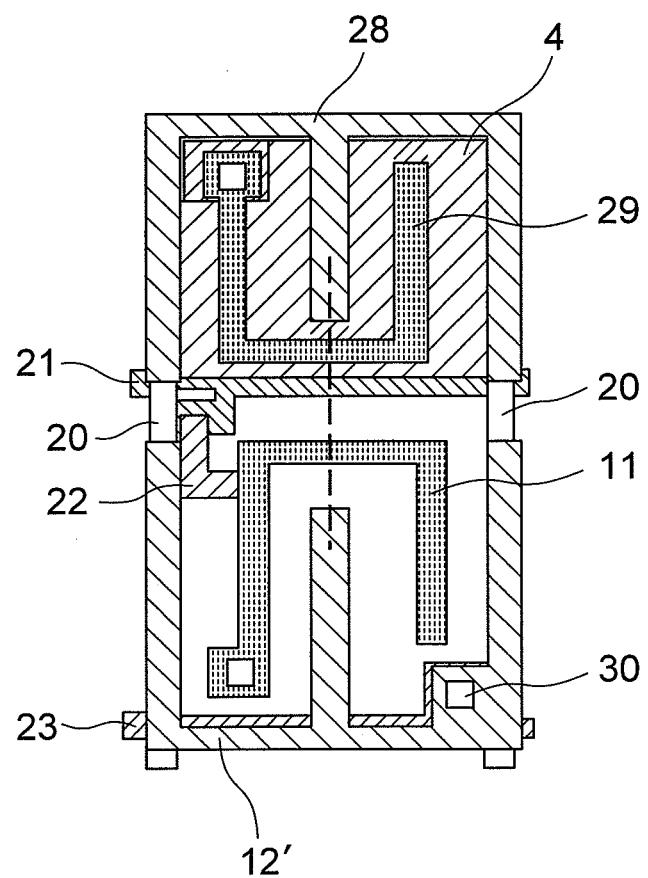
FIG. 4 is a plan view showing a modification example of the unit pixel that forms the liquid crystal panel of the liquid crystal display device shown in FIG. 1.

The uneven film 26 and the flattening film 27 have a function of adjusting the liquid crystal layer thickness for changing the thickness of the liquid crystal layer 9 in the transmission area 2 and the reflection area 1, and the thickness of those films are adjusted so that the thickness of the liquid crystal layer 9 in each of the areas 1 and 2 can be in prescribed values. The reflection common electrode 28 and the reflection pixel electrode 29 are formed on the flattening film 27 of the reflection area 1 with a non-transparent electric conductive material such as Cr, Mo, or Ni. In the meantime, the transmission pixel electrode 11 and the transmission common electrode 12 are formed on the flattening film 27 of the transmission area 2 with a transparent electric conductive material such as ITO. As shown in FIG. 4, a transmission common electrode 12' may be formed with a non-transparent electric conductor as that of the electrodes 28 and 29 of the reflection area 1.

As shown in FIG. 1, the reflection common electrode 28, the reflection pixel electrode 29, the transmission common electrode 12, and the transmission pixel electrode 11 in the reflection area 1 and the transmission area 2 are formed to face with each other in parallel, and the liquid crystal in the reflection area 1 or the transmission area 2 is driven with a lateral electric field mode by the electric field generated between the reflection common electrode 28 and the reflection pixel electrode 29 and between the transmission common electrode 12 and the transmission pixel electrode 11. Note here that the reflection common electrode 28 and the transmission common electrode 11 are electrically connected to the reflection common wiring or the transmission common wiring 23 formed on the glass substrate 14, and the reflection pixel electrode 29 and the transmission pixel electrode 11 are electrically connected to the source electrode 22 formed on the insulating film 24. The reflection common electrode 28 receives supply of reflection common signals from the reflection common wiring. However, it is also possible to supply the reflection common signals to the reflection common electrode directly without forming the reflection common wiring. In that case, it is unnecessary to form a junction part 30 to the reflection common electrode 28.

The reflection common electrode 28 and the reflection pixel electrode 29 of the reflection area 1 are patterned by photolithography. A non-transparent electric conductive material is sputtered on the flattening film 27, masking resist is applied, exposure/development is performed via a prescribed mask, an unnecessary part of the film is eliminated through dipping those in an etching solution suited for the material, and the resist is exfoliated to form prescribed electrodes. This method is used also for forming other wirings and electrodes.

Further, a manufacturing process of the lower substrate will be described in detail by referring to FIGS. 5A-5D to FIGS. 12A-12D. "A" in the drawings means a plan view, and others are sectional views of each part.

First, a gate line 31, a reflection common wiring 37a, and the transmission common wiring 23 are formed on the glass substrate 14 in a pattern shown in FIG. 5A. Cross sections of the reflection area 1, the transmission area 2, and the boundary part (step part) between the reflection area 1 and the transmission area 2 at this stage are as in FIG. 5B-FIG. 5D, respectively. In the reflection area 1, the reflection common wiring 37a is formed to project towards the display area so as to supply an electric potential to the reflection plate 4. Thereafter, the gate line 31, the reflection common wiring 37a, and the transmission common wiring 23 are covered by the insulating layer 24 (see FIG. 6B).

Then, as shown in FIG. 6A, a semiconductor layer 39 for forming the switching devices is formed. When forming the semiconductor layer 39, it is formed to overlap with the gate line 31 (gate electrode 31), as in FIG. 6B. Thereafter, a reflection pixel electrode wiring 35a and a transmission pixel electrode wiring 36a connected to the source electrode of the switching device are formed in a pattern shown in FIG. 7A. Cross sections of the reflection area 1, the transmission area 2, and the boundary part (step part) between the reflection area 1 and the transmission area 2 are as in FIG. 7B-FIG. 7D, respectively. In the reflection area 1, the reflection common wiring 37a is formed between the neighboring pixel electrode wirings 35a. Further, the reflection common wiring 37a is formed in such a manner that the area ratio between the pixel electrode wiring 35a and the reflection common wiring 37a becomes 1:1 in the display area. This is to supply an intermediate electric potential of the reflection pixel electrode 29 and the reflection common electrode 28 to the reflection plate 4 to be formed later, when displaying an image. After the reflection pixel electrode wiring 35a and the transmission pixel electrode wiring 36a are formed, those are covered by the insulating layer 25 (see FIG. 8B).

Subsequently, the uneven film 26 is formed as in FIG. 8A-FIG. 8D. The uneven film 26 is so formed that its section has unevenness, as in FIG. 8B-FIG. 8D. An Al layer is formed on the uneven film 26, and the reflection plate 4 is formed in the reflection area 1 in a pattern shown in FIG. 9A. Cross sections of the reflection area 1, the transmission area 2, and the boundary part (step part) between the reflection area 1 and the transmission area 2 at this stage are as in FIG. 8B-FIG. 8D, respectively.

Figures 10A, 10B, 10C:
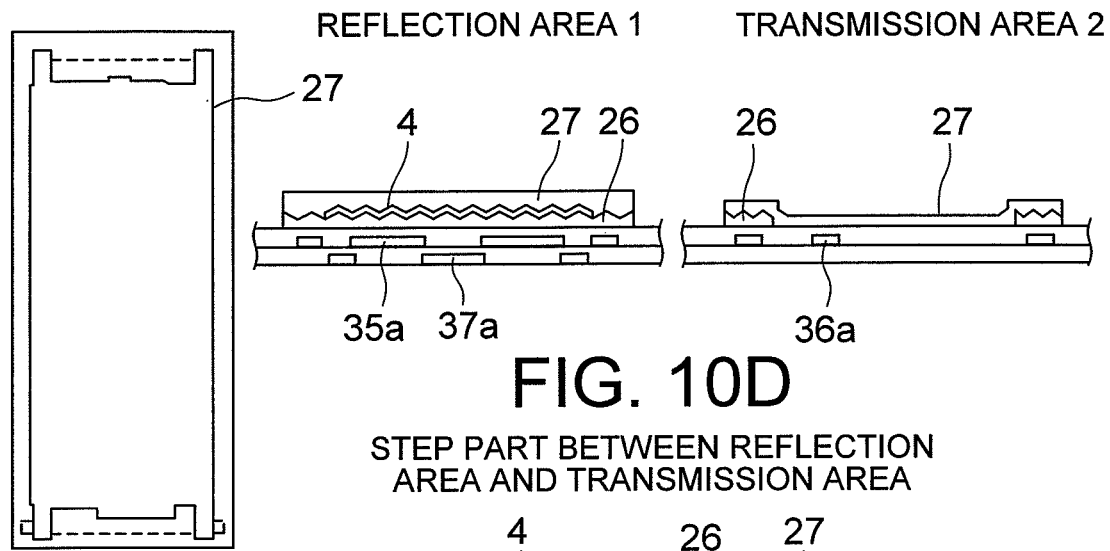
Figure 10D:
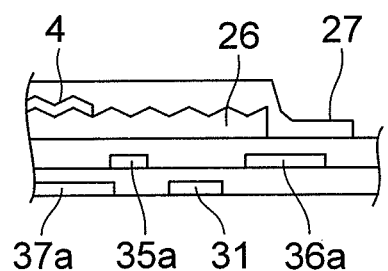

After forming the reflection plate 4, the flattening film 27 is formed in a pattern shown in FIG. 10A. By forming the flattening film 27, there is a step formed in the boundary between the reflection area 1 and the transmission area 2, as in FIG. 10D, and the thickness of the liquid crystal layer is adjusted in both areas.

Figure 11A:
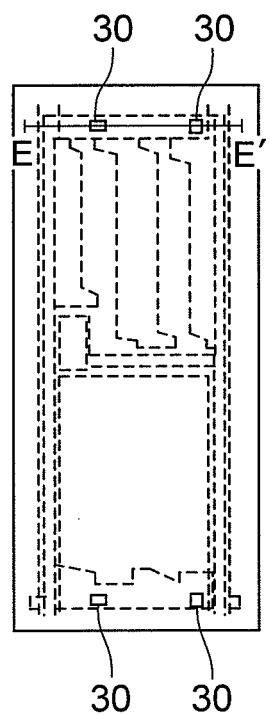
Figure 11B:
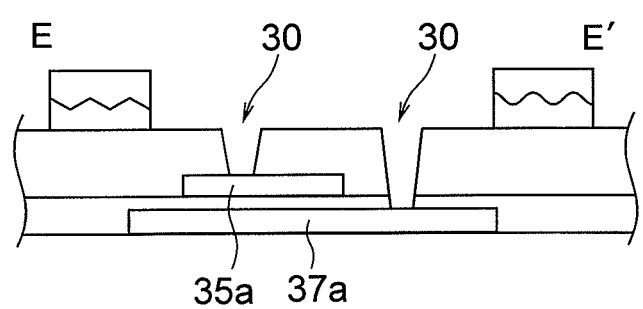

Thereafter, at the positions shown in FIG. 11A, the junction parts 30 are formed on the insulating layer that covers the pixel electrode wirings 35a, 36a, the reflection common wiring 37a, and the transmission common wiring 38a, and the pixel electrode wirings 35a, 36a, the reflection common wiring 37a, and the transmission common wiring 38a are exposed (see FIG. 11B).

After forming the junction parts, the reflection pixel electrode 29, the transmission pixel electrode 11, the reflection common electrode 28, and the transmission common electrode 12 are formed, respectively, on the flattening film 27 in a pattern shown in FIG. 12A. The reflection pixel electrode 29 and the reflection common electrode 28 are formed with a non-transparent electric conductor, and the transmission pixel electrode 11 and the transmission common electrode 12 are formed with ITO.

Here, the transmission pixel electrode 11 and the transmission common electrode 12 are formed and, thereafter, the reflection pixel electrode 29 and the reflection common electrode 28 are formed. The pixel electrode wiring 36a, the transmission common wiring 38, and the like are desired to have low resistance and high light shielding property. However, such material has a possibility of being eliminated by the same etching solution for that of the non-transparent electric conductor that is used for the reflection pixel electrode 29 and the reflection common electrode 28. Thus, the junction parts 30 between the transmission pixel electrode 11 and the transmission common electrode 12 and between the pixel electrode wiring 36a and the transmission common wiring 38a are covered with ITO so as to prevent the junction part between the electrode wiring 36a and the transmission common wiring 38a from being eliminated by the etching performed when forming the reflection pixel electrode 29 and the reflection common electrode 28.

Cross sections of the reflection area 1, the transmission area 2, and the boundary part (step part) between the reflection area 1 and the transmission area 2 are as in FIG. 12B-FIG. 12D, respectively. When forming the reflection pixel electrode 29, the transmission pixel electrode 11, the reflection common electrode 28, and the transmission common electrode 12, each electrode, the pixel electrode wirings 35a, 36a, the reflection common wiring 37a, and the transmission common wiring 38a are connected via the junction parts 30, respectively. Through the above-described steps, the lower substrate 3 of the exemplary embodiment is manufactured.

Next, the counter substrate will be described. The counter substrate 8 is formed with laminated parts each having various functions mainly for driving displaying members. From the glass substrate 13 towards the liquid crystal layer side, a black matrix layer as a light shielding film, a colored layer partially overlapping with the black matrix layer, a transparent flattening layer, and an alignment film are stacked in this order. In FIG. 2, illustrated is only a flattening film 27a.

A polarizing plate, not shown, is disposed on the glass substrate side of the lower substrate 3 and the counter substrate 8, and the transmission axes thereof are orthogonal to each other. Further, the transmission axis of the polarizing plate and the alignment direction of the liquid crystal by the alignment film of the lower substrate 3 and the counter substrate 8 are set to be orthogonal or in parallel to each other.

The above structure is described by referring to the case where the IPS (In Plane Switching) mode is applied among the lateral electric field modes. However, it is also possible to apply the FFS (Fringe Field Switching) mode. In that case, the reflection plate 4 is the reflection pixel electrode 29 in the reflection area 1, for example, and only the reflection common electrode 28 formed with the non-transparent electric conductor is provided on the flattening film 27.

Explanations Regarding Operations of Exemplary Embodiment 1

Signals inverted from each other are supplied to the transmission common electrode 12 and the reflection common electrode 28, and same signals are supplied to the transmission pixel electrode 11 and the reflection pixel electrode 29 which are connected to the data line 20. For example, an arbitrary signal from 0 V-5 V is supplied to the transmission pixel electrode 11 and the reflection pixel electrode 29. When a signal of 0 V is supplied to the reflection pixel electrode 29 and a signal of 5 V is supplied to the reflection common electrode 28, a potential difference between the reflection pixel electrode 29 and the reflection common electrode 28 becomes 5 V at the maximum, and the liquid crystal layer 9 in the reflection area 1 is driven with a lateral electric field mode by the potential difference of 5 V.

Hereinafter, changes in the polarized state at the time of dark state in the reflection area 1 will be described by referring to FIG. 13. Incident light converted into linearly polarized light of 90 degrees by a polarizing plate 27b provided on the incident light side of the counter substrate 8 makes incident on the liquid crystal layer 9 of the reflection area 1. The liquid crystal layer 9 of the reflection area 1 is rotated by the lateral electric field, and the angle between the major axes of the liquid crystal molecules and the polarizing direction of the incident light becomes 45 degrees. When the light in this state passes through the liquid crystal layer 9 whose retardation is set as ¼ wavelength, the linearly polarized light of 90 degrees is converted to clockwise circularly polarized light, and it reaches the reflection plate 4. When it is reflected by the reflection plate 4, the clockwise circularly polarized light is converted into counterclockwise circularly polarized light, and it passes through the liquid crystal layer 9. The counter clockwise circularly polarized light passing through the liquid crystal layer 9 is converted to linearly polarized light of 0 degree. The linearly polarized light of 0 degree is orthogonal to the transmission axis of the polarizing plate 27b, so that it cannot pass through the polarizing plate 27b, thereby providing dark state.

In the meantime, a signal inverted from the signal supplied to the reflection common electrode 28 is supplied to the transmission common electrode 12. That is, a signal of 0 V is supplied. Thus, the signal of 0 V that is the same potential as that of the reflection pixel electrode 29 is supplied to the transmission pixel electrode 11. Therefore, there is no electric field generated in the liquid crystal layer 9 of the transmission area 2, and the liquid crystal molecules keep the alignment direction of the alignment film.

Figure 14:
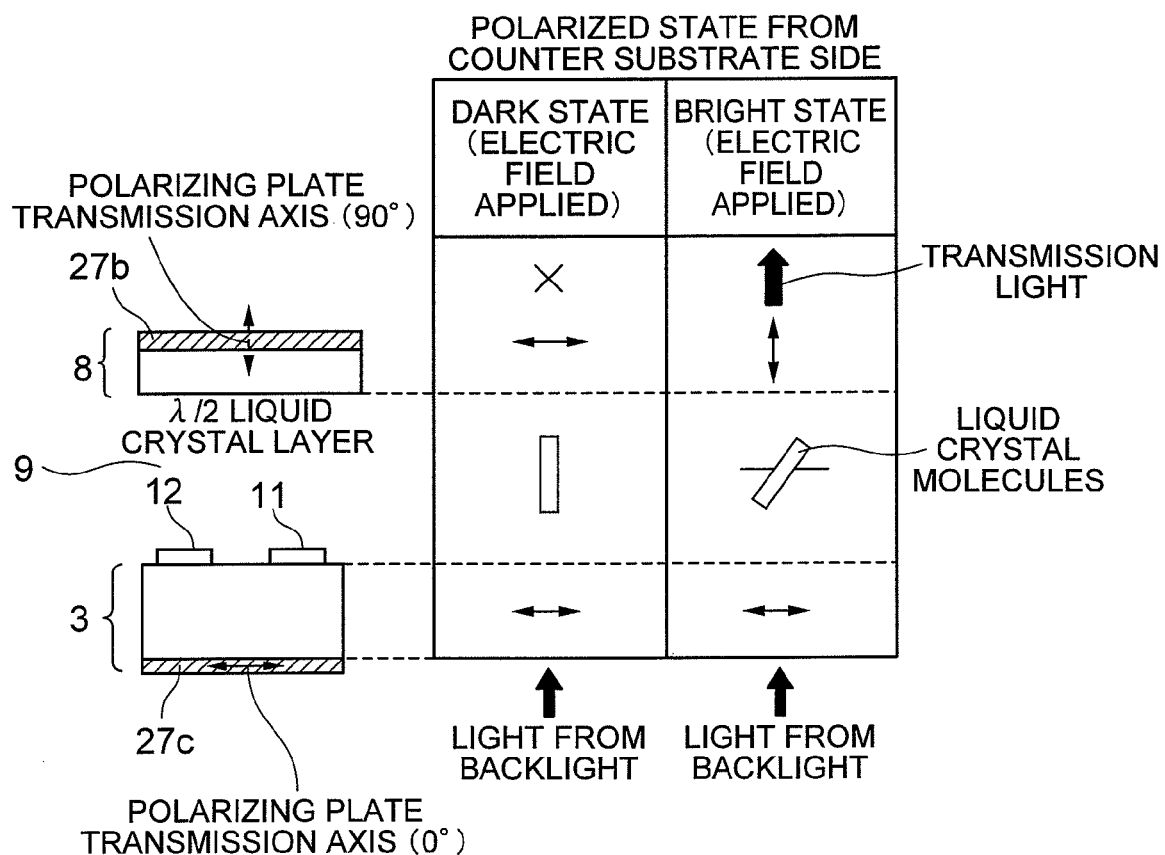
FIG. 14 is an illustration for describing changes in a polarized state in the transmission area of the exemplary embodiment 1 according to the invention.

Hereinafter, changes in the polarized state at the time of dark state in the transmission area 2 will be described by referring to FIG. 14. As shown in FIG. 14, light from a backlight disposed at a position on the opposite side from the liquid crystal layer 9 of the lower substrate 3 is converted into linearly polarized light of 0 degree by a polarizing plate 27c placed between the lower substrate 3 and the backlight. The liquid crystal molecules are aligned to be in parallel or orthogonal to the transmission axis of the polarizing plate 27c by the alignment film, so that the light passing through the polarizing plate 27c does not change its polarized state even after passing through the liquid crystal layer 9. Since the transmission axis of the polarizing plate 27b provided to the counter substrate 8 is 90 degrees, the linearly polarized light of 0 degree cannot pass through the polarizing plate 27b of the counter substrate 8 side, thereby providing dark state.

(Explanations of Effects)

Figure 55:
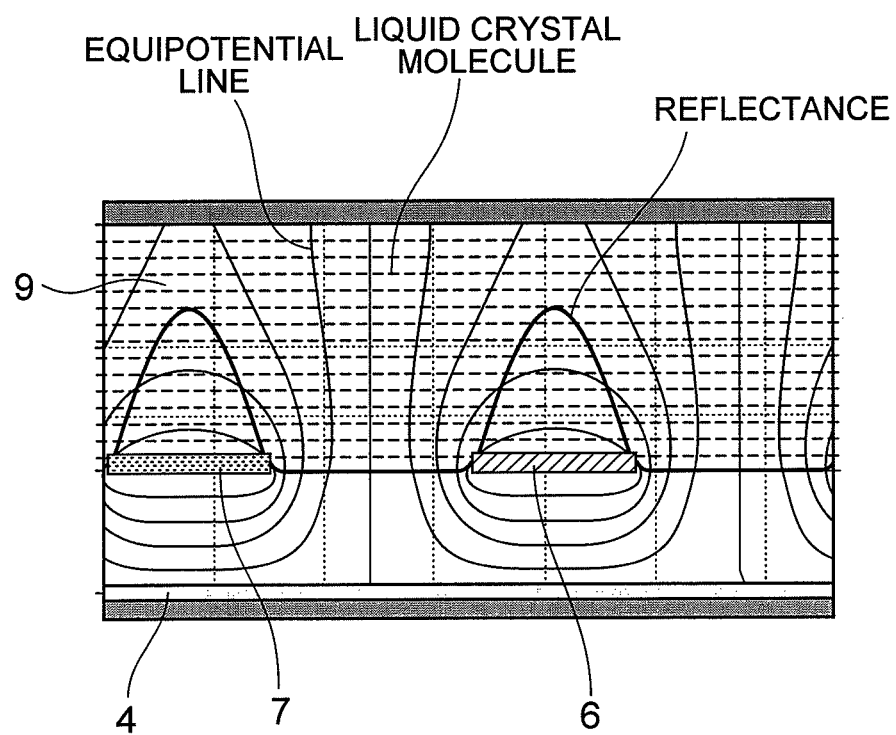
FIG. 55 shows a result of a simulation conducted regarding alignment of the liquid crystal molecules and the reflectance at the time of dark state.
Figure 56:
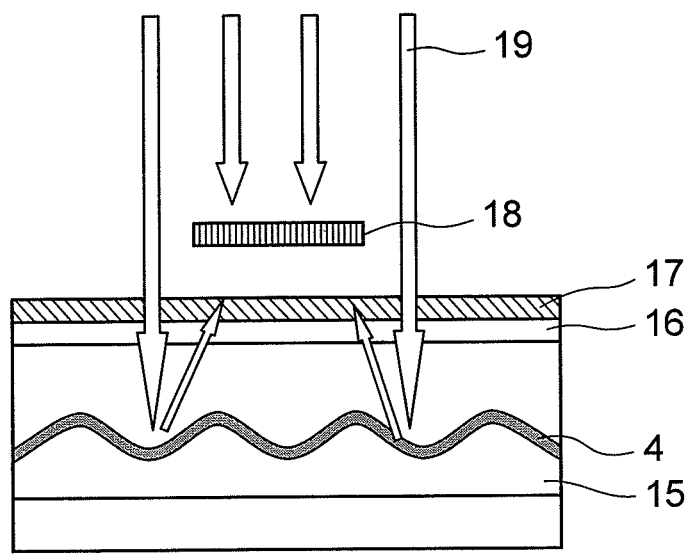
FIG. 56 is a sectional view for describing the issues of the related technique.

Effects of the exemplary embodiment 1 according to the invention will be described. As shown in FIG. 55, an electric field that is in parallel to the substrate is generated between the reflection common electrode 28 and the reflection pixel electrode 29, and the liquid crystal molecules are rotated within the substrate plane by the electric field. In the meantime, the electric field in parallel to the substrate is not generated on the reflection common electrode 28 and the reflection pixel electrode 29 as well as in the vicinity thereof. Thus, the liquid crystal molecules on the reflection common electrode 28 and the reflection pixel electrode 29 as well as in the vicinity thereof cannot be rotated within the substrate plane. Further, there are some molecules that move in an oblique direction when viewed from the substrate section.

Figure 13:
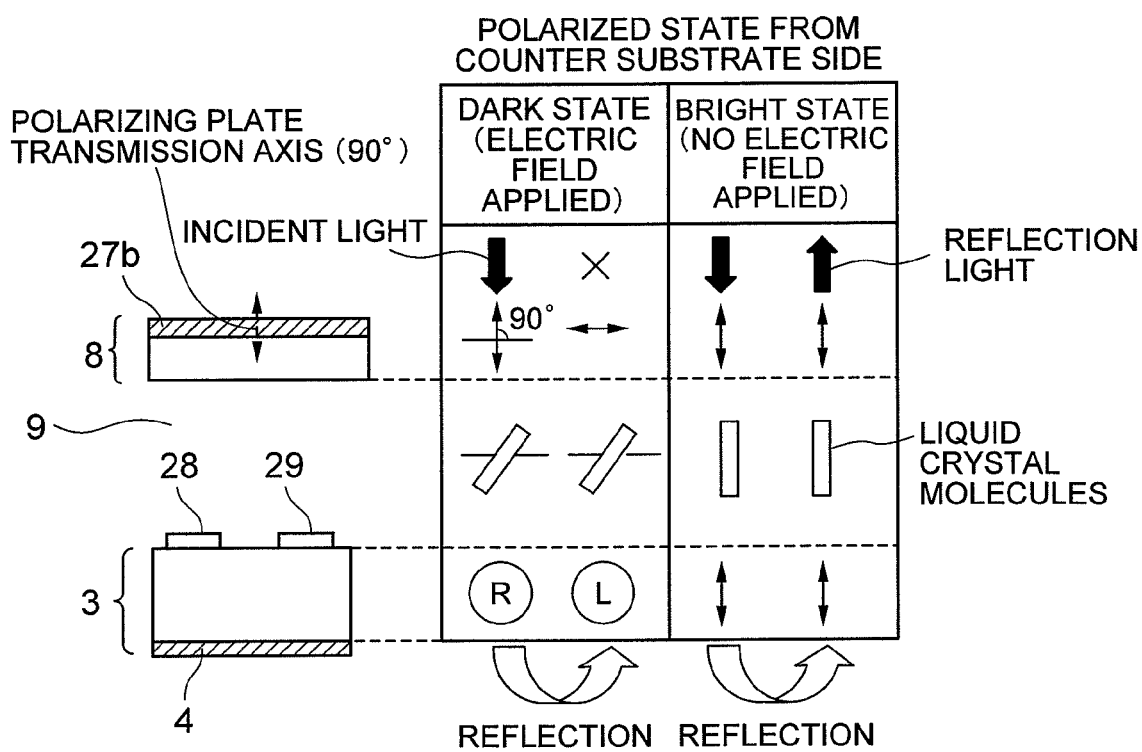
FIG. 13 is an illustration for describing changes in a polarized state in the reflection area of the exemplary embodiment 1 according to the invention.

As shown in FIG. 13, when the optical axis of the liquid crystal layer 9 having retardation of ¼ wavelength, i.e., when the major axes of the liquid crystal molecules are rotated within the substrate plane, the optical axis of the linearly polarized light that makes incident on the liquid crystal layer 9 and the major axes of the liquid crystal molecules make an angle of 45 degrees when viewed from the counter substrate 8 side, and the linearly polarized light is converted into circularly polarized light. Further, the reflected circularly polarized light passes through the liquid crystal layer 9, and it is converted again to the linearly polarized light. The optical axis thereof is orthogonal to the optical axis of the linearly polarized light at the time the incident time of making incident.

When the major axes of the liquid crystal molecules are not rotated within the substrate plane, the optical axis of the linearly polarized light making incident on the liquid crystal layer 9 and the major axes of the liquid crystal molecules do not make an angle of 45 degrees. Thus, the linearly polarized light is not converted into circularly polarized light. Further, when the major axes of the liquid crystal molecules face in the oblique direction when viewed from the substrate section, the birefringence of the liquid crystal molecules when viewed from the counter substrate 8 side becomes small. Thus, even if the optical axis of the linearly polarized light making incident on the liquid crystal layer 9 and the major axes of the liquid crystal molecules make an angle of 45 degrees when viewed from the counter substrate 8 side, the retardation of the liquid crystal layer 9 proportional to the birefringence becomes smaller than ¼ wavelength. Thus, even if the linearly polarized light passes though on the liquid crystal layer 9, it is not converted into the circularly polarized light. Therefore, the light that passes through the liquid crystal layer 9 on the electrodes 28, 29 and the vicinity thereof, then reflected by the reflection plate 4, and passes through the liquid crystal layer 9 is not changed into the polarized state that provides dark state. However, the electrodes 28 and 29 are formed with the non-transparent electric conductor, so that it is possible to prevent the light from reaching the reflection plate and to suppress the light leakage at the time of dark state.

Further, the light that passes through the liquid crystal layer 9 between the electrodes 28 and 29, reaches the reflection plate 4 and reflected thereby, passes through the liquid crystal layer 9 on the electrodes 28, 29 and the vicinity thereof is the circularly polarized light at the point of being reflected by the reflection plate 4. However, when passing through the liquid crystal layer 9 again and reaches the polarizing plate, it is not converted to the linearly polarized light, so that it is not possible to provide dark state. However, the electrodes 28 and 29 are formed with the non-transparent electric conductor, so that the electrodes 28 and 29 shield the light reflected by the reflection plate 4. That is, it is possible to prevent the light reflected by the reflection plate 4 towards the direction of the electrodes 28, 29 among the light converted into the circularly polarized state by passing through the liquid crystal layer 9 between the electrodes 28, 29 from entering again into the liquid crystal layer 9. Thus, the light leakage at the time of dark state can be suppressed.

As shown in FIG. 3 and FIG. 4, the transmission common electrodes 12 and 12' are formed to cover over the data line 20. When the transmission area 1 is under dark state, there is no electric field generated between the transmission common electrode 12 and the transmission pixel electrode 11. Thus, the liquid crystal molecules are not rotated. However, the liquid crystal molecules on the sides of the data line are moved because of the electric field from the data line 20, thereby causing light leakage in the transmission area 2. However, when the transmission common electrode is the transmission common electrode 12' that is formed with the non-transparent electric conductor as in FIG. 4, the light leakage can be shielded. Thus, it is unnecessary to provide the black matrix on the counter substrate 8 side for shielding the light, thereby providing an effect of increasing the numerical aperture.

Figure 15:
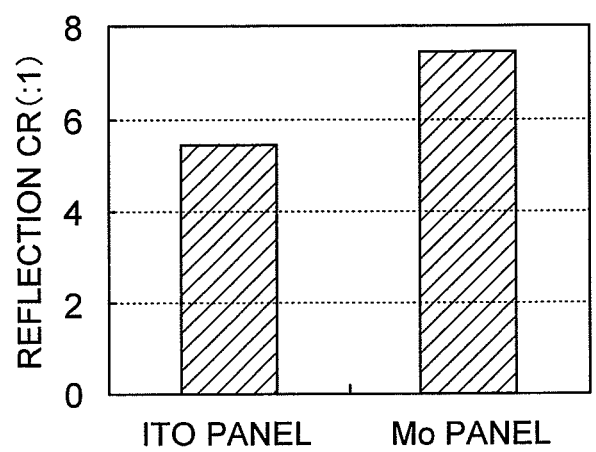
FIG. 15 is graph showing a relation of the actual measurement values of the contrast ratios of the reflection display in a panel whose reflection common electrodes and reflection pixel electrodes are formed with ITO and in a panel whose reflection common electrodes and reflection pixel electrodes are formed with Mo that is a non-transparent electric conductor.

FIG. 15 is a graph showing the actual measurement values of the contrast ratios of the reflection display in a panel whose reflection common electrode 28 and reflection pixel electrode 29 are formed with ITO and in a panel whose reflection common electrode and reflection pixel electrode are formed with Mo that is a non-transparent electric conductor. Through forming the electrodes with the non-transparent electric conductor, the contrast ratio was increased to approximately 1.4 times. Further, FIG. 16 shows the reflectance of each panel at the time of bright state and dark state. The reflectance of the bright state as well as the dark state with the Mo panel became decreased with respect to that of the ITO panel. However, the decrease of the reflectance in dark state is greater in proportion. Thus, the contrast ratio of the reflection display became increased. The values of the reflectance were measured by taking the intensity of the reflected light obtained by irradiating a spot light source of a halogen lamp to a standard white board made with barium sulfate, for example, as 100% intensity.

Effects as follows can be achieved when forming the reflection common electrode 28 and the reflection pixel electrode 29. Photolithography is used for patterning the flattening film on the reflection common electrode 28 and the reflection pixel electrode 29. A non-transmission electric conductive material such as Mo is sputtered on the flattening film to form a thin film. A positive-type photoresist is applied on the sputtered film. Then, exposure is performed by using a mask in which the part for the electrode is formed as a light-shielding part. The exposed part becomes soluble to a developing solution, and the resist remains only in the part to form the electrode after development. Since the thin film for forming the electrode is non-transparent, the exposure light does not reach the reflection plate 4. Thus, the exposure of the resist can be conducted properly, so that the electrode can be patterned with high precision. Further, patterning of thin electrodes can also be conducted with high precision, so that it is advantageous for fabricating high-definition panels.

Figure 17:
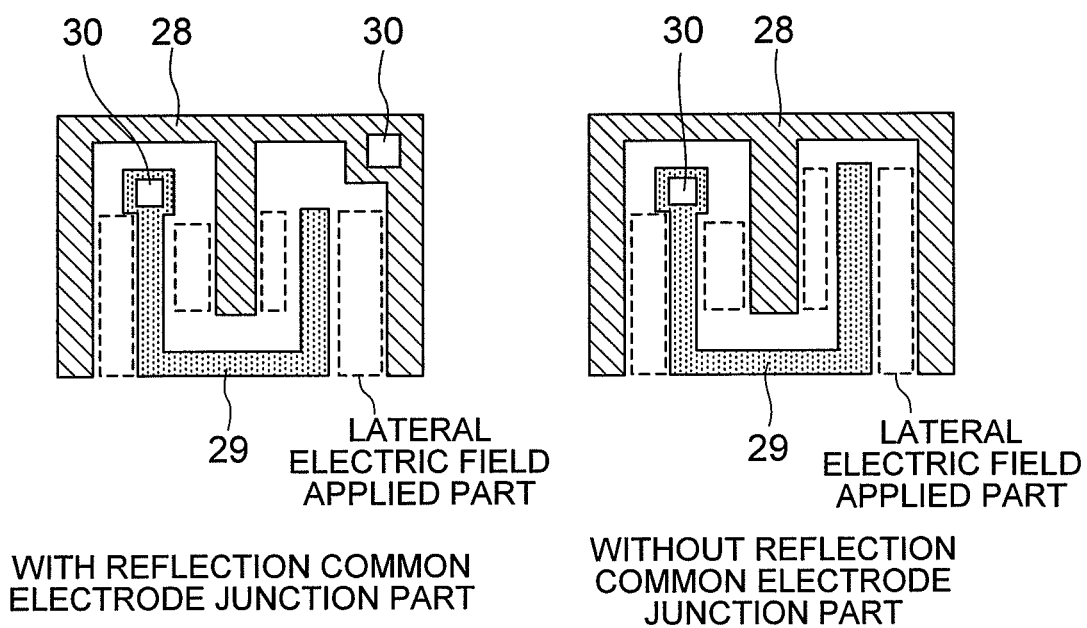
FIG. 17 is a plan view for describing effects of the exemplary embodiment 1 of the invention.

The surface resistances of ITO as a transparent electric conductive material and Mo as a non-transparent electric conductive material are about $5.2 \times 10^{-6}$ Ω·m and $2.0 \times 10^{-7}$ Ω·m, respectively, and Mo has a smaller resistance than ITO. Therefore, when the reflection common electrode is formed with Mo, it is possible to have the reflection common electrode 28 function as the reflection common wiring without forming the reflection common wiring 29, as described in the structure of the exemplary embodiment. Thus, it is possible to omit the junction parts 30. When the reflection common wiring and the junction part of the reflection common electrode are omitted, the part where the reflection common electrode opposes in parallel to the reflection pixel electrode as in FIG. 17, i.e., the part that a proper lateral electric field can be applied to the liquid crystal layer, is increased. Therefore, the area of the black matrix for shielding the light provided on the counter substrate side can be reduced. As a result, the effect of increasing the numerical aperture of the unit pixel can be obtained as well.

With the present invention, the driving electrode is formed by using the non-transparent electric conductor. Thus, as an exemplary advantage according to the invention, it is possible to suppress the light passing through the liquid crystal layer on the driving electrode at the time of dark state from reaching the reflection plate. Therefore, light leakage at the time of dark state can be prevented. Further, since the driving electrode is formed by using the non-transparent electric conductor, the exposure light does not reach the reflection plate. Therefore, it is possible to form the electrodes in the reflection area with high precision.

Exemplary Embodiment 2

Figure 18:
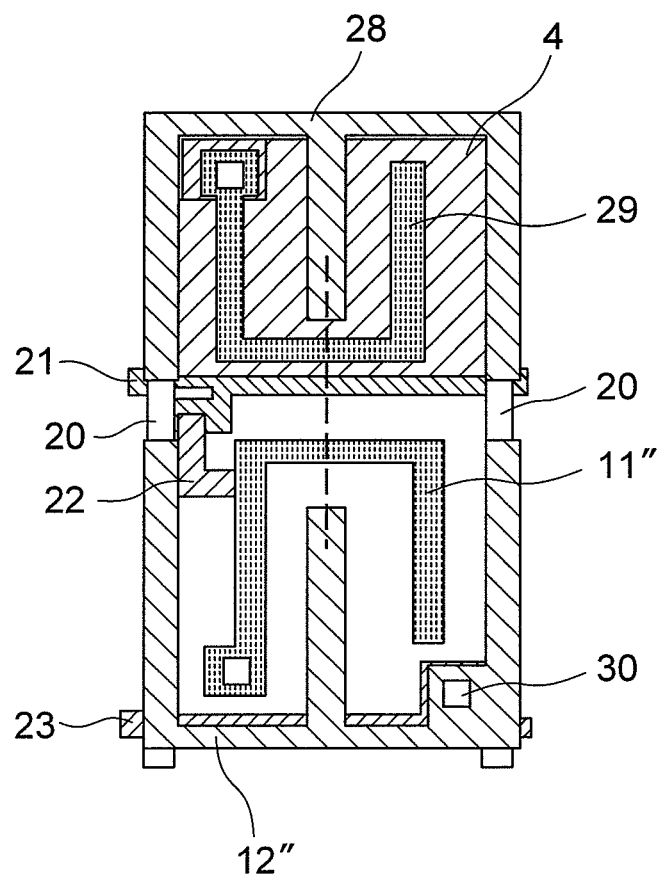
FIG. 18 is a plan view showing a unit pixel that forms a liquid crystal panel of a liquid crystal display device according to an exemplary embodiment 2 of the invention.
Figure 19:
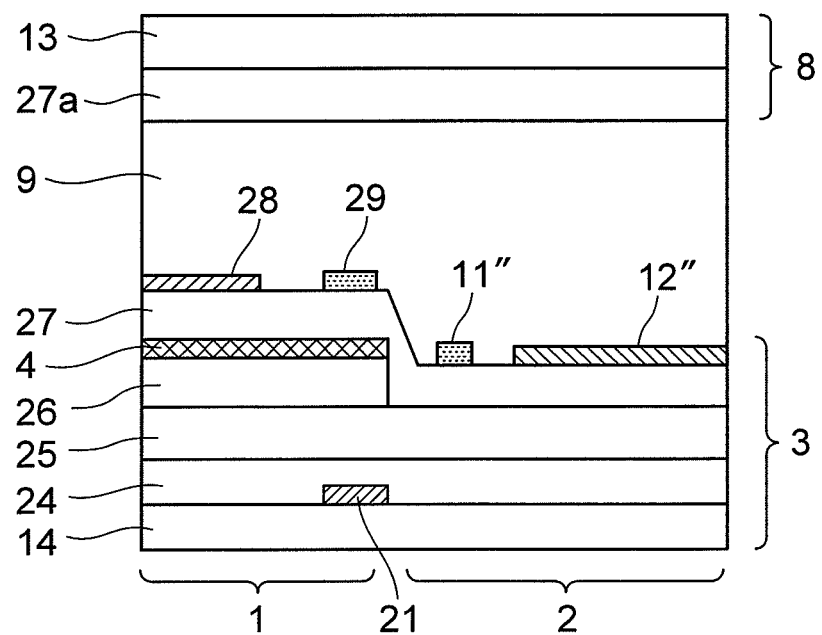
FIG. 19 is a sectional view taken along a dotted line of the unit pixel shown in FIG. 18.

FIG. 18 is a plan view showing a unit pixel that forms a liquid crystal panel of a liquid crystal display device according to an exemplary embodiment 2 of the invention. Further, FIG. 19 is a sectional view taken along a dotted line of the unit pixel shown in FIG. 18.

The exemplary embodiment 2 according to the invention is a modification case of the exemplary embodiment 1 shown in FIG. 1, in which a transmission common electrode 12" and a transmission pixel electrode 11" of the transmission area 2 set within a unit pixel are formed with a same non-transparent electric conductor, as in the case of the reflection common electrode 28 and the reflection pixel electrode 29 of the reflection area 1 shown in FIG. 1 and FIG. 2.

In the exemplary embodiment 2, the transmission common electrode 12", the transmission pixel electrode 11", the reflection common electrode 28, and the reflection pixel electrode 29 are formed on the flattening film 27 simultaneously by using the same non-transparent electric conductor.

Effects of Exemplary Embodiment 2

In the exemplary embodiment 2 of the invention, the reflection common electrode 28, the reflection pixel electrode 29, the transmission common electrode 12", and the transmission pixel electrode 11" are formed simultaneously. Thus, the number of manufacturing steps can be reduced.

When the reflection common electrode and the reflection pixel electrode are formed with a non-transparent electric conductor such as Mo and the transmission common electrode and the transmission pixel electrode are formed with a transparent electric conductor such as ITO, it is necessary to carry out a series of steps twice (the steps including sputtering, applying resist, exposure, development, etching, and exfoliating resist). However, the exemplary embodiment 2 requires the steps only once, which results in reducing the manufacturing time and manufacturing cost.

While the effect regarding the numerical aperture achieved by reducing the junction between the reflection common wiring and the reflection common electrode is described in the exemplary embodiment 1, that effect can be improved further with the exemplary embodiment 2. That is, as described in the structure of the exemplary embodiment 1, through eliminating the junction part by having the transmission common electrode also function as the transmission common wiring without separately forming the transmission common wiring, the part that can apply proper lateral electric field to the liquid crystal layer can be increased. Thus, the area of the black matrix provided on the counter substrate side for shielding the light can be reduced further. As a result, the numerical aperture of the unit pixel can be improved further.

Exemplary Embodiment 3

Figure 20:
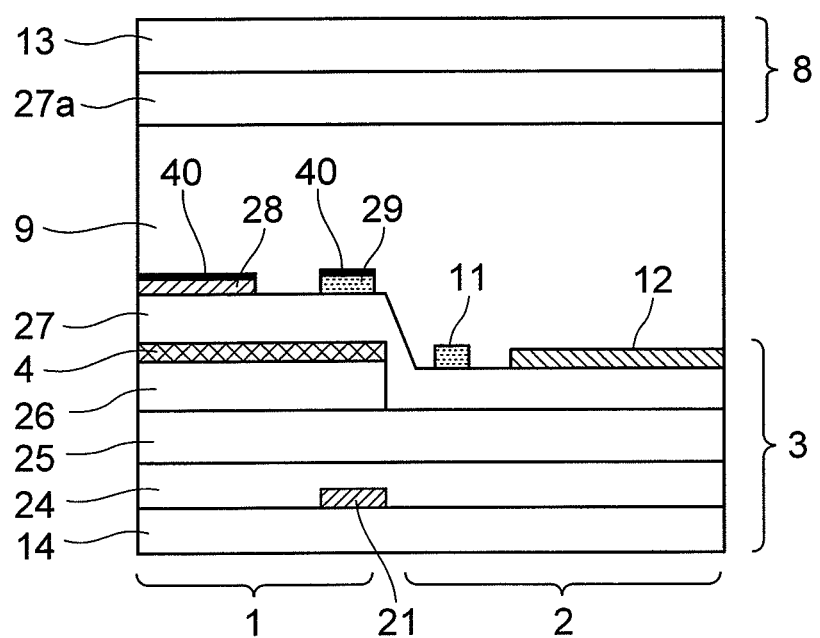
FIG. 20 is a sectional view showing a unit pixel that forms a liquid crystal panel of a liquid crystal display device according to an exemplary embodiment 3 of the invention.

FIG. 20 is a sectional view showing a unit pixel that forms a liquid crystal panel of a liquid crystal display device according to an exemplary embodiment 3 of the invention.

The exemplary embodiment 3 is obtained by modifying the structure of the reflection area in the liquid crystal display device of the exemplary embodiments 1 and 2, and it is a feature of the exemplary embodiment 3 to form an antireflection layer 40 on the non-transparent reflection common electrode 28 and reflection pixel electrode 29.

As a material for the antireflection layer 40, a metallic oxide is selected, for example. When forming the reflection common electrode 28 and the reflection pixel electrode 29, "Cr" that is a non-transparent electric conductor is sputtered, and Cr oxide is sputtered successively. Thereafter, steps of regular patterning are executed to form the reflection common electrode 28 and the reflection pixel electrode 29 having the antireflection layer 40 stacked on the non-transparent electric conductor.

The sputtering can be performed as the so-called reactive sputtering. Typical examples of the atmosphere are an inert gas of nitrogen or the like including a rare gas such as argon, oxygen gas, and carbon oxide gas such as $CO$, $CO_2$. Further, it is preferable for the patterning of the non-transparent electric conductor and the antireflection film to be preformed collectively in the same patterning steps. It is because those are the reflection common electrodes 28 or the reflection pixel electrodes 29, so that delicate patterning precision is required.

In the above, a configuration of Cr/Cr-oxide is mentioned as an example of a metal-film/oxide-film as a combination of the non-transparent electric conductive film and the antireflection film. However, it is needless to mention that a configuration of NiW/NiW-oxide using NiW that is an alloy of Ni and W, and a configuration of NiWAl/NiWAl-oxide using NiWAl that is an alloy of Ni, W, and Al may also be employed. Further, it is also needless to mention that not only the structure of a double-layered film of a metal-film and an oxide-film but also the structure of a three-layered film of a metal film, a nitride film, and an oxide film may be employed.

It is assumed here that the wavelength of the light whose reflection needs to be suppressed is λ, provided the refractive index of the liquid crystal layer 9 is Nlc, the refractive index of the antireflection layer 40 is N, the film thickness is D, the refractive index of the non-transparent electric conductor (reflection common electrode 28, reflection pixel electrode 29) is Ns. With this, the condition of preventing the reflection is as follows.

$$N = \sqrt{Nlc \cdot Ns}, ND = \frac{\lambda}{4} \qquad \text{expression (1)}$$

Expression above is a conditional expression of approximated vertical incident that is obtained without considering extinction coefficients of the non-transparent electric conductive layers (28, 29) and the wavelength dispersion of the liquid crystal layer 9. The refractive index and the film thickness of the antireflection layer 40 are set to satisfy the conditional expression, so that a sufficient function for preventing the reflection can be obtained.

The non-transparent electric conductor as the material for the reflection common electrode 28 and the reflection pixel electrode 29 is Cr, and the material for the antireflection layer 40 is $Cr_2O_3$. The refractive index of Cr is about 3.1, and the refractive index of the liquid crystal layer 9 is normally about 1.5. When calculating "N" that satisfies Expression (1), obtained is about 2.2. Since the refraction index of $Cr_2O_3$ is also about 2.2, the function for preventing the reflection can be obtained sufficiently. Further, $Cr_2O_3$ can be formed by introducing oxygen at the time of sputtering, so that the Cr film and the $Cr_2O_3$ film can be successively formed easily. The wavelengths of light that makes incident on each of the pixels of R, G, and B vary, so that the film thickness of the antireflection layer 40 needs to be changed for each of the pixels of R, G, and B. However, the steps may become complicated, so that the film thickness is set for the wavelength of G that has high visibility.

Formation of the antireflection layer 40 on the reflection common electrode 28 and the reflection pixel electrode 29 has been described heretofore. However, the antireflection layer 40 may also be formed on the transmission common electrode 12 and the transmission pixel electrode 11 formed with the non-transparent electric conductor as in the exemplary embodiment 2.

Effects of Exemplary Embodiment 3

As a reason for causing light leakage at the time of dark state in the reflection area 1, reflection of the incident light on the reflection common electrode 28 and the reflection pixel electrode 29 can also be considered. As described in the effects of the exemplary embodiment 1, a proper lateral electric field is not generated in the liquid crystal layer 9 on the reflection common electrode 28 and the reflection pixel electrode 29, so that the liquid crystal molecules are not rotated for providing dark state. Thus, the following light exhibits no change in the polarized state to provide dark state (the light that passes through the liquid crystal layer 9 on the reflection common electrode 28 and the reflection pixel electrode 29, reflected on the reflection common electrode 28 and the reflection pixel electrode 29, and passes again through the liquid crystal layer 9 on the reflection common electrode 28 and the reflection pixel electrode 29; the light that passes through the liquid crystal layer 9 on the reflection common electrode 28 and the reflection pixel electrode 29, reflected on the reflection common electrode 28 and the reflection pixel electrode 29, and passes through the liquid crystal layer 9 between the reflection common electrode 28 and the reflection pixel electrode 29; and the light that passes through the liquid crystal layer 9 between the reflection common electrode 28 and the reflection pixel electrode 29, reflected on the reflection common electrode 28 and the reflection pixel electrode 29, and passes through the liquid crystal layer 9 on the reflection common electrode 28 and the reflection pixel electrode 29).

However, the antireflection layer 40 provided on the reflection common electrode 28 and the reflection pixel electrode 29 can suppress contribution of such light to the reflection display. The reflectance on the electrode, when $Cr_2O_3$ in a film thickness of 500 Å was formed on Cr in a film thickness of 500 Å, was calculated as 26% by Fresnel equation based on the refractive index and the extinction coefficient of the substance that configures the film. Since the reflectance of the Mo single layer is about 47%, reflection can be prevented with the film thickness setting mentioned above.

Figure 21:
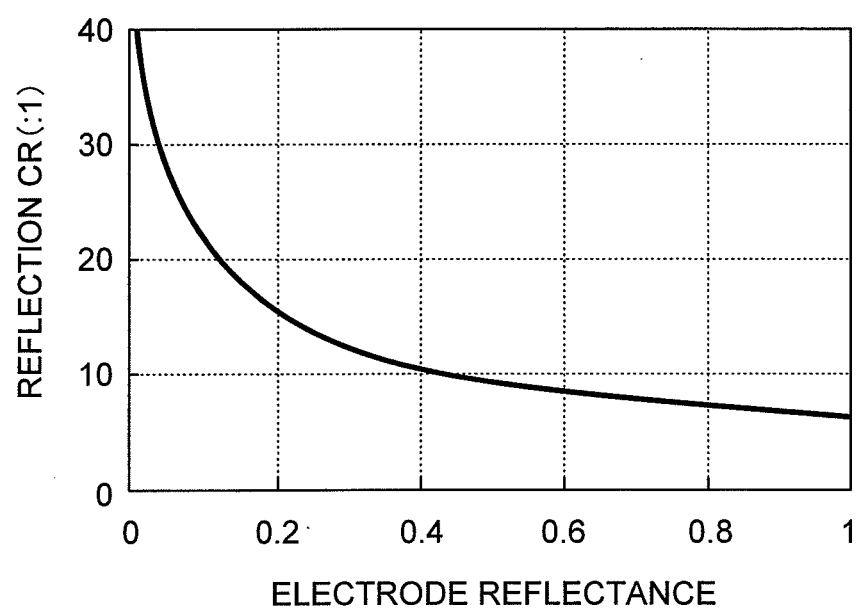
FIG. 21 is a graph showing calculation results of the contrast ratios of the reflection area according to the exemplary embodiment 3 of the invention.
Figure 22:
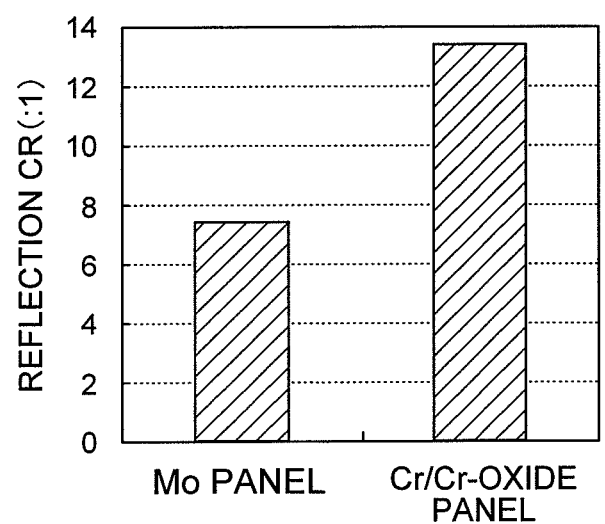
FIG. 22 is a graph showing a relation of the actual measurement values of the contrast ratios of the reflection display in a liquid crystal panel in which a low-reflectance layer formed with Cr oxide of 500 Å in film thickness is formed on a reflection common electrode and a reflection pixel electrode formed with Cr of 500 Å in film thickness and in a liquid crystal panel having only a reflection common electrode and a reflection pixel electrode formed with MO of 500 Å in film thickness.
Figure 23A:
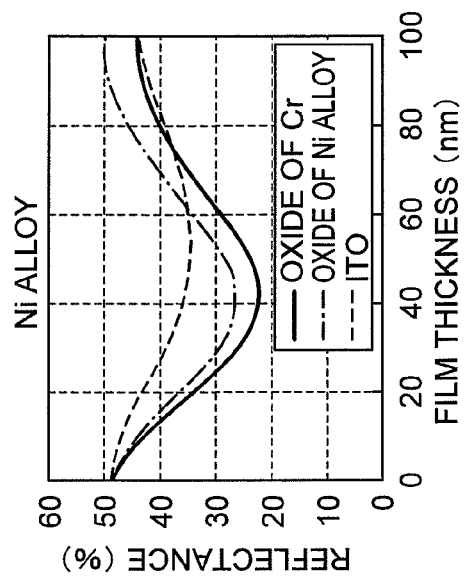
FIG. 23 shows graphs of calculated results of the reflectance with various materials according to an exemplary embodiment 4 of the invention.
Figure 23B:
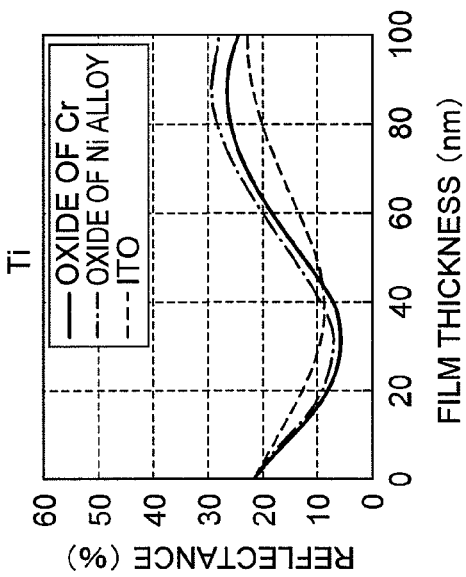
Figure 23C:
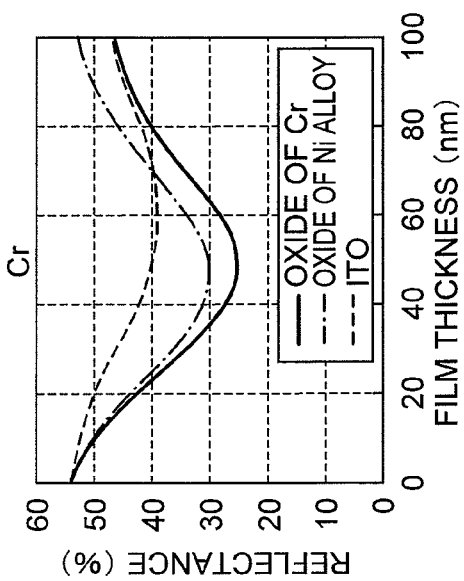
Figure 23D:
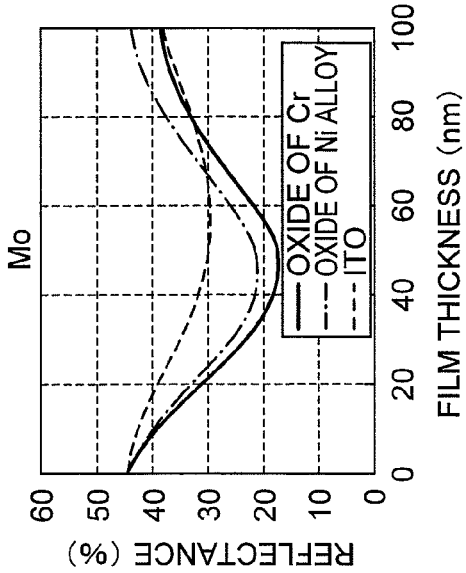

FIG. 21 is a graph showing results of calculating the reflectance dependency of the contrast ratios of the reflection area on the reflection common electrode 28 and the reflection pixel electrode 29. When the reflectance on the electrode becomes lower, contribution of the light making incident on the electrode to the reflection display can be suppressed. Thus, no light leakage occurs in dark state, thereby increasing the contrast ratio. FIG. 22 is a graph showing the actual measurement values of the contrast ratios of the reflection display achieved in a liquid crystal panel in which the antireflection layer 40 formed with Cr oxide of 500 Å in film thickness is formed on the reflection common electrode 28 and the reflection pixel electrode 29 formed with Cr of 500 Å in film thickness and in a liquid crystal panel having only the reflection common electrode 28 and the reflection pixel electrode 29 formed with MO of 500 Å in film thickness. The contrast ratio of the double-layered film of Cr and Cr oxide was about 1.3 times as that of the single-layered film of Mo. According to FIG. 21, when the reflectance on the electrode was 26%, i.e., with the electrode structure in which Cr oxide was formed on Cr, the contrast ratio in the reflection area was about 14:1. When the reflectance on the electrode was 47%, i.e., with the electrode structure with a Mo single layer, the contrast ratio was about 10:1. Thus, the contrast ratio of the double-layered film of Cr and Cr oxide was about 1.4 times as that of the single-layered film of Mo. The actual measurement reenacts the effect of increase in the calculated contrast ratios. Thus, it is possible to confirm that reduction in the reflectance on the electrode exhibits the effect of increasing the contrast ratio.

Through forming the double-layered film of the non-transparent electric conductor and the antireflection film 40 on the reflection common electrode 28 and the reflection pixel electrode 29, the reflectance of the electrodes is lowered. Thus, the effect of improving the contrast ratio can be obtained. At least the reflectance of the electrode viewed from the counter substrate 8 side may be suppressed to be lower than the reflectance of the reflection plate 4. Mainly, Al is used for the reflection plate 4. The reflectance of Al is about 89%. Thus, it is possible to achieve the similar effects if the reflection common electrode 28 and the reflection pixel electrode 29 are formed only with the non-transparent electric conductor such as Cr, Mo, or Ni whose reflectance is smaller than that of Al.

Exemplary Embodiment 4

In the exemplary embodiment 4, the antireflection layer 40 of the exemplary embodiment 3 shown in FIG. 20 is formed to have a film thickness of 30-60 nm with Cr oxide, oxide of Ni alloy containing Ni and another element, and ITO, while the non-transparent reflection common electrode 28 and reflection pixel electrode 29 are formed to have a film thickness of 50 nm with Cr, Ni alloy containing Ni and another element, Mo, and Ti. These materials are selected considering low reflectance of the double-layered film of the antireflection layer 40 and the reflection common electrode 28, the reflection pixel electrode 29 and the simplifying the manufacturing steps.

Effects of Exemplary Embodiment 4

FIG. 23 shows calculated values of the reflectance obtained by combining the materials of the antireflection layer 40, the reflection common electrode 28, and the reflection pixel electrode 29. Lateral axes of the graphs show the film thickness of the antireflection layer 40. Calculation was conducted assuming that the reflection common electrode 28 and the reflection pixel electrode 29 were 50 nm in thickness. Further, FIG. 23A-FIG. 23D respectively show the reflectance when the reflection common electrode 28 and the reflection pixel electrode 29 were formed with Cr, Ni alloy (NiW, NiWAl, etc), Mo, and Ti. Reduction of the reflectance is observed in all the combinations by forming the antireflection layer 40, so that the function for preventing the reflection can be achieved.

In the combinations of the antireflection layer 40, the reflection common electrode 28, and the reflection pixel electrode 29, there are optimum film thicknesses of the antireflection layer 40 with which the reflectance becomes the lowest. The optimum film thicknesses are distributed within a range of 30 nm-60 nm. Thus, if the film thickness of the antireflection layer 40 falls within the range of 30 nm-60 nm in any of the combinations of the above-described materials, the antireflection layer 40 can exhibit the function of preventing the reflection. When the antireflection layer 40 is formed with Cr oxide, and the reflection common electrode 28 and the reflection pixel electrode 29 are formed with Ti selected among the above-described materials, the reflectance can be suppressed to the lowest. Thereby, the contrast ratio can become the maximum. While the film thicknesses of the reflection common electrode 28 and the reflection pixel electrode 29 are 50 nm in this case, the values are not to be limited to 50 nm. When the film thickness is increased, however, the total thickness of the reflection common electrode 28 and the reflection pixel electrode 29 including the antireflection layer 40 becomes increased further, which may result in disclination or rubbing failure because of a step formed between the reflection common electrode 28 as well as the reflection pixel electrode 29 and the flattening film 27. Therefore, it is preferable for the film thicknesses of the reflection common electrode 28 and the reflection pixel electrode 29 to be 100 nm or less.

From the above, it is found regarding these combinations of the metal films and the oxide films that the reflectance of the reflection common electrode 28 and the reflection pixel electrode 29 can be between 5%, inclusive, and 40%, inclusive, with the use of the metal film of 100 nm or less and the oxide film in a range of 30 nm-80 nm (desirably in a range of 30 nm-60 nm). From FIG. 21, the contrast ratio can be in a range of 10:1-30:1, so that fine image visibility can be provided as the reflection mode of the transflective liquid crystal display device.

ITO is selected for the antireflection layer 40, and Ti is selected for the reflection common electrode 28 and the reflection pixel electrode 29. Further, the transmission common electrode 12 and the transmission pixel electrode 11 are formed with ITO simultaneously when forming ITO (antireflection layer 40). Because of the combination of these materials, the contrast ratio of the reflection area can be increased. At the same time, it is possible to achieve high transmittance with a minimum number of increase in the steps, since the electrodes of the transmission area are formed with ITO.

Exemplary Embodiment 5

Figure 24:
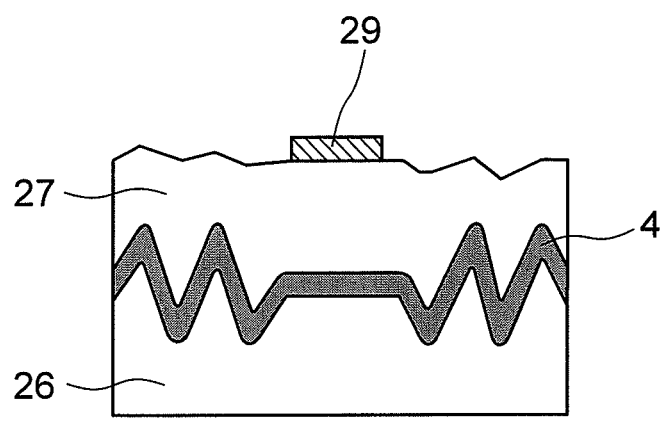
FIG. 24 is a sectional view of a unit pixel that forms a liquid crystal panel of a liquid crystal display device according to a exemplary embodiment 5 of the invention, which is taken in the vicinity of a reflection pixel electrode of the reflection area.

FIG. 24 is a sectional view of a unit pixel that forms a liquid crystal panel of a liquid crystal display device according to an exemplary embodiment 5 of the invention, which is taken in the vicinity of the reflection pixel electrode and the reflection common electrode of the reflection area.

As shown in FIG. 24, the exemplary embodiment 5 is a modification case of the structures of the exemplary embodiments 1-3, and it is a feature of the exemplary embodiment 5 that the flattening film 27 directly under the reflection common electrode 28 and the reflection pixel electrode 29 is flat.

There are steps of about 1 μm formed on the surface of the uneven film 26 on the insulating film 25 for giving a diffusive reflection function to the reflection plate 4. The flattening film 27 works to ease the steps of the uneven film 26, so that the extent of flatness can be increased by increasing the film thickness of the flattening film 27. However, there is a part where the flattening film 27 needs to be eliminated, e.g., the junction part between the reflection common electrode 28 and the reflection common wiring, and the thickness of the liquid crystal layer 9 in the reflection area 1 and the transmission area 2 is set by the flattening film 27. Therefore, it is not appropriate to increase the thickness of the flattening film radically for increasing the flatness. When the film thickness is increased, it is possible that the flattening film 27 cannot be eliminated completely. Further, the difference between the thicknesses of the liquid crystal layer 9 in the reflection area 1 and the transmission area 2 becomes small, so that the appropriate retardation for the liquid crystal layer in each area cannot be obtained. Therefore, in order to flatten the flattening film 27 directly under the reflection common electrode 28 and the reflection pixel electrode 29 without increasing the film thickness of the flattening film 27, the surface of the uneven film 26 at the part corresponding to the area for forming the reflection common electrode 28 and the reflection pixel electrode 29 may be formed flat.

Hereinafter, formation of the uneven film 26 according to the exemplary embodiment 5 will be described. A positive-type resist is applied on the insulating film 25, and the resist is exposed by using a mask. A pattern to be formed on the uneven film 26 is provided to the mask as the light shielding parts. Further, pattern eliminating parts are provided at the parts where the reflection common electrode 28 and the reflection pixel electrode 29 are to be formed. The pattern eliminating parts may be formed larger than the parts where the reflection common electrode 28 and the reflection pixel electrode 29 are to be formed. Through exposing the resist by using such mask, and then performing development and calcination, it is possible to form the uneven film 26 in which the part where the reflection common electrode 28 and the reflection pixel electrode 29 are not formed has unevenness and the parts where the reflection common electrode 28 and the reflection pixel electrode 29 are formed are flat.

Through forming such uneven film 26, the flattening film directly under the reflection common electrode 28 and the reflection pixel electrode 29 can be made flat, regardless of the film thickness of the flattening film 27 that is formed on the reflection plate 4.

Effects of Exemplary Embodiment 5

When the flattening film 27 directly under the reflection common electrode 28 and the reflection pixel electrode 29 can be made flat, the surfaces of the reflection common electrode 28 and the reflection pixel electrode 29 become flat as well. As shown in the exemplary embodiments 1-3, the reflection common electrode 28 and the reflection pixel electrode 29 are configured with a non-transparent electric conductor or configured as a double-layered film of the non-transparent electric conductor and the antireflection layer 40. The reflectance of each electrode is 60% when the non-transparent electric conductor is Mo, and it is 26% when the double-layered film of the non-transparent electric conductor and the antireflection layer 40 is formed with Cr and $Cr_2O_3$. Thus, when the flattening film 27 directly under the electrodes is not flat, the surfaces of those electrodes are not flat, either. Therefore, diffusive reflection occurs on the electrodes, which causes light leakage at the time of dark state and deteriorates the visibility of the reflection display. However, it is possible with the exemplary embodiment 5 to suppress the diffusive reflection. When the surfaces of the electrodes are flat, the light making incident on the electrodes and reflected thereby mainly has regular reflection components. Thus, it is not to be recognized as diffusive reflection light, so that it is not observed as the light leakage at the time of dark state.

Exemplary Embodiment 6

Figure 25:
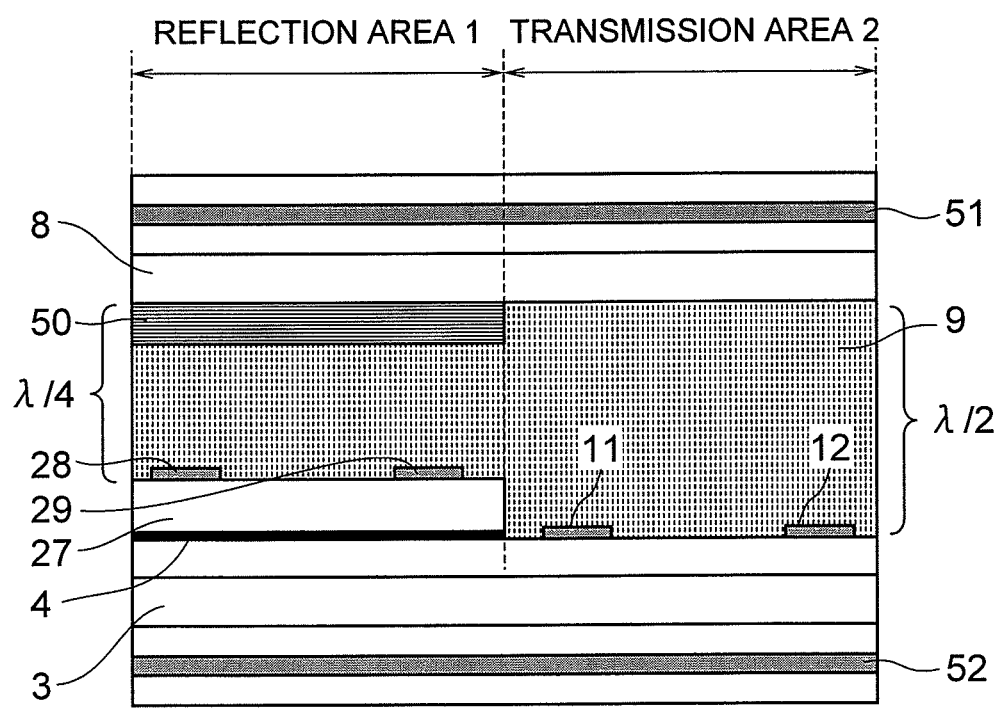
FIG. 25 is a sectional view showing a unit pixel that forms a liquid crystal panel of a transflective liquid crystal display device according to an exemplary embodiment 5 of the invention.

FIG. 25 is a sectional view of a unit pixel that forms a liquid crystal panel of a transflective liquid crystal display device according to an exemplary embodiment 6 of the invention.

The liquid crystal display device according to the exemplary embodiment 6 is a transflective liquid crystal display device which has the reflection common electrode 28 of the reflection area 1 and the transmission common electrode 12 of the transmission area 2, and different signals are applied to each of the electrodes 28 and 12. Further, it is a feature of the exemplary embodiment 6 that a phase difference layer 50 is formed on the counter substrate 8 side of the reflection area 1.

Specifically, as in FIG. 25, the exemplary embodiment 6 has a first polarizing plate 51, the counter substrate 8, the phase difference layer 51, the liquid crystal layer 9 whose initial alignment is homogeneous alignment, the lower substrate 3, and a second polarizing plate 52 in this order, when viewed from the display plane side. The optical axis of the first polarizing plate 51 and the optical axis of the second polarizing plate 52 are orthogonal to each other. Further, the liquid crystal alignment direction of the liquid crystal layer 9 when no voltage is being applied is orthogonal or in parallel to the optical axes of the first polarizing plate 51 and the second polarizing plate 52.

As shown in FIG. 25, the exemplary embodiment 6 has the phase difference layer 50 between the first polarizing plate 51 and the liquid crystal layer 9 by corresponding to the reflection area 1. Retardation of the phase difference layer 50 is set to be ½ wavelength for the light with the wavelength λ=550 nm.

Angle θ1 between the optical axis of the phase difference layer 50 and the optical axis of the first polarizing plate 51 is set to be a value that falls within a range of "0 degree<θ1<22.5 degrees". That is, the optical axis of the phase difference layer 50 is set to be tilted by θ1 (0 degree<θ1<22.5 degrees) with respect to the polarizing direction of the linearly polarized light that makes incident on the phase difference layer 50 after transmitting through the first polarizing plate 51.

Figure 26:
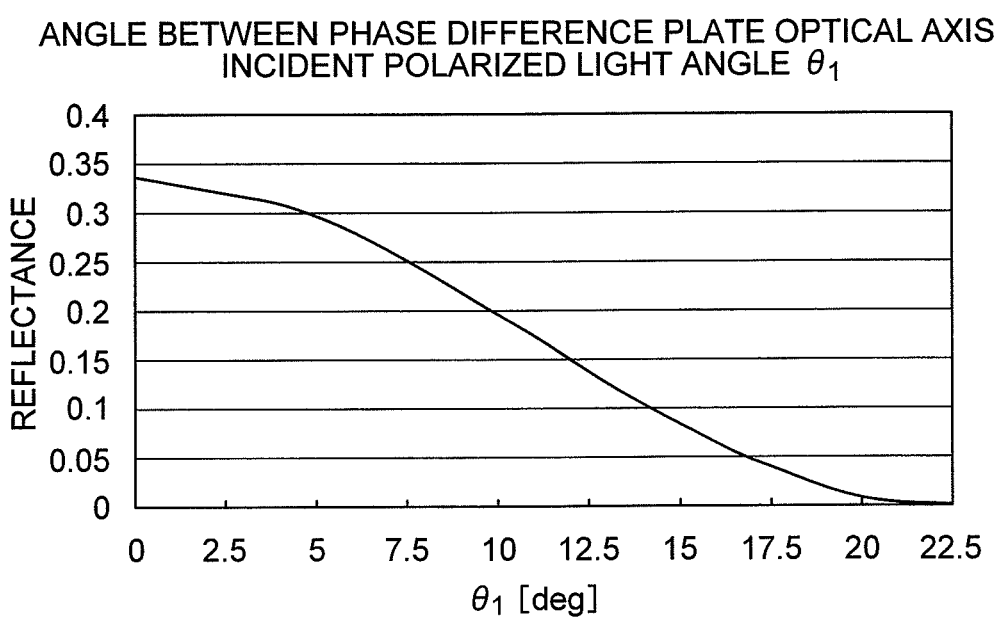
FIG. 26 is a graph showing a relation regarding the reflectance and an angle θ1 between the optical axis of a phase difference layer and the direction of linearly polarized light that makes incident from a polarizing plate.

FIG. 26 shows a relation regarding the reflectance and the angle θ1 between the optical axis of the phase difference layer 50 and the direction of the linearly polarized light that makes incident from the first polarizing plate 51. Assuming that the phase difference of the phase difference layer 50 with the light of 550 nm wavelength is λ/2, the reflectance in the reflection area 1 continuously changes when θ1 is within a range of 0 degree-22.5 degrees. At 22.5 degrees, the reflectance becomes 0%. Thus, θ1 is set to be less than 22.5 degrees. When θ1=0 degree, the polarized state of the linearly polarized light passing through the first polarizing plate 51 does not change, and the linearly polarized light passes through the liquid crystal layer 9, makes incident on the reflection plate 4 and reflected thereby, passes through the liquid crystal layer 9, and returns to the first polarizing plate 51. Thus, the reflectance becomes the maximum. However, an effect of achieving wide band to be described later cannot be obtained. Therefore, θ1 is set to be larger than 0 degree.

Formation of the phase difference layer 50 will be described. First, a polyimide alignment layer is formed on the counter substrate 8, the coated polyimide layer is calcined, and alignment processing is performed. Normally, rubbing or optical alignment is used for the alignment processing. Then, a phase difference layer material (liquid crystal polymer) is applied in a film thickness that provides prescribed retardation. In this state, the phase difference layer material that forms the phase difference layer 50 can be aligned in the alignment direction. Thus, ultraviolet rays are irradiated thereto in a nitrogen atmosphere at a room temperature for polymerization. Further, in order to increase the polymerization density, high-temperature processing is executed in the nitrogen atmosphere to form the phase difference layer 50.

Then, patterning processing is performed to keep the phase difference layer 50 only in the reflection area 1. Thereafter, an OC layer is laminated, and an adjustment is made so that the reflection area 1 and the transmission area 2 have a prescribed cell gap. The phase difference layer 50 can be formed on the outer side and the inner side of the substrate by using the liquid crystal polymer. However, other materials and methods may also be employed, if those materials can provide a prescribed alignment direction and retardation for the reflection area 1. As a measurement method of the retardation of such local phase difference layer patterned in this manner, there is a Senarmont method.

Explanations Regarding Operations of Exemplary Embodiment 6

Figure 27B:
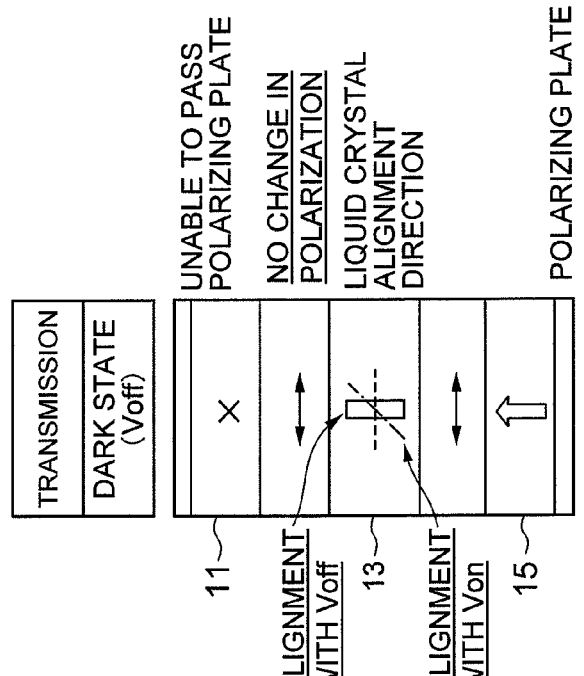
FIG. 27A and FIG. 27B are illustrations showing the polarized states of the light in the reflection area and the transmission area at the time of dark state.
Figure 27A:
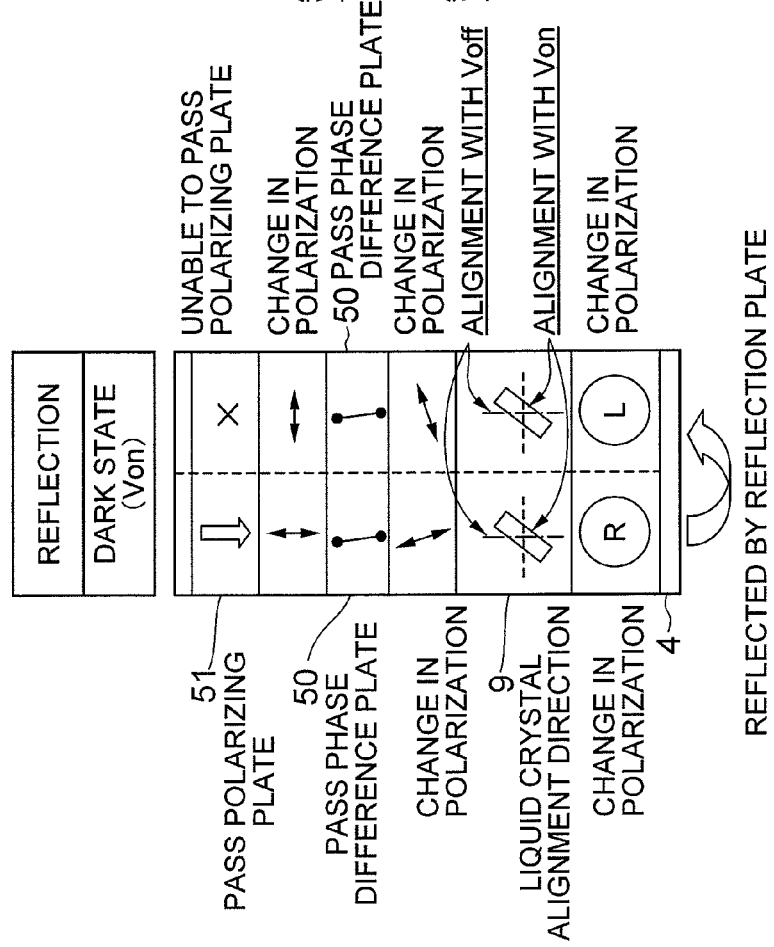

FIG. 27A and FIG. 27B are illustrations showing the polarized states of the light in the reflection area 1 and the transmission area 2 at the time of dark state. As a way of example, explanations will be provided herein assuming that the optical axis of the first polarizing plate 51 is 90 degrees, the liquid crystal alignment direction when no voltage is being applied is 90 degrees, and the optical axis of the phase difference layer 50 is 95 degrees (θ1=5 degrees). Further, it is assumed that birefringence index n=ne−no>0 where ne is the refractive index of an extraordinary light direction of the phase difference layer 50 and no is the refractive index of a normal light direction, and that nd=λ/2 where d is the thickness of the phase difference layer 50. In the reflection area 1, the space between the pixel electrode 29 and the common electrode 28 as well as the potential difference thereof are so set that alignment direction of the liquid crystal molecules of the liquid crystal layer 9 within the reflection area 1 are rotated by almost 35 degrees (=45 degrees−2θ1) in the state where the electric field is applied to the liquid crystal layer.

In the reflection area 1, as shown in FIG. 27A, the linearly polarized light of 90 degrees passing through the first polarizing plate 51 from the outside changes its polarized state when passing through the phase difference layer 50. It is converted to polarized light of 100 degrees that is rotated by 10 degrees from the incident linear direction, and then it makes incident on the liquid crystal layer 9. Under a voltage-applied, the liquid crystal layer 9 is rotated by 35 degrees from the initial alignment direction, and the difference between the polarizing direction (100 degrees) of the light that makes incident on the liquid crystal layer 9 and the liquid crystal alignment direction (90 degrees-35 degrees=55 degrees) becomes 45 degrees. By adjusting the retardation of the liquid crystal layer 9 to be almost λ/4 when the liquid crystal molecules are rotated by 35 degrees from the initial alignment direction, the linearly polarized light of 100 degrees that makes incident on the liquid crystal layer 9 turns into clockwise circularly polarized light to make incident on the reflection plate 4.

The clockwise circularly polarized light making incident on the reflection plate 4 is reflected thereby to be converted into counterclockwise circularly polarized light, and makes incident on the liquid crystal layer 9 again. The reflected light from the reflection plate 4 passes through the liquid crystal layer 9, which is converted into linearly polarized light (190 degrees=10 degrees) whose polarizing direction is rotated by 90 degrees from the linearly polarized light that made incident on the liquid crystal layer 9 from the first polarizing plate 51 side, and makes incident on the phase difference layer 50. The angle between this incident light and the optical axis of the phase difference layer 50 is 85 degrees, so that the polarizing direction of the linearly polarized light that makes incident on the first polarizing plate 51 from the phase difference layer 50 is 180 degrees (=0 degree), which is in parallel to the light absorption axis of the first polarizing plate 51. Therefore, the reflected light from the reflection plate 4 cannot passes through the first polarizing plate 51, thereby providing dark state in the reflection area 1.

For the phase difference layer 50, a phase difference layer having a positive birefringence or a phase difference layer having a negative birefringence can be used. When the phase difference layer having a positive birefringence is used for the phase difference layer 50, the wavelength dependencies are to be added up since the birefringence of the liquid crystal layer 9 is also positive. Thus, if the birefringence of the liquid crystal layer has the same value for each of the colors G, R, B, the colored part is to be amplified. In order to avoid this, the retardation may be set to satisfy the relation of "ndR (550) >ndG (550)>ndB (550)" in each of the regions R (650 nm), G (550 nm), and B (450 nm) within one pixel. That is, the retardation ndG (550) for the wavelength 550 nm of the area G (550) may be set as λ/2, the retardation ndR(550) for the area R (650) may be set larger than λ/2, and retardation ndB (550) for the area B (450) may be set smaller than λ/2. This makes it possible to cancel the wavelength dispersion characteristic of the liquid crystal layer by the phase difference layer 50, so that it is possible to broadening the band.

When the phase difference layer having a negative birefringence is used for the phase difference layer 50, with the same axis layout, the polarized state of light is changed at the phase difference layer 50 in a direction opposite from the change in the polarized state caused in the liquid crystal layer 9. The phase difference layer 50 and the liquid crystal layer 9 cancel the coloring due to the wavelength dispersion characteristic, so that it is possible to broadening the band in the reflection area 1.

Effects of Exemplary Embodiment 6

When the band is broadened in the reflection area 1, the part where the coloring is canceled is only the part between the reflection common electrode 28 and the reflection pixel electrode 29. Thus, in a case where the electrodes 28 and 29 are formed with a transparent electric conductor such as ITO, the light leakage on the electrodes appears as a noise. Thus, it is hard for the effect of canceling the coloring to come out as it is. However, the exemplary embodiment 6 employs the structure where light leakage on the electrodes 28 and 29 is suppressed. Therefore, there is no noise of the light leakage on the electrodes 28 and 29, so that the effect of canceling the coloring can be recognized prominently.

Exemplary Embodiment 7

Figure 28:
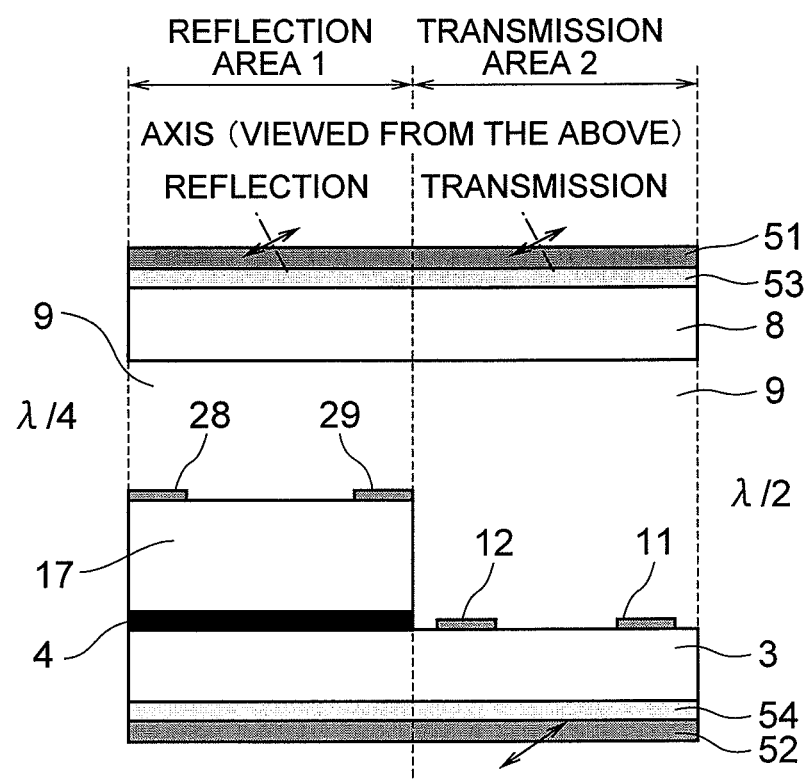
FIG. 28 is a sectional view showing a unit pixel that forms a liquid crystal panel of a liquid crystal display device according to an exemplary embodiment 6 of the invention.

FIG. 28 is a sectional view showing a unit pixel that forms a liquid crystal panel of a liquid crystal display device according to an exemplary embodiment 7 of the invention.

As shown in FIG. 28, the exemplary embodiment 7 has ½ wavelength phase layers 53 and 54 between the liquid crystal layer 9 and the polarizing plates 51, 52, which are provided, respectively, to the counter substrate 8 and the lower substrate 3.

Specifically, as shown in FIG. 28, the exemplary embodiment 7 has the polarizing plate 51, the ½ wavelength phase layer 53, the counter substrate 8, the liquid crystal layer 9, the lower substrate 3, the ½ wavelength phase layer 54, and the polarizing plate 52 in order, when viewed from the display plane side. This liquid crystal display device is configured as a transflective liquid crystal display device that has the reflection area 1 and the transmission area 2 within a unit pixel.

In the transmission area 2, at the time of dark state, the polarizing axis and the arranged angle of the liquid crystal molecule major axis are so set that linearly polarized light passing through the polarizing plate 52 from a backlight source side passes through the ½ wavelength phase layer 54, the liquid crystal layer 9, and the ½ wavelength phase layer 53 turns into linearly polarized light when making incident on the polarizing plate 51, and the polarizing direction thereof matches with the absorption axis direction of the polarizing plate 51.

Further, angle θ2 between the optical axis (optical axis or optical axis+90 degrees) direction of the liquid crystal layer 9 at the time of dark state and the polarizing direction of the light that makes incident on the liquid crystal layer 9 is set to be within a range of "0 degree<θ2<45 degrees" or desirably in a range of "0 degree<θ2≦22.5 degrees". In the followings, explanations will be provided assuming that a light transmitting direction of the polarizing plate 51 is 27 degrees, an optical axis direction of a first λ/2 plate 18 is 109.5 degrees, a light transmitting direction of the second polarizing plate 52 is 63 degrees, an optical axis direction of the ½ wavelength phase layer 54 is 70.5 degrees, a molecule major axis direction of the liquid crystal layer 9 when no voltage is being applied is 90 degrees, and the angle θ2 between the linearly polarized light that makes incident on the liquid crystal layer 9 from the ½ wavelength phase layer 54 and the liquid crystal optical axis direction (major axis direction) is 12 degrees.

Explanations Regarding Operations of Exemplary Embodiment 7

FIG. 28A and FIG. 28B are illustrations showing the polarized states of the light in the reflection area 1 and the transmission area 2 at the time of dark state. The alignment direction of the liquid crystal molecules of the liquid crystal layer 9 within the reflection area 1 is rotated by 33 degrees (=45 degrees−θ2(12 degrees)) by the electric field between the pixel electrode 29 and the common electrode 28. That is, the molecule major axis direction is changed from 90 degrees to 57 degrees.

Figure 29:
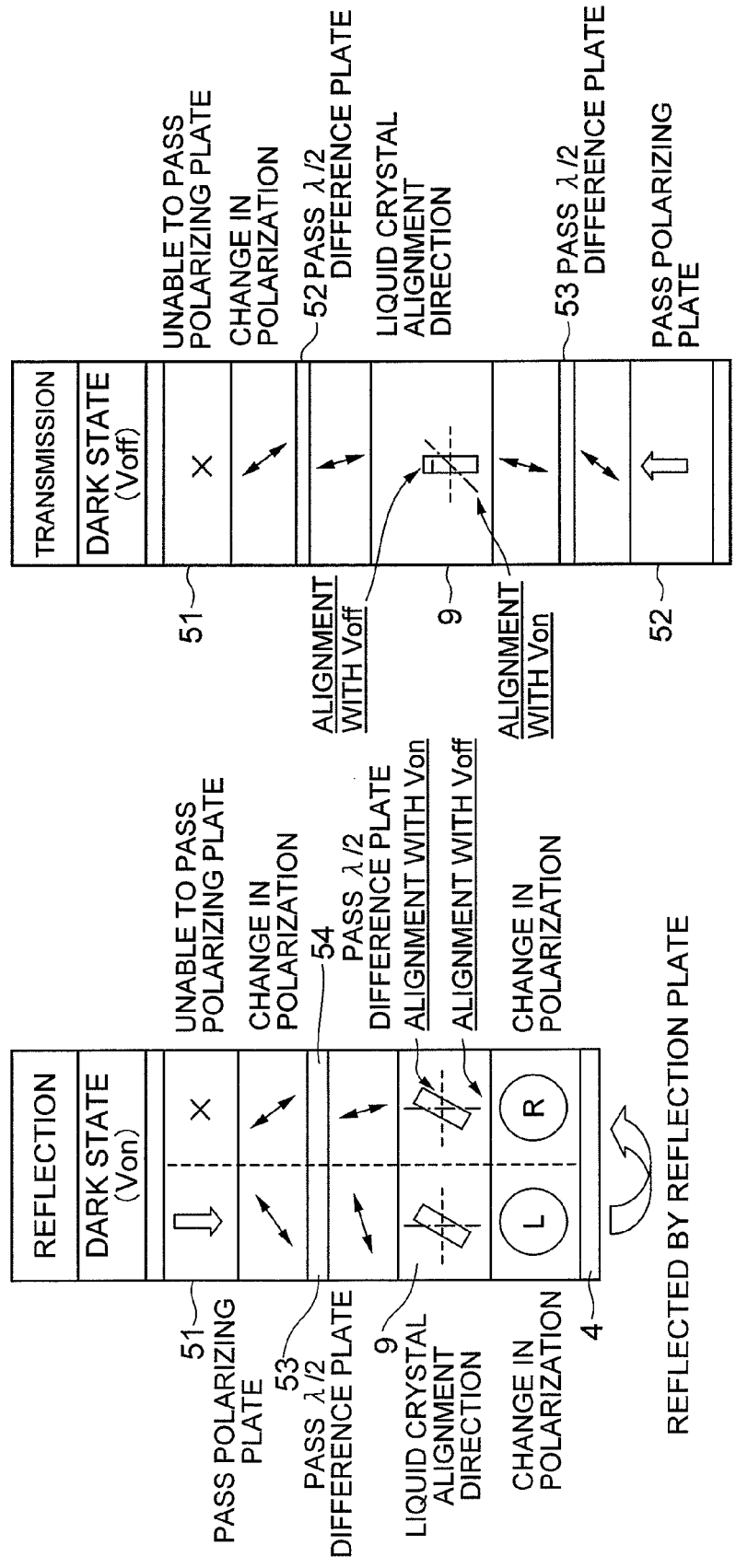
FIG. 29A and FIG. 29B are illustrations showing the polarized states of the light in the reflection area and the transmission area at the time of dark state.

In the reflection area 1, as shown in FIG. 29A, the polarizing direction of the linearly polarized light of 27 degrees passing through the polarizing plate 51 from the outside changes by 12 degrees when passing through the ½ wavelength phase layer 53, and makes incident at an angle of 45 degrees with respect to the liquid crystal optical axis. The polarized state of this incident light changes when passing through the liquid crystal layer 9 and turns into counterclockwise circularly polarized light, which is then reflected by the reflection plate 4 to be converted into clockwise circularly polarized light. Then, the clockwise circularly polarized light passes through the liquid crystal layer 9 again, turns into the linearly polarized light of 102 degrees, passes through the ½ wavelength phase layer 53, and turns into linearly polarized light of 117 degrees. Therefore, the reflected light from the reflection plate 4 cannot pass through the polarizing plate 51, thereby providing dark state in the reflection area 1.

In the meantime, the alignment direction of the liquid crystal molecules of the liquid crystal layer 9 remains as 90 degrees in the transmission area 2. In the transmission area 2, as shown in FIG. 29B, the linearly polarized light of 63 degree passing through the polarizing plate 52 passes through the ½ wavelength phase layer 54, and makes incident on the liquid crystal layer 9 with the polarizing direction being changed to 78 degrees. Since the molecule major axis direction of the liquid crystal layer 9 is 90 degrees, the linearly polarized light of 78 degrees making incident on the liquid crystal layer 9 passes therethrough and turns into linearly polarized light of 102 degrees. This linearly polarized light of 102 degrees passes through the ½ wavelength phase layer 53 and turns into the polarized light of 117 degrees. This light cannot pass through the polarizing plate 51 whose optical transmission axis direction is 27 degrees. Thus, the transmission area 2 comes to provide dark state.

The ½ wavelength phase layer is provided in the reflection area 1, so that it is possible to suppress the wavelength dispersion characteristic in the liquid crystal layer 9 of the reflection area at the time of dark state. In the transmission area 2, the angle between the alignment direction of the liquid crystal layer 9 and the polarizing direction of the light that makes incident on the liquid crystal layer 9 is set to be in a range of "0 degree<θ2<45 degrees" or "0 degree<θ2≦22.5 degrees". Therefore, it is possible to suppress the influence of the wavelength dispersion characteristic in the liquid crystal layer 9 as in the case of the reflection area.

Effects of Exemplary Embodiment 7

When the band is broadened in the reflection area 1, the part where the coloring is canceled is only the part between the reflection common electrode and the reflection pixel electrode. Thus, in a case where the electrodes are formed with a transparent electric conductor such as ITO, the light leakage on the electrodes 28 and 29 appears as a noise. Thus, it is hard for the effect of canceling the coloring to come out as it is. However, the exemplary embodiment 7 employs the structure where light leakage on the electrodes 28 and 29 is suppressed. Therefore, there is no noise of the light leakage on the electrodes 28 and 29, so that the effect of canceling the coloring can be recognized prominently. Further, it is possible to reduce the number of manufacturing steps compare to that of the exemplary embodiment 6, since it is unnecessary with the exemplary embodiment 7 to perform patterning of the phase difference layer.

Exemplary Embodiment 8

Figure 30:
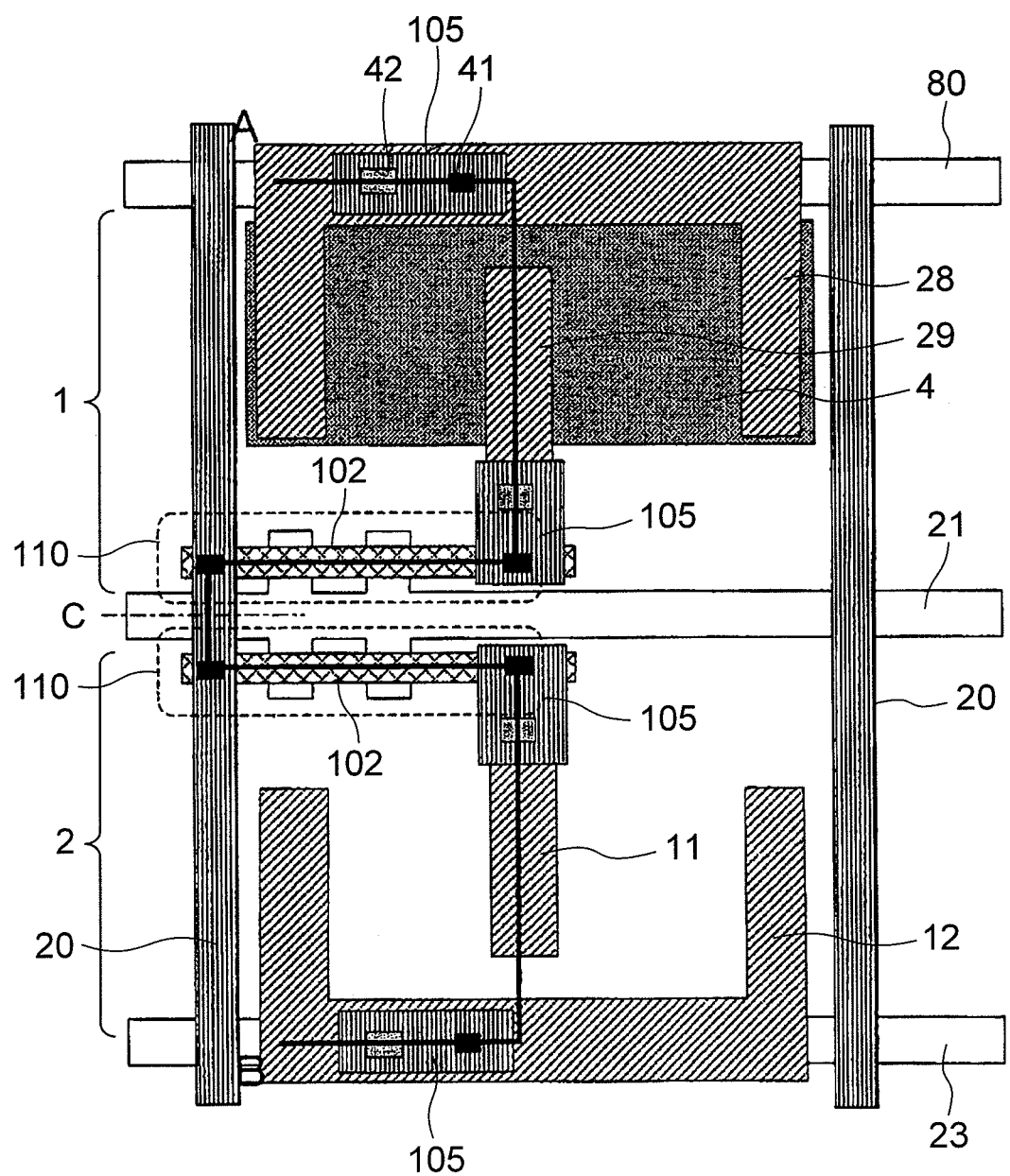
FIG. 30 is a plan view showing a unit pixel that forms a liquid crystal panel of a liquid crystal display device according to an exemplary embodiment 8-1 of the invention.
Figure 31:
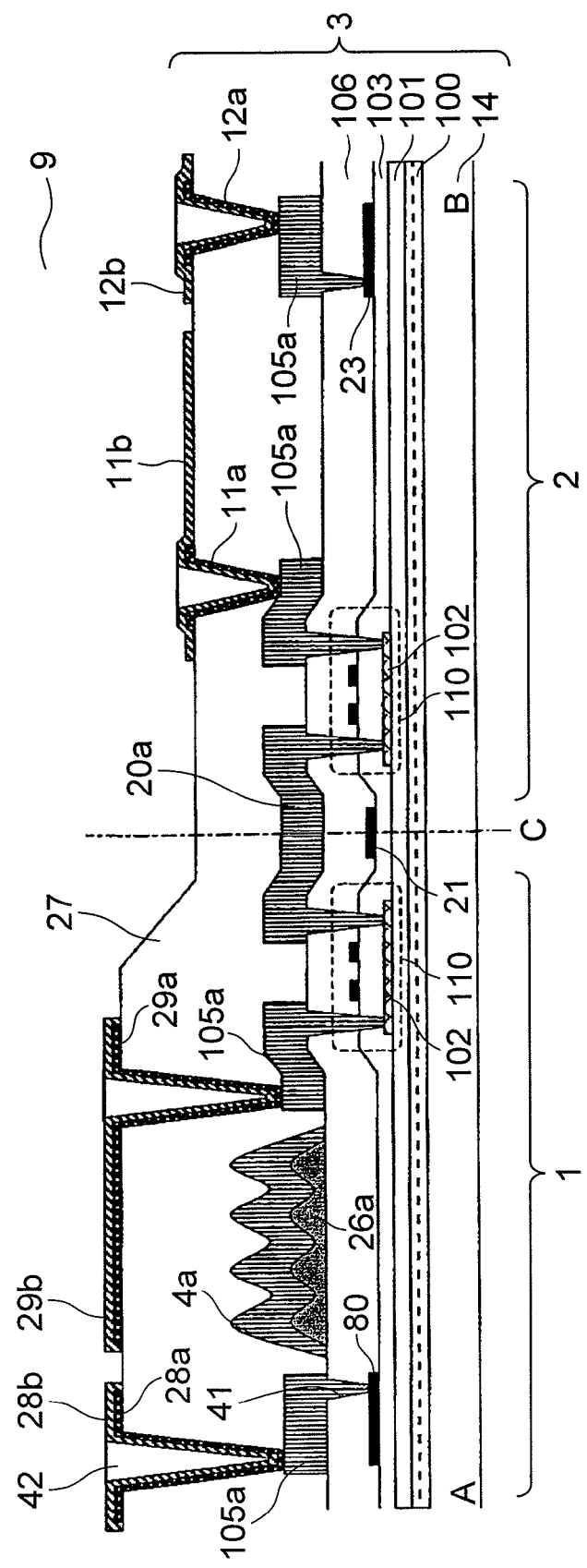
FIG. 31 is a sectional view taken along A-C-B of the unit pixel shown in FIG. 1.

As shown in FIG. 30 and FIG. 31, as a basic structure, a liquid crystal display device according to an exemplary embodiment 8 of the present invention has following features. That is, the liquid crystal display device has the reflection area 1 in a unit pixel that forms a liquid crystal panel. The reflection area 1 is driven with a lateral electric field mode and normally-white. Driving electrodes (reflection common electrode 28 and reflection pixel electrode 29) which form an electric field on a liquid crystal layer 9 of the reflection area 1 are provided on the reflection plate 4 via the insulating film (flattening film 27), and the driving electrodes are formed with a laminated structure of a non-transparent electric conductor and an oxide.

This embodiment is capable of achieving effects of suppressing the light leakage at the time of dark state and performing patterning of the electrodes of the reflection area with high precision. In addition, it is possible to achieve an effect of reducing the manufacturing cost and manufacturing time for the lower substrate, since the reflection plate 4 is formed with a same film as that of the scanning line 21 and the data line 20 so that a series of steps for fabricating the reflection plate, such as depositing a film, applying resist, performing exposure, development, and etching, can be omitted from the manufacturing steps.

Further, through forming the antireflection layer on the top face of the reflection common electrode 28 and the reflection pixel electrode 29, it is possible to suppress an amount of light that makes incident on the reflection common electrode 28 and the reflection pixel electrode 29 from the liquid crystal layer 9 and reflected thereby. Therefore, at the time of dark state in the reflection area 1, it is possible to provide a high contrast ratio through suppressing the reflection from the reflection common electrode 28 and the reflection pixel electrode 29.

For investigating the contrast ratio of the electrodes for the liquid crystal layer 9, optical constants of the non-transparent electric conductors and the antireflection layers was measured by an ellipsometer. FIG. 48 shows refractive indexes n and extinction coefficients k of typical materials which are measured actually. All the values are values at the wavelength of 550 nm. By using those optical constants, the reflectance in three layers of the liquid crystal layer 9, the antireflection layer, and the non-transparent electric conductor was calculated through conducting computer simulations by changing the thickness of the antireflection layer.

As shown in FIG. 21, when the reflectance of the electrode is decreased, the reflection contrast ratio is increased. The reflectance was calculated through the computer simulations, and ranges of the values of the refractive index n and the extinction coefficient k of the electric conductor as well as the refractive index n and the extinction coefficient k of the antireflection layer (antireflection film) desired for decreasing the reflectance were investigated. The layer structure employed in the simulations was "liquid layer/electric conductor (200 nm)" or "liquid crystal layer/antireflection layer (80 nm)/electric conductor (200 nm)". The reflectance was evaluated at the wavelength of 550 nm in all the cases.

First, conducted was the simulation on a single layer of non-transparent electric conductor in the structure of "liquid crystal layer/electric conductor (200 nm)".

Figure 49:
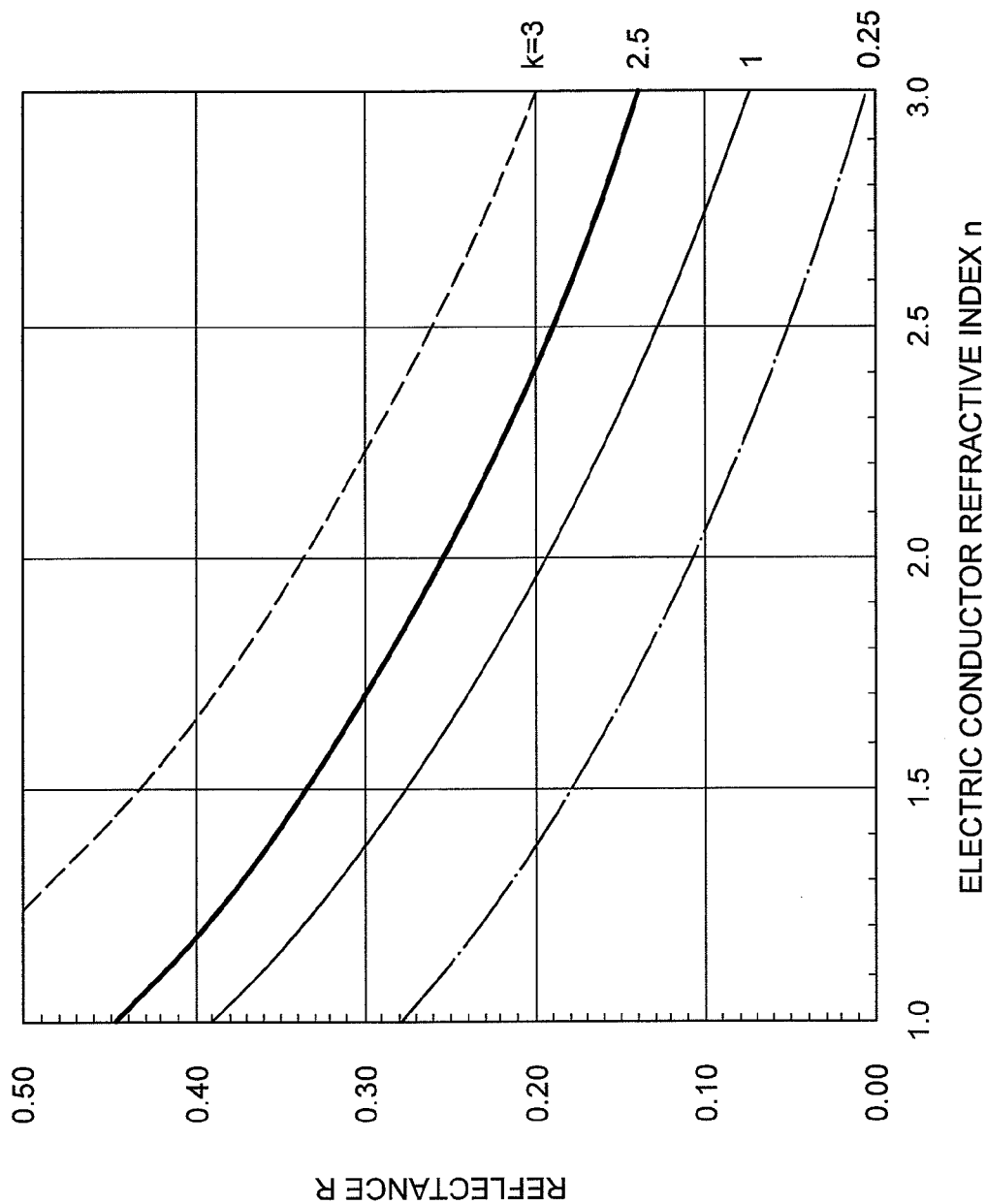
FIG. 49 is an illustration showing a result of a computer simulation conducted on the reflectance R with respect to the refractive index n in a case with a non-transparent electric conductor layer alone.

FIG. 49 shows reflectance R when the refractive index n of the electric conductor was changed for various extinction coefficients k. In all the cases, there was observed a decrease in the reflectance R in accordance with an increase in the refractive index n.

Figure 50:
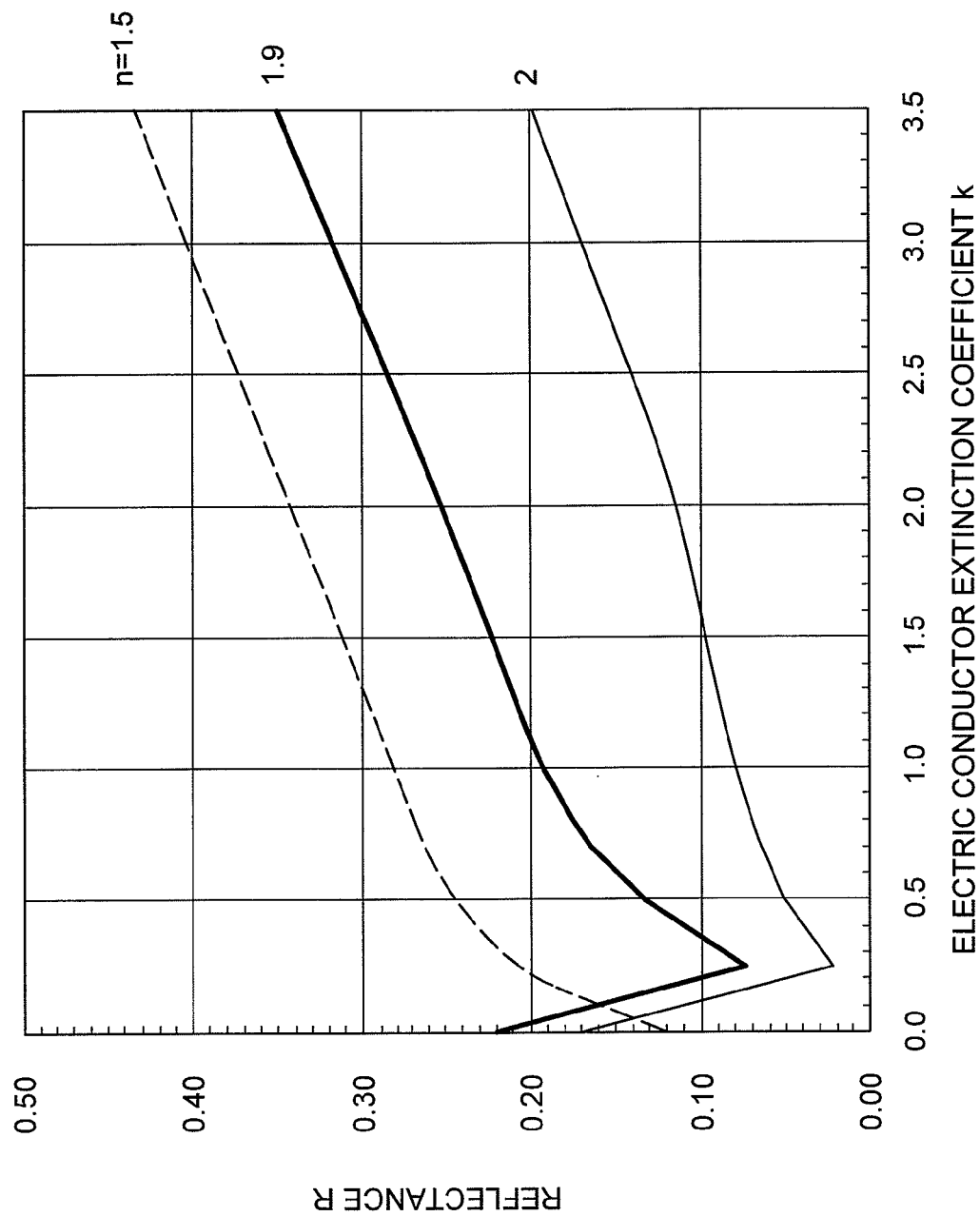
FIG. 50 is an illustration showing a result of a computer simulation conducted on the reflectance R with respect to the extinction coefficient k in a case with the non-transparent electric conductor layer alone.

FIG. 50 shows the reflectance R when extinction coefficient k of the electric conductor was changed for various refractive indexes n. In all the cases, the reflectance R took minimum values with the extinction coefficient k of 0.5 or less, and the reflectance R increased in accordance with the increase in the value of the extinction coefficient k. From those results, it is found that the extinction coefficient K and the refractive index n influence with each other, and that a desirable range for decreasing the reflectance R in terms of the refractive index n is "n=1.0-4.0" and in terms of the extinction coefficient k is "k=0.25-5.5" for the non-transparent electric conductor by having the curve of "k=0.25" of FIG. 49 and the curve of "n=1.50" of FIG. 50 as the base. With such ranges, the contrast can be increased. More desirably, it is found that still higher contrast can be obtained with the ranges of "n=1.3-2.5," and "k=1.6-3.3".

Then, based on the simulation results of the single layer of non-transparent electric conductor described above, simulations were conducted on two layers of the antireflection layer and the non-transmission electric conductor having the "liquid crystal layer/antireflection layer (80 nm)/electric conductor (200 nm)" structure. The refractive index n of the conductor was set as 1.9, and the extinction coefficient k was set as 2.45.

Figure 51:
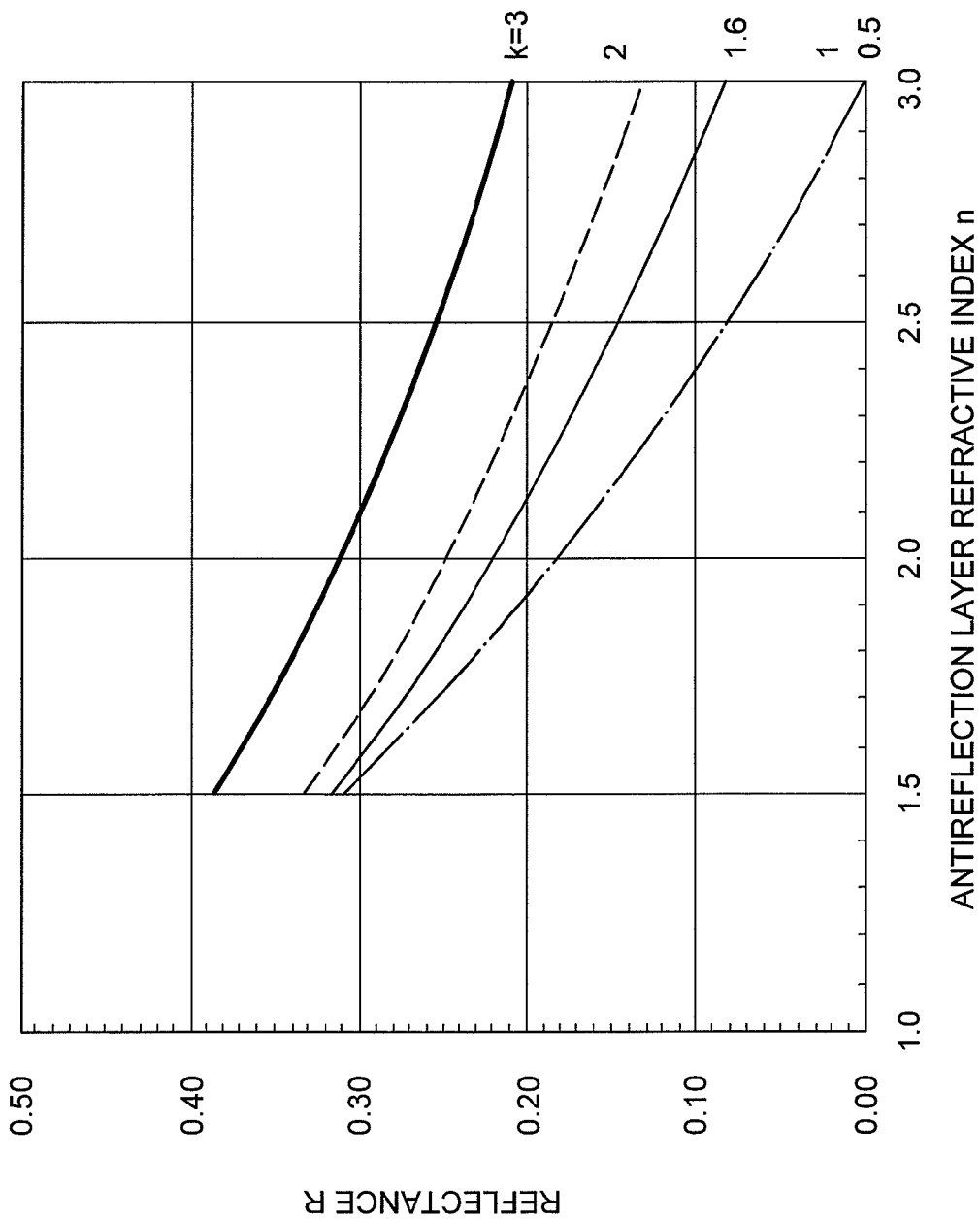
FIG. 51 is an illustration showing a result of a computer simulation conducted on the reflectance R with respect to the refractive index n in a case with two layers of an antireflection layer and a non-transparent electric conductor layer.

FIG. 51 shows the results of studies conducted on the reflectance R with respect to the refractive index n of the antireflection layer. The reflectance R decreased in a logarithmic functional manner in accordance with an increase in the refractive index n of the antireflection film. This tendency was also observed with different extinction coefficient k. Thus, it is found that the reflectance becomes smaller when the extinction coefficient k is decreased, provided that the refractive index is the same.

Figure 52:
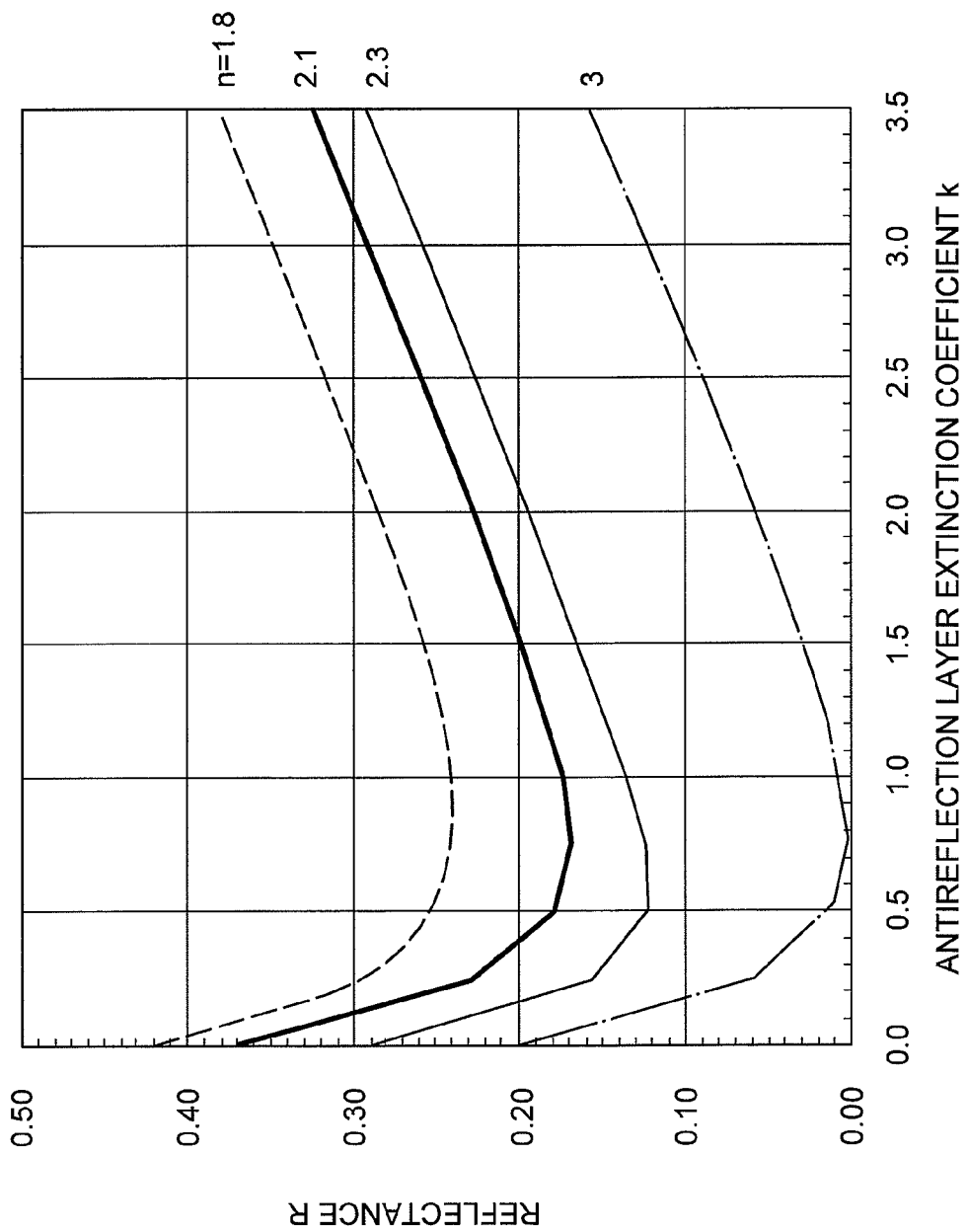
FIG. 52 is an illustration showing a result of a computer simulation conducted on the reflectance R with respect to the extinction coefficient k in a case with the two layers of the antireflection layer and the non-transparent electric conductor layer.
Figure 53:
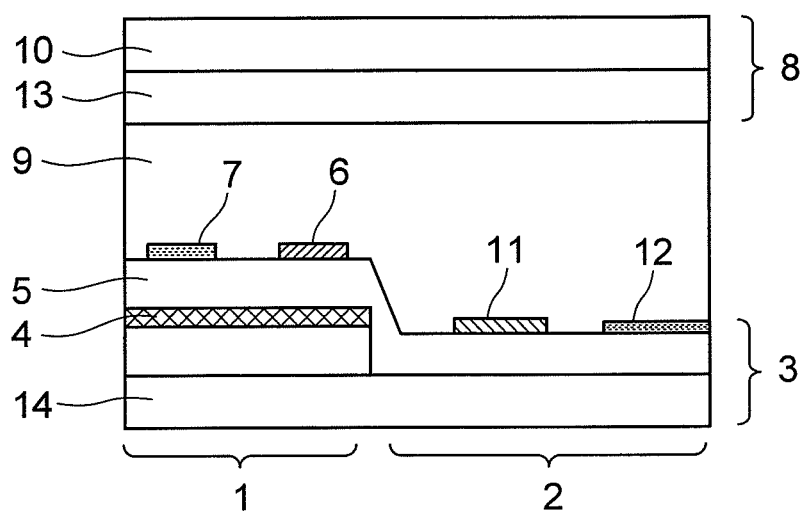
FIG. 53 is a sectional view showing a unit pixel of a transflective liquid crystal display device in which the liquid crystal is driven with a lateral electric field mode in the reflection region and in a lateral electric field in the transmission area.
Figure 54:
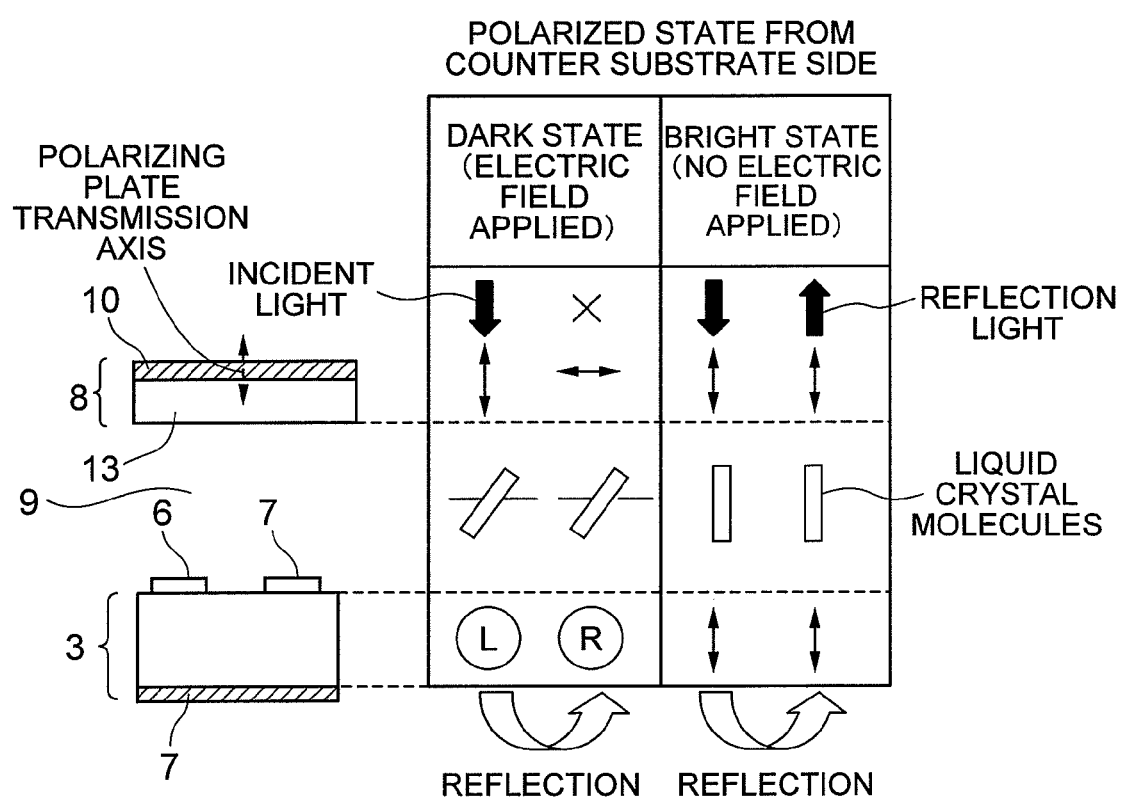
FIG. 54 is an illustration showing polarized state of a reflection area according to a related technique.

FIG. 52 shows the results of studies conducted on the extinction coefficient K and the reflectance R of the antireflection layer. In accordance with the increase in the extinction coefficient k of the antireflection layer, the reflectance R decreased drastically, and then increased gently. The cases of different refractive indexes n are shown in the drawing, however, the same tendency can be observed in all the cases. It can be seen from the results that the reflectance R decreases as the refractive index n increases.

Based on those results, it is found that the contrast is increased when the antireflection layer has the refractive index n and the extinction coefficient n in the ranges of "n=1.5-3.0" and "k=0-3.5", in addition to having the desirable ranges of the refractive index n and the extinction coefficient k of the non-transparent electric conductor with which the contrast is increased. More desirably, it is found that practically a yet higher contrast can be obtained with the ranges of "n=2.0-3.0," and "k=0.01-2.0".

From the results of the investigation such as the simulations, it is found that the refractive index n and the extinction coefficient k of the same material can vary depending on the film-forming method (vapor deposition, sputtering, MBE, or the like). Those also may vary depending on the conditions (gas pressure, substrate temperature, distance between the target and the substrate, etc., in case of sputtering, for example), even if the same film-forming method is employed. From those fluctuations, it is found that the relations between the optical constants of each material (non-transparent electric conductor and antireflection layer) largely affect on the contrast ratio.

Furthermore, while provided in the simulation was double layers of the antireflection layer and the non-transparent electric conductor for the liquid crystal layer 9, it is also possible to obtain the similar effect for increasing the contrast ratio when a layer having the values of the optical constants within the above-described range is inserted between the two layers. Therefore, a laminated structure of three or more layers or a structure having gradient distribution between the antireflection layer and the non-transparent electric conductor (structure where the ratios of the materials for both the antireflection layer and the non-transparent electric conductor gradually change towards the depth direction) may also be employed.

Figure 32A:
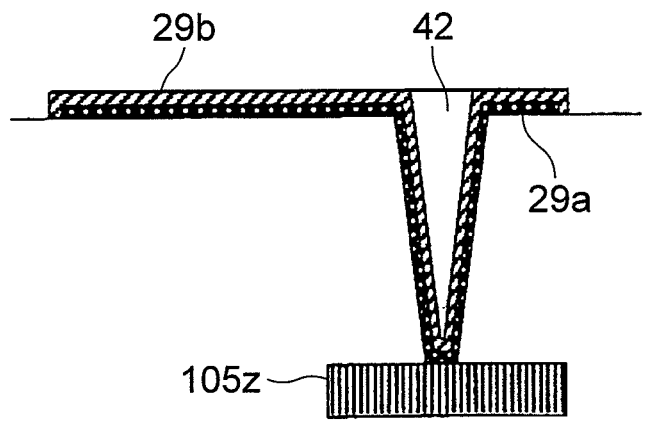
FIG. 32A, FIG. 32B, and FIG. 32C are sectional views of a pixel electrode according to the exemplary embodiments 8 of the invention.
Figure 32B:
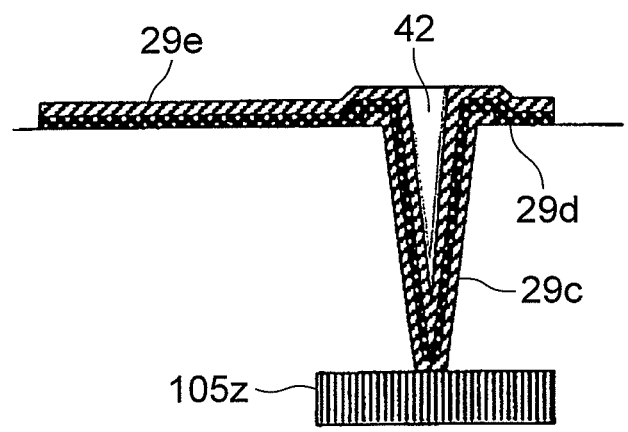
Figure 32C:
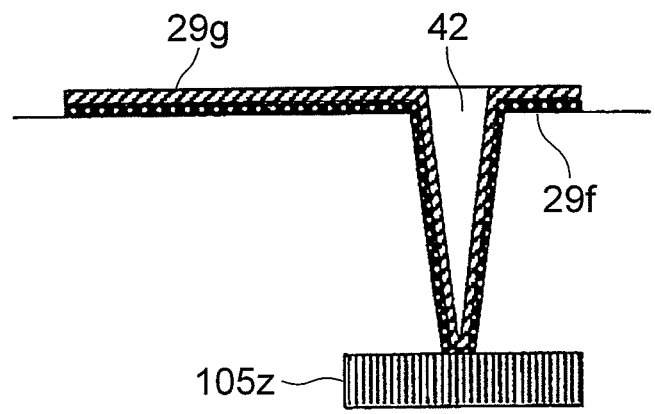
Figure 33D:
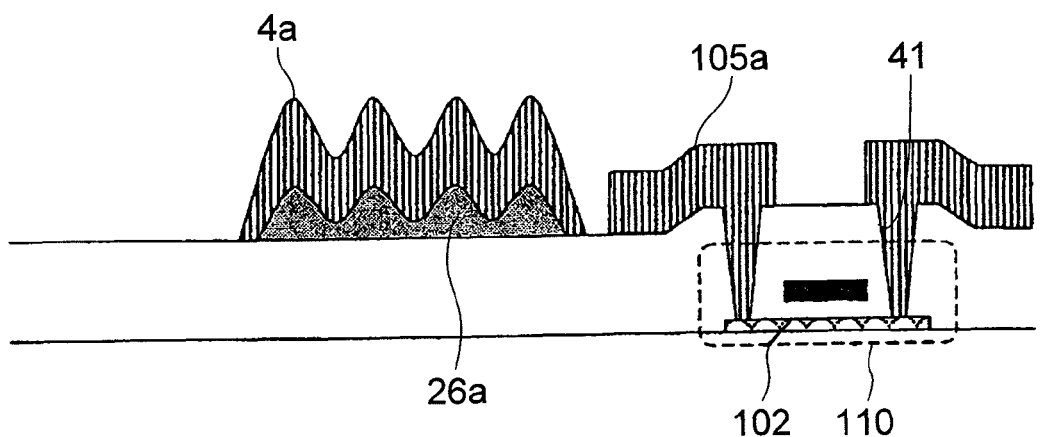
FIG. 33D and FIG. 33E are sectional views of a reflection plate according to the exemplary embodiments 8 of the invention.
Figure 33E:
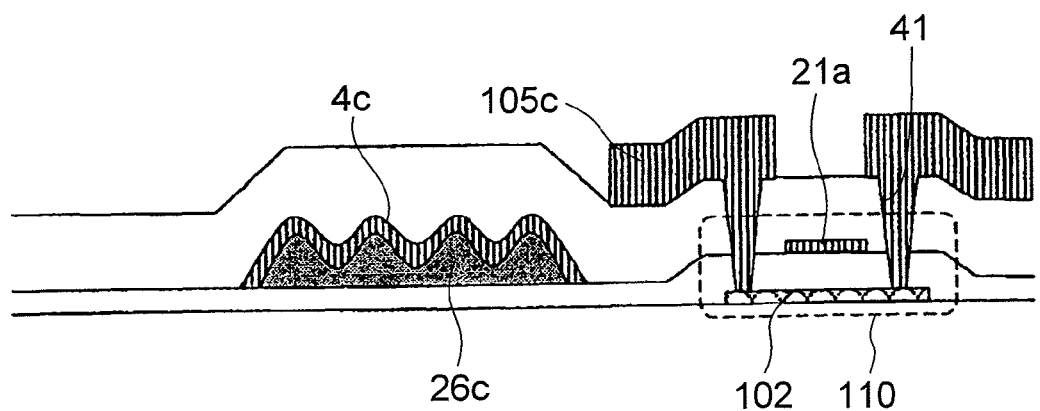

Next, the exemplary embodiment 8 will be described by referring to sectional views of the electrode structure and the reflection plate structure shown in FIG. 32 and FIG. 33. FIG. 32A, FIG. 32B, and FIG. 32C show the sectional views of the electrode structure, and FIG. 33A and FIG. 33B show the sectional views of the reflection plate structure.

First, the electrode structure will be described by referring to FIG. 32A. Reflection pixel electrodes 29a and 29b are formed for a transfer wiring 105z. The reflection pixel electrode 29a is formed with a non-transparent metallic material, and the reflection pixel electrode 29b is formed with a low-reflectance material that produces an effect of preventing the reflection. In this structure, after forming a second contact hole 42 for the transfer wiring 105z, a non-transparent electric conductive material is deposited, resist is patterned, etched, and exfoliated to form the reflection pixel electrode 29a. Then, a low-reflectance material is deposited, resist is patterned, etched, and exfoliated to form the reflection pixel electrode 29b.

Next, another electrode structure will be described by referring to FIG. 32B. Reflection pixel electrodes 29c, 29d, and 29e are formed for the transfer wiring 105z. The reflection pixel electrode 29d is formed with a non-transparent metallic material, and the reflection pixel electrodes 29c and 29e are formed with a low-reflectance material that produces an effect of preventing the reflection. In this structure, after forming the second contact hole 42 for the transfer wiring 105z, a low-reflectance material is deposited, resist is patterned, etched, and exfoliated to form the reflection pixel electrode 29c. Then, a laminated layer of the non-transparent electric conductive material and the low-reflectance material is deposited, resist is patterned, etched, and exfoliated to form the reflection pixel electrodes 29d and 29e.

Still another electrode structure will be described by referring to FIG. 32C. Reflection pixel electrodes 29f and 29g are formed for the transfer wiring 105z. The reflection pixel electrode 29f is formed with a non-transparent metallic material, and the reflection pixel electrode 29g is formed with a low-reflectance material that produces an effect of preventing the reflection. In this structure, after forming the second contact hole 42 for the transfer wiring 105z, a laminated layer of the non-transparent electric conductive material and the low-reflectance material is deposited, resist is patterned, etched, and exfoliated to form the reflection pixel electrodes 29g and 29f.

Furthermore, the reflection plate structure will be described by referring to FIG. 33A. In this drawing, a part of the switching device 10, the transfer wiring 105a connected thereto, and the reflection plate 4a formed on a same layer as the transfer wiring 105a are illustrated. In this structure, a step of fabricating the reflection plate 4a is the same step for fabricating the transfer wiring 105a (step for fabricating data line). Thus, the number of steps for performing resist patterning can be reduced compared to a case where the reflection plate 4a is formed individually. Therefore, it is possible to achieve an effect of reducing the time and cost.

Next, another reflection plate structure will be described by referring to FIG. 33B. In this drawing, a part of a switching device 110, a transfer wiring 105c connected thereto, and a reflection plate 4c formed on a same layer as a gate electrode 21a are illustrated. In this structure, a step of fabricating the reflection plate 4c is the same step for fabricating the gate electrode 21a (step for fabricating scanning line). Thus, the number of steps for performing resist patterning can be reduced compared to a case where the reflection plate 4c is formed individually. Therefore, it is possible to achieve an effect of reducing the time and cost.

Next, the liquid crystal display device according to the exemplary embodiment 8 will be described in detail by referring to more concrete exemplary embodiments.

Exemplary Embodiment 8-1

FIG. 30 is a plan view of the lower substrate 3, showing a unit pixel that forms the liquid crystal panel of the liquid crystal display device according to the exemplary embodiment 8-1 of the present invention. FIG. 31 is a sectional view taken along a thick line A-C-B of FIG. 30. The unit pixel has the reflection area 1 and the transmission area 2, and the corresponding ranges are being sectioned with the data lines 20 and the scanning lines 21 provided in matrix on the liquid crystal panel.

(Explanations of Electric Connections based on Drawings of Plan Structure)

Explanations will be provided by referring to FIG. 30. The switching device 110 corresponding to a unit pixel has a gate electrode, a source electrode, a drain electrode, and a polycrystalline silicon layer 102, and it is provided in the vicinity of each intersection between the scanning lines 21 and the data lines 20. Each of the reflection area 1 and the transmission area 2 is driven by the switching device 110.

The gate electrode is electrically connected to the scanning line 21, and the drain electrode is electrically connected to the data line 20 via a first contact hole 41. The source electrode is connected once to the transfer wiring 105 via the first contact hole 41, and then connected electrically to the reflection pixel electrode 29 or the transmission pixel electrode 11 via the second contact hole 42. Further, a reflection common wiring 80 is connected to the transfer wiring 105 via the first contact hole 41, and further connected to the reflection common electrode 28 electrically via the second contact hole 42. Similarly, a transmission common wiring 23 is also electrically connected to the transmission common electrode 12 via the transfer wiring 105. There are a large number of first contact holes 41 and second contact holes 42, but reference numerals are applied only one each of those (same for the explanations provided hereinafter).

The reflection common electrode 28 and the reflection pixel electrode 29 are formed in parallel and opposing to each other. The liquid crystal layer 9 (FIG. 31) on the reflection area 1 is driven with a lateral electric field mode by the electric field between the reflection common electrode 28 and the reflection transmission electrode 29. Similarly, the transmission common electrode 12 and the transmission pixel electrode 11 are formed in parallel and opposing to each other. The liquid crystal layer 9 (FIG. 31) on the transmission area 2 is driven with a lateral electric field mode by the electric field between the transmission common electrode 12 and the transmission pixel electrode 11.

(Reflection Plate Fabricating Method 1)

A manufacturing process of the lower substrate 3 will be described in detail from the lower layer towards the upper layer by referring to FIG. 31. First, a base silicon nitride film 100 in a thickness of 50 nm is formed on a glass substrate 14 by plasma CVD (Chemical Vapor Deposition). Subsequently, a base silicon oxide film 101 is deposited in a thickness of 100 nm. An amorphous silicon film is deposited thereon in a thickness of 50 nm, and dehydrogenation treatment is performed. Thereafter, boron with a concentration of about $5\times10^{12}$ cm$^{-2}$ is introduced by ion implantation to control the channel impurity concentration of the thin film transistor. Thereafter, the amorphous silicon film is changed into the polycrystalline silicon layer 102 by excimer laser annealing, i.e., by irradiating XeCl excimer laser beams with an intensity of about 430 mJ·cm$^{-2}$. Subsequently, resist patterning is performed by applying resist and performing exposure as well as development (the procedure from applying resist to performing development is referred to as "resist patterning" in short hereinafter). After processing the polycrystalline silicon layer 102 into an island shape by dry etching, the resist is exfoliated. After performing resist patterning for the source region and the drain region of the thin film transistor as the switching device 110, boron with a concentration of about $2\times10^{15}$ cm$^{-2}$ is doped. After exfoliating the resist, a gate oxide film 103 is formed in a thickness of 120 nm by plasma CVD using TEOS (Tetraethocysilane).

After forming the gate oxide film 103, microcrystal silicon in a thickness of 100 nm is deposited by plasma CVD, and Cr in a thickness of 200 nm is deposited by sputtering. Thereafter, resist patterning is performed, and the electrode gate, the scanning line 21, the reflection common wiring 80, and the transmission common wiring 23 are formed by dry etching. After exfoliating the resist, an LDD (Lightly Doped Drain) structure of the thin film transistor is formed by ion implantation (boron with a concentration of about 3×1013 cm-2). Then, a silicon nitride film 106 in a thickness of 400 nm is deposited by plasma CVD, and activation treatment is performed further (at a temperature of 450 degrees Celsius for 60 minutes). Subsequently, hydrogenation treatment is performed (at a temperature of 390 degrees Celsius for 30 minutes).

Further, a novolac organic film is applied in a thickness of 1 μm to a part corresponding to the reflection area 1 for forming an uneven film 26a that has uneven shapes on the surface. Then, resist patterning is performed, and calcination is performed at 230 degrees Celsius for 2 hours to form the smooth uneven film 26a. Then, resist patterning for forming the first contact hole 42 is performed. Subsequently, after performing dry etching and wet etching, the resist is exfoliated.

After forming the first contact hole 41, Al–1.5 wt % Si in a thickness of 300 nm is sputtered. Then, after performing resist patterning and dry etching, the resist is exfoliated. Through these steps, the reflection plate 4a, the data line 20a, and the transfer wiring 105a are formed.

By forming the reflection plate 4a (to be formed in a part corresponding to the reflection area 1) on the uneven film 26a, the surface thereof comes to have uneven shapes by conforming to the shapes on the surface of the uneven film 26a. Thus, the reflection plate 4a diffusively reflects the light that makes incident on the liquid crystal panel. Further, PMMA (polymethyl methacrylate) is applied in a thickness of 1 μm, and calcination is performed at 250 degrees Celsius for 1 hour to form the flattening film 27. Thereafter, resist patterning for forming the second contact hole 42 is performed, and the resist is exfoliated after performing dry etching to form the second contact hole 42 on the transfer wiring 105a. The uneven film 26a and the flattening film 27 also have a function of setting the thickness of the liquid crystal layer 9 in the transmission area 2 and the reflection area 1. A step (difference) between the transmission area 2 and the reflection area 1 is in a thickness of about 1 μm, considering the phase difference of the reflection area 1. The resist patterning is performed for seven times until the second contact hole 42 is formed.

Further, the transfer wiring 105, the reflection plate 4, the uneven film 26 (not shown) formed in the lower layer of the reflection plate 4, and the data line 20 shown in FIG. 30 correspond, respectively, to the transfer wiring 105a, the reflection plate 4a, the uneven film 26a, and the data line 20a of FIG. 31 that shows the reflection plate fabricating method, and those have the same functions.

(Electrode Fabricating Method 1)

After forming the second contact hole 42, Ti in a thickness of 200 nm is deposited on the flattening film 27 by sputtering. Thereafter, resist patterning is performed, and dry etching is performed to eliminate regions other than the second contact hole 42 part to be the transmission common electrode 12a and the transmission pixel electrode 11a, and the part to be the reflection common electrode 28a and the reflection pixel electrode 29a. After exfoliating the resist, ITO is deposited by sputtering in a thickness of 40 nm which provides the highest effect for preventing reflection. Then, resist patterning is performed, wet etching is performed, and resist is exfoliated to form the whole surfaces of the transmission common electrode 12b and the transmission pixel electrode 11b as well as the reflection common electrode 28b and the reflection pixel electrode 29b.

Through the above-described steps, the upper parts of the reflection common electrodes 28a, 28b, and the reflection pixel electrodes 29a, 29b of the reflection area 1 on the flattening film 27 are formed with an electric conductor (ITO) that has a function of preventing reflection, and the lower parts thereof are formed with a non-transparent electric conductor (Ti). In the meantime, the transmission common electrodes 12a, 12b and the transmission pixel electrodes 11a, 11b of the transmission area 2 are formed with a single layer of ITO, except for the area of the second contact hole 42. With this electrode fabricating method, resist patterning is performed twice.

Further, the reflection common electrode 28, the reflection pixel electrode 29, the transmission common electrode 12, and the transmission pixel electrode 11 shown in FIG. 30 correspond, respectively, to the reflection common electrodes 28a, 28b, the reflection pixel electrodes 29a, 29b, the transmission common electrodes 12a, 12b, and the transmission pixel electrodes 11a, 11b of FIG. 31 that shows the electrode fabricating method, and those have the same functions.

Effects of Exemplary Embodiment 8-1

With this method, the transmission common electrode 12b and the transmission pixel electrode 11b of the transmission area 2 are formed with ITO, so that the transmittance of the transmission area 2 is not deteriorated. In the meantime, the reflection common electrodes 28a, 28b and the reflection pixel electrodes 29a, 29b of the reflection area 1 come to have an interference effect due to the reflection common electrode 28b and the reflection pixel electrode 29b. Thus, "electrode reflectance" (referred to as "reflectance" hereinafter) which is an index of reflection on the electrode surface for the light that makes incident on the liquid crystal layer 9 becomes 9%, thereby providing an effect for reducing the reflectance. Further, the reflection common electrodes 28a and 29a also have an effect of shielding the light reflected by the reflection plate 4a. As a result, it can be seen from FIG. 21 that the contrast ratio of the reflection area 1 became about 22, and that a large improvement was achieved compared to the contrast ratio of about 13 in the case of using the Ti single layer.

Further, in the reflection plate fabricating steps, the reflection plate 4a is formed in the same step as that of the data line 20a and the transfer wiring 105a. Thus, the number (once) of each step for depositing the film, performing resist patterning, and etching can be cut compared to the case of forming the reflection plate 4a individually, so that the resist patterning in this exemplary embodiment is performed nine times as a whole. As a result, the manufacturing time and cost can be reduced.

With the combination of Ti and ITO used in this exemplary embodiment, the minimum reflectance "9%" is obtained with the thickness of 40 nm. From FIG. 21, the contrast ratio at the reflectance 9% is about 22. The best combination of the materials is not determined only based on the contrast ratio. It is necessary to take the process stability into consideration. ITO in a combination with any of Cr, Ni alloy, Mo, and Ti exhibits gentle fluctuation (within a range of ±5 nm, and reflectance variation of about 1% or less) in the reflectance with respect to the changes in the film thickness, so that it has an advantage of exhibiting a large process tolerance for the fluctuation in the film thickness. Therefore, it can be said that the combination of Ti and ITO is the best combination.

Further, with the combination of Ti and Cr oxide, the contrast ratio is about 35 when the minimum reflectance=6% (film thickness with the minimum reflectance=30 nm). This combination is the second alternative, since it can provide the highest contrast even though there is an issue regarding the process stability.

Furthermore, with the combination of Ti and Ni alloy oxide, the contrast is about 25 when the minimum reflectance=8% (film thickness with the minimum reflectance=30 nm). This combination is the second alternative, even though there is an issue regarding the process stability.

By substituting the combinations of the second and third alternatives to the combination of Ti and ITO, the method can be applied to exemplary embodiments 8-2-8-15. Other combinations mentioned herein can also be applied with the film thickness that provides the minimum reflectance.

Exemplary Embodiment 8-2

(Reflection Plate Fabrication Method 1')

Figure 34:
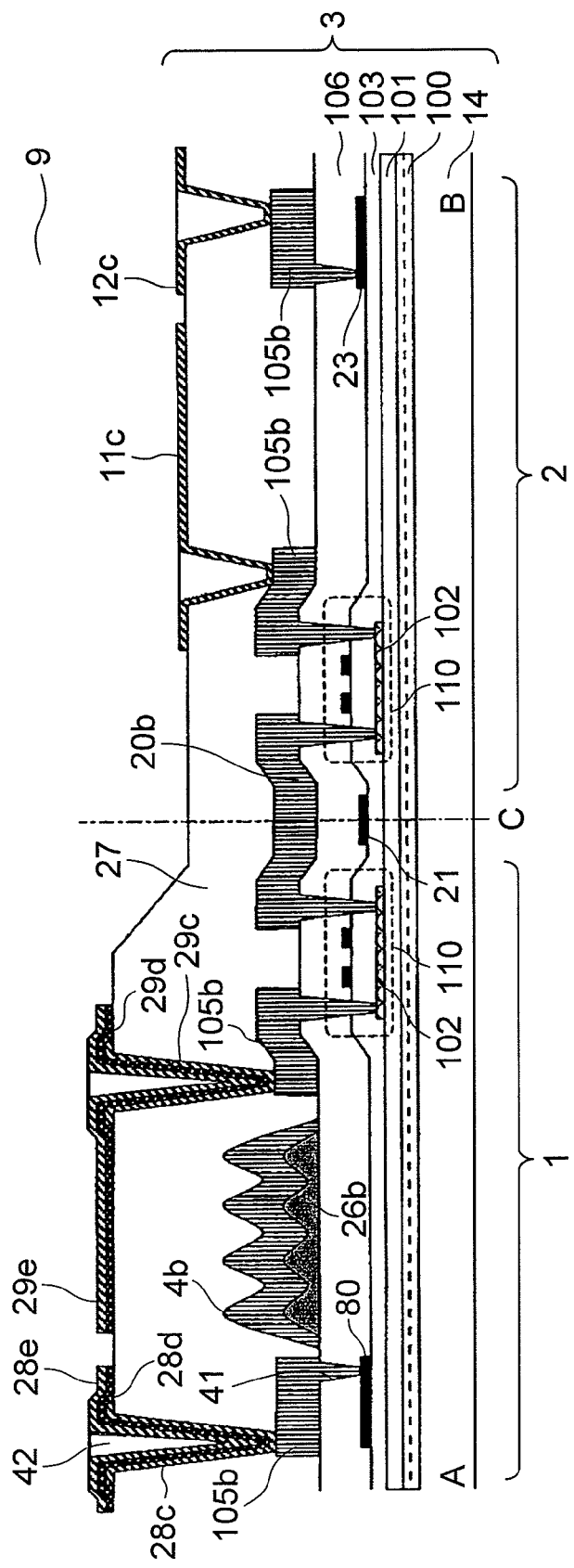
FIG. 34 is a sectional view taken along A-C-B of a unit pixel according to an exemplary embodiment 8-2.

FIG. 34 is a sectional view taken along a thick line A-C-B, when the plan view structure shown in FIG. 30 is formed in another configuration. The procedures until formation of the first contact hole 41 in this exemplary embodiment are the same as those of the exemplary embodiment 8-1, so that the procedures thereafter will be described.

After forming the first contact hole 41, Al—2 at % Ni—0.35 at % La is sputtered in a thickness of 300 nm, and resist patterning is performed. After performing dry etching, the resist is exfoliated. Through this step, a reflection plate 4b, a data line 20b, and a transfer wiring 105b are formed. A reason for using Al—2 at % Ni—0.35 at % La is to provide a fine electric conductivity for the ITO film used thereon as the wiring.

With a normal Al material, an insulating aluminum oxide is easily formed in the interface between the Al material and ITO. Thus, a stable electric conductivity cannot be obtained. In the meantime, it is desirable to use a material containing Al as the main component, in order to increase the optical reflectance of the surface of the reflection plate 4b. However, the use of the normal Al material increases the contact resistance between Al and ITO, as described above. Therefore, a material such as Ti, TiN, W, Mo, or the like is used between Al and ITO as a barrier metal.

This exemplary embodiment uses AlNiLa alloy that requires no barrier metal mentioned above, so that it is possible to prevent the increase in the contact resistance and to secure the reflection property at the same time.

By forming the reflection plate 4b (to be formed in a part corresponding to the reflection area 1) on the uneven film 26b, the surface thereof comes to have uneven shapes by conforming to the shapes on the surface of the uneven film 26b. Thus, the reflection plate 4b diffusively reflects the light that makes incident on the liquid crystal panel. Further, PMMA is applied in a thickness of 1 μm, and calcinations is performed at 250 degrees Celsius for 1 hour to form the flattening film 27. Thereafter, resist patterning for forming the second contact hole 42 is performed, and the resist is exfoliated after performing dry etching to form the second contact hole 42 on the transfer wiring 105b. The uneven film 26b and the flattening film 27 also have a function of setting the thickness of the liquid crystal layer 9 in the transmission area 2 and the reflection area 1. A step (difference) between the transmission area 2 and the reflection area 1 is in a thickness of about 1 μm, considering the phase difference of the reflection area 1. The resist patterning is performed for seven times until the second contact hole 42 is formed.

Further, the transfer wiring 105, the reflection plate 4, and the uneven film 26 (not shown) formed in the lower layer of the reflection plate 4, and the data line 20 shown in FIG. 30 correspond, respectively, to the transfer wiring 105b, the reflection plate 4b, the uneven film 26b, and the data line 20b of FIG. 34 that shows the reflection plate fabricating method, and those have the same functions.

(Electrode Fabricating Method 2)

After forming the second contact hole 42, ITO in a thickness of 40 nm is deposited on the flattening film 27 by sputtering. Thereafter, resist patterning is performed in such a manner that the ITO film is remained on a part to be the transmission common electrode 12c and the transmission pixel electrode 11c of the transmission area 2, and the opening part of the second contact hole 42 to be the reflection common electrode 28c and the reflection pixel electrode 29c. Other parts are eliminated by wet etching. A reason for keeping the ITO film in the opening part of the second contact hole 42 to be the reflection common electrode 28c and the reflection pixel electrode 29c is to protect the Al-based material used as the material for the bottom of the second contact hole 42 from a wet etching solution (aqua regia) used for eliminating the ITO film.

After exfoliating the resist, Ti is deposited in a thickness of 200 nm by sputtering. Then, ITO is deposited by sputtering in a thickness of 40 nm with which the highest effect for preventing reflection can be provided. Thereafter, resist patterning is performed in such a manner that only the areas of the reflection common electrodes 28d, 28e and the reflection pixel electrodes 29d, 29e are to be remained. Then, wet etching is performed to eliminate ITO, and dry etching is performed to eliminate Ti. Thereafter, the resist is exfoliated. With this, the steps are completed.

In this exemplary embodiment, the reflection common electrodes 28d, 28e and the reflection pixel electrodes 29d, 29e of the reflection area 1 on the flattening film 27 are in a laminated structure of ITO and Ti. In the meantime, the transmission common electrode 12c and the transmission pixel electrode 11c of the transmission area 2 are in a single-layered structure of ITO. The resist patterning is performed twice with this electrode fabricating method.

Further, the reflection common electrode 28, the reflection pixel electrode 29, the transmission common electrode 12, and the transmission pixel electrode 11 shown in FIG. 30 correspond, respectively, to the reflection common electrodes 28d, 28e, the reflection pixel electrodes 29d, 29e, the transmission common electrode 12c and the transmission pixel electrode 11c of FIG. 34 that shows the electrode fabricating method, and those have the same functions.

Effects of Exemplary Embodiment 8-2

With this method, the transmission common electrode 12c and the transmission pixel electrode 11c of the transmission area 2 are formed with ITO, so that the transmittance of the transmission area 2 is not deteriorated. In the meantime, the reflection common electrodes 28d, 28e and the reflection pixel electrodes 29d, 29e of the reflection area 1 come to have an interference effect due to the reflection common electrode 28e and the reflection pixel electrode 29e. Thus, the reflectance for the light that makes incident on the liquid crystal layer 9 becomes 9%, thereby providing an effect for reducing the reflectance. Further, the reflection common electrode 28d and the reflection pixel electrode 29d also have an effect of shielding the light reflected by the reflection plate 4b. As a result, the contrast ratio of the reflection area 1 became about 22, and a large improvement was achieved compared to the contrast ratio of about 13 in the case of using the Ti single layer.

Further, in the reflection plate fabricating steps, the reflection plate 4b is formed in the same step as that of the data line 20b and the transfer wiring 105b. Thus, the number (once) of each step for depositing the film, performing resist patterning, and etching can be cut compared to the case of forming the reflection plate 4b individually, so that the resist patterning in this exemplary embodiment is performed nine times as a whole. As a result, the manufacturing time and cost can be reduced.

Exemplary Embodiment 8-3

Figure 35:
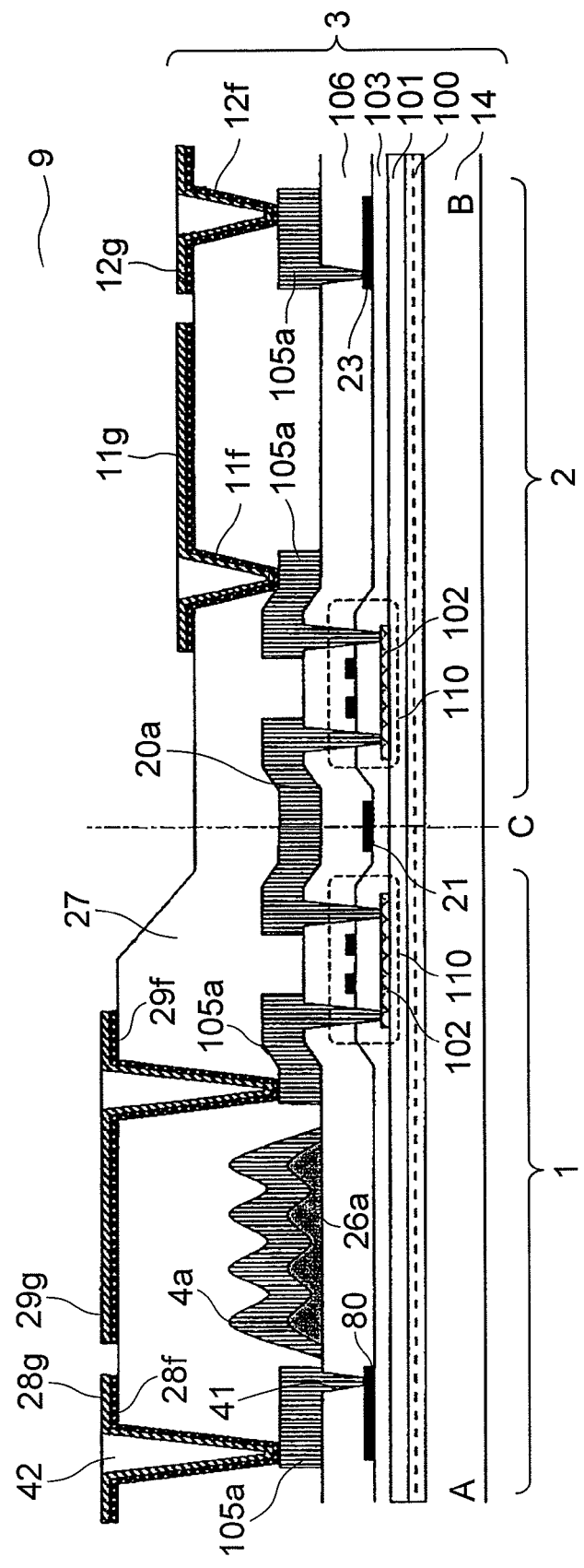
FIG. 35 is a sectional view taken along A-C-B of a unit pixel according to an exemplary embodiment 8-3.

FIG. 35 is a sectional view taken along a thick line A-C-B, when the plan view structure shown in FIG. 30 is formed in still another configuration. The procedures until formation of the second contact hole 42 in this exemplary embodiment are the same as those of the exemplary embodiment 8-1, so that the procedures thereafter will be described.
(Electrode Fabricating Method 3)

After forming the second contact hole 42, Ti in a thickness of 200 nm is deposited on the flattening film 27 by sputtering. Thereafter, ITO is deposited by sputtering in a thickness of 40 nm with which the effect of preventing the reflection becomes the highest. Then, resist patterning is performed to eliminate the area other than the parts to be the transmission common electrodes 12f, 12g, the transmission pixel electrodes 11f, 11g, and the parts to be the reflection common electrodes 28f, 28g, the reflection pixel electrodes 29f, 29g. The ITO film is eliminated first by wet etching, and the Ti film is eliminated by dry etching thereafter. By exfoliating the resist, the steps are completed.

In this exemplary embodiment, the reflection common electrodes 28f, 28g and the reflection pixel electrodes 29f, 29g of the reflection area 1, and the transmission common electrodes 12f, 12g and the transmission pixel electrodes 11f, 11g of the transmission area 2, on the flattening film 27, are all in a laminated structure with ITO on the top and Ti on the bottom. The resist patterning is performed once with this electrode fabricating method.

Further, the reflection common electrode 28, the reflection pixel electrode 29, the transmission common electrode 12, and the transmission pixel electrode 11 shown in FIG. 30 correspond, respectively, to the reflection common electrodes 28f, 28g, the reflection pixel electrodes 29f, 29g, the transmission common electrodes 12f, 12g, and the transmission pixel electrodes 11f, 11g of FIG. 35 that shows the electrode fabricating method, and those have the same functions.

Effects of Exemplary Embodiment 8-3

With this method, as in the case of the exemplary embodiment 8-1, the reflection common electrodes 28f, 28g and the reflection pixel electrodes 29f, 29g of the reflection area 1 come to have an interference effect due to the reflection common electrode 28g and the reflection pixel electrode 29g. Thus, the reflectance for the light that makes incident on the liquid crystal layer 9 becomes 9%, thereby providing an effect for reducing the reflectance. Further, the reflection common electrode 28f and the reflection pixel electrode 29f also have an effect of shielding the light reflected by the reflection plate 4a. As a result, the contrast ratio of the reflection area 1 became about 22, and a large improvement was achieved compared to the contrast ratio of about 13 in the case of using the Ti single layer.

Further, in the reflection plate fabricating steps according this exemplary embodiment, the reflection plate 4a is formed in the same step as that of the data line 20a and the transfer wiring 105a. Thus, the number (once) of each step for depositing the film, performing resist patterning, and etching can be cut compared to the case of forming the reflection plate 4a individually. Further, in the electrode fabricating steps, the reflection common electrodes 28f, 28g and the reflection pixel electrodes 29f, 29g of the reflection area 1 and the transmission pixel electrodes 11f, 11g and the transmission common electrodes 12f, 12g of the transmission area 2 are fabricated by the one-time resist patterning. Thus, compared to the exemplary embodiments 8-1 and 8-2, the number (once) of each step for resist patterning and etching can be cut. Therefore, the resist patterning in this exemplary embodiment is performed eight times as a whole. As a result, the manufacturing time and cost can be reduced further.

Exemplary Embodiment 8-4

Figure 36:
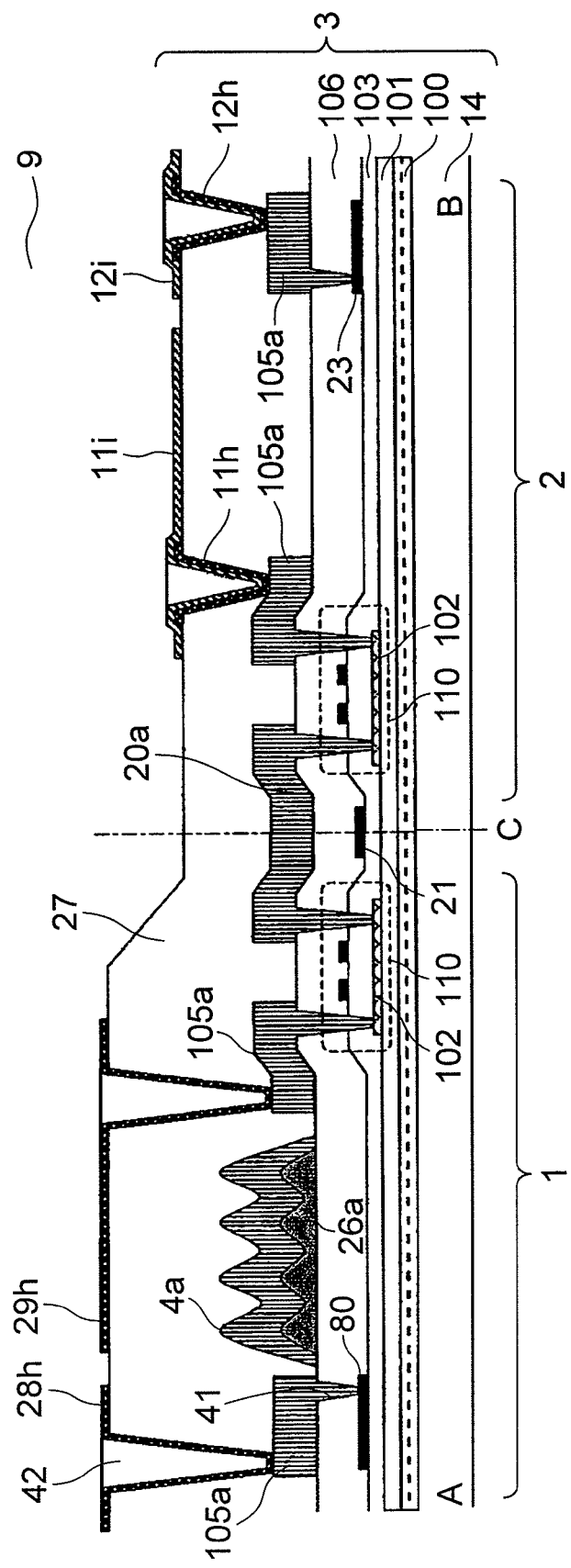
FIG. 36 is a sectional view taken along A-C-B of a unit pixel according to an exemplary embodiment 8-4.

FIG. 36 is a sectional view taken along a thick line A-C-B, when the plan view structure shown in FIG. 30 is formed in still another configuration. The procedures until formation of the second contact hole 42 in this exemplary embodiment are the same as those of the exemplary embodiment 8-1, so that the procedures thereafter will be described.
(Electrode Fabricating Method 4)

After forming the second contact hole 42, Ti in a thickness of 200 nm is deposited on the flattening film 27 by sputtering. Then, resist patterning is performed to eliminate the region other than the regions to be the parts for the reflection common electrode 28*h* and the reflection pixel electrode 29*h* of the reflection area 1 and the regions in the vicinity of the second contact hole 42 to be the parts for the transmission common electrode 12*h* and the transmission pixel electrode 11*h* of the transmission area 2. Then, dry etching is performed to eliminate the Ti film.

After exfoliating the resist, ITO in a thickness of 40 nm is deposited by sputtering. Thereafter, resist patterning is performed to eliminate the region other than the parts to be the transmission common electrode 12*i* and the transmission pixel electrode 11*i*. After eliminating the ITO film by wet etching, the resist is exfoliated. With this, the steps are completed. A reason for keeping the Ti film in the vicinity of the second contact hole 42 to be the transmission common electrode 12*h* and the transmission pixel electrode 11*h* is that, otherwise, the stable electric conductivity cannot be obtained, because an insulating aluminum oxide is easily formed between the interface of the Al material for the transfer wiring 105*a* under the second contact hole 42 and ITO.

In this exemplary embodiment, the reflection common electrode 28*h* and the reflection pixel electrode 29*h* of the reflection area 1 are in a single-layered structure of Ti. The transmission common electrode 12*i* and the transmission pixel electrode 11*i* of the transmission area 2 are in a single-layered structure of ITO. The resist patterning is performed twice with this electrode fabricating method.

Further, the reflection common electrode 28, the reflection pixel electrode 29, the transmission common electrode 12, and the transmission pixel electrode 11 shown in FIG. 30 correspond, respectively, to the reflection common electrode 28*h*, the reflection pixel electrode 29*h*, the transmission common electrode 12*i*, and the transmission pixel electrode 11*i* of FIG. 36 that shows the electrode fabricating method, and those have the same functions.

Effects of Exemplary Embodiment 8-4

With this method, the transmission common electrode 12*i* and the transmission pixel electrode 11*i* of the transmission area 2 are formed with ITO, so that the transmittance of the transmission area 2 is not deteriorated. In the meantime, the reflection common electrode 28*h* and the reflection pixel electrode 29*h* of the reflection area 1 come to have an effect of shielding the light reflected by the reflection plate 4*a*. As a result, the contrast ratio of the reflection area 1 became about 13, and a large improvement was achieved compared to the contrast ratio of about 5 in the case of using the ITO single layer.

Further, in the fabricating steps of the reflection plate 4*a*, the reflection plate 4*a* is formed in the same step as that of the data line 20*a* and the transfer wiring 105*a*. Thus, the number (once) of each step for depositing the film, performing resist patterning, and etching can be cut compared to the case of forming the reflection plate 4*a* individually, so that the resist patterning in this exemplary embodiment is performed nine times as a whole. As a result, the manufacturing time and cost can be reduced.

Exemplary Embodiment 8-5

Figure 37:
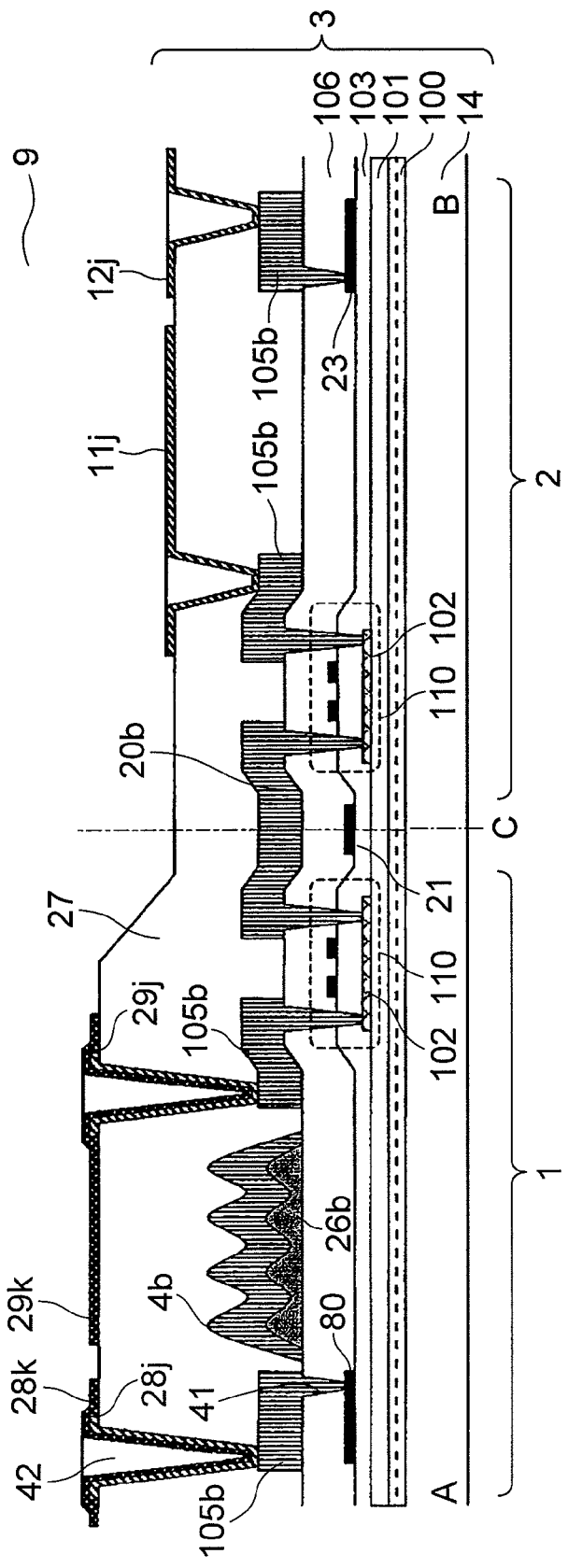
FIG. 37 is a sectional view taken along A-C-B of a unit pixel according to an exemplary embodiment 8-5.

FIG. 37 is a sectional view taken along a thick line A-C-B, when the plan view structure shown in FIG. 30 is formed in still another configuration. The procedures until formation of the second contact hole 42 in this exemplary embodiment are the same as those of the exemplary embodiment 8-2, so that the procedures thereafter will be described.

(Electrode Fabricating Method 5)

After forming the second contact hole 42, ITO in a thickness of 40 nm is deposited on the flattening film 27 by sputtering. Then, resist patterning is performed to eliminate the region other than the region to be the parts for the transmission common electrode 12*j* and the transmission pixel electrode 11*j* of the transmission area 2 and the region in the vicinity of the second contact hole 42 to be the parts for the reflection common electrode 28*j* and the reflection pixel electrode 29*j* of the reflection area 1. Then, wet etching is performed to eliminate the ITO film. After exfoliating the resist, Ti in a thickness of 200 nm is deposited by sputtering. Thereafter, resist patterning is performed to eliminate the region other than the parts to be the reflection common electrode 28*k* and the reflection pixel electrode 29*k* of the reflection area 1. After eliminating the Ti film by dry etching, the resist is exfoliated. With this, the steps are completed.

In this exemplary embodiment, the reflection common electrode 28*k* and the reflection pixel electrode 29*k* of the reflection area 1 are in a single-layered structure of Ti. The transmission common electrode 12*j* and the transmission pixel electrode 11*j* of the transmission area 2 are in a single-layered structure of ITO. The resist patterning is performed twice with this electrode fabricating method.

Further, the reflection common electrode 28, the reflection pixel electrode 29, the transmission common electrode 12, and the transmission pixel electrode 11 shown in FIG. 30 correspond, respectively, to the reflection common electrode 28*j*, the reflection pixel electrode 29*j*, the transmission common electrode 12*k*, and the transmission pixel electrode 11*k* of FIG. 37 that shows the electrode fabricating method, and those have the same functions.

Effects of Exemplary Embodiment 8-5

With this method, the transmission common electrode 12*j* and the transmission pixel electrode 11*j* of the transmission area 2 are formed with ITO, so that the transmittance of the transmission area 2 is not deteriorated. In the meantime, the reflection common electrode 28*k* and the reflection pixel electrode 29*k* of the reflection area 1 come to have an effect of shielding the light reflected by the reflection plate 4*b*. As a result, the contrast ratio of the reflection area 1 became about 13, and a large improvement was achieved compared to the contrast ratio of about 5 in the case of using the ITO single layer.

Further, in the fabricating steps of the reflection plate 4*b*, the reflection plate 4*b* is formed in the same step as that of the data line 20*b* and the transfer wiring 105*b*. Thus, the number (once) of each step for depositing the film, performing resist patterning, and etching can be cut compared to the case of forming the reflection plate 4*b* individually, so that the resist patterning in this exemplary embodiment is performed nine times as a whole. As a result, the manufacturing time and cost can be reduced.

Exemplary Embodiment 8-6

Figure 38:
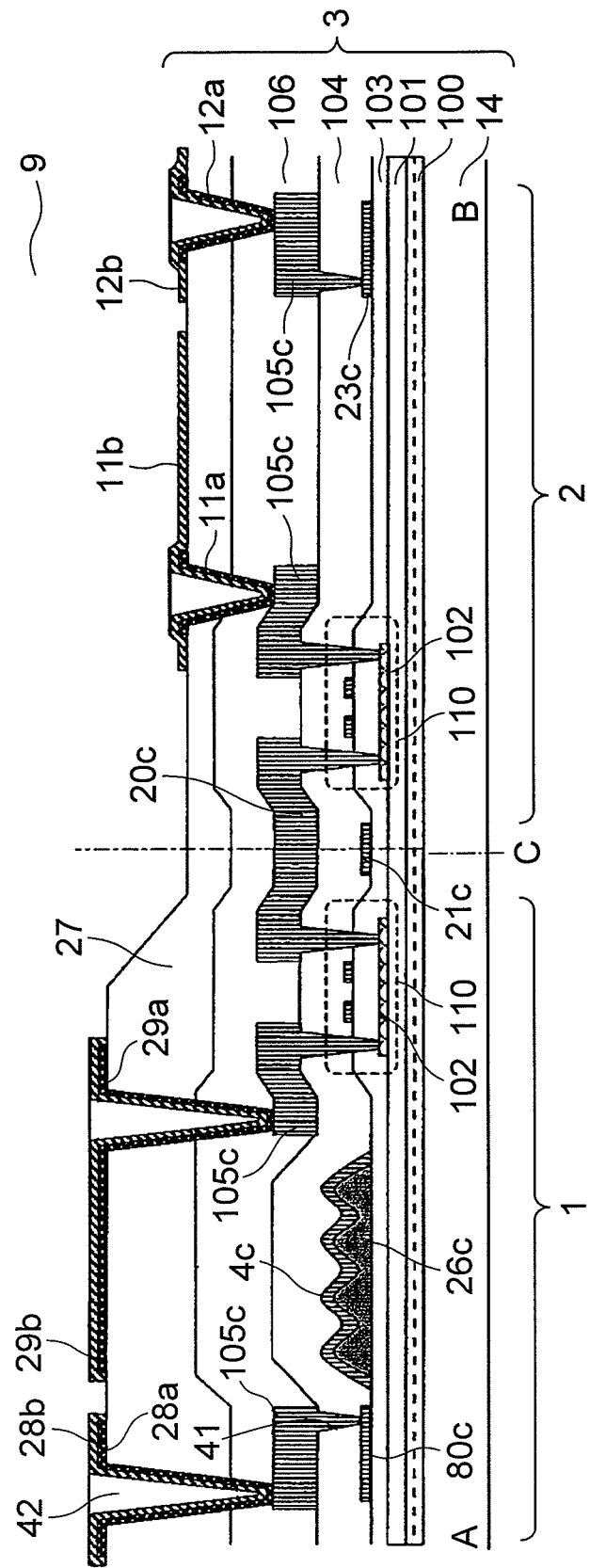
FIG. 38 is a sectional view taken along A-C-B of a unit pixel according to an exemplary embodiment 8-6.

FIG. 38 is a sectional view taken along a thick line A-C-B, when the plan view structure shown in FIG. 30 is formed in still another configuration. The procedures until formation of the first contact hole 41 in this exemplary embodiment are the same as those of the exemplary embodiment 8-1, so that the procedures thereafter will be described.

(Reflection Plate Fabricating Method 2)

After forming the gate oxide film 103, activation treatment is performed (at a temperature of 450 degrees Celsius for 60 minutes). Subsequently, after performing hydrogenation treatment at 390 degrees Celsius for 30 minutes, a novolac organic film in a thickness of 1 μm is applied to the part corresponding to the reflection area 1. Resist patterning is performed, and calcination is performed at 230 degrees Celsius for 2 hours to form an uneven film 26c having smooth uneven shapes on its surface.

Next, Al—1.5 wt % Si in a thickness of 200 nm is sputtered. Then, after performing resist patterning and dry etching, the resist is exfoliated. Through these steps, the reflection common wiring 80c, the reflection plate 4c, the gate electrode, the scanning line 21c, and the transmission common wiring 23c are formed.

The reflection plate 4c formed at the part corresponding to the reflection area 1 is formed on the uneven film 26c, so that the surface thereof comes to have uneven shapes by conforming to the surface shapes of the uneven film 26. Thus, the light that makes incident on the liquid crystal panel can be reflected diffusively. After exfoliating the resist, an interlayer silicon oxide film 104 is formed on the top.

Then, resist patterning for forming the first contact hole 41 is performed. After performing dry etching and wet etching, the resist is exfoliated. Subsequently, Al—1.5 wt % Si in a thickness of 300 nm is sputtered. Then, resist patterning and dry etching are performed. Through these steps, the transfer wiring 105c and the data line 20c are formed.

After exfoliating the resist, a nitride film 106 is deposited by plasma CVD. Further, PMMA is applied in a thickness of 1 μm, and calcination is performed at 250 degrees Celsius for 1 hour to form the flattening film 27. Thereafter, resist patterning for forming the second contact hole 42 is performed, and the resist is exfoliated after performing dry etching to form the second contact hole 42 on the transfer wiring 105. The uneven film 26c and the flattening film 27 also have a function of setting the thickness of the liquid crystal layer 9 in the transmission area 2 and the reflection area 1. A step (difference) between the transmission area 2 and the reflection area 1 is in a thickness of about 1 μm, considering the phase difference of the reflection area 1. The resist patterning is performed for seven times until the second contact hole 42 is formed.

Further, the transfer wiring 105, the data line 20, the reflection common wiring 80, the reflection plate 4, the uneven film 26 (not shown) formed in the lower layer of the reflection plate 4, the scanning line 21, and the transmission common wiring 23 shown in FIG. 30 correspond, respectively, to the transfer wiring 105c, the data line 20c, the reflection common wiring 80c, the reflection plate 4c, the uneven film 26c, the scanning line 21c, and the transmission common wiring 23c of FIG. 38 that shows the reflection plate fabricating method, and those have the same functions.

(Electrode Fabricating Method)

Subsequently, after forming the second contact hole 42, the electrodes are fabricated by using the electrode fabricating method 1 of the exemplary embodiment 8-1.

Effects of Exemplary Embodiment 8-6

With this method, the transmission common electrode 12b and the transmission pixel electrode 11b of the transmission area 2 are formed with ITO, so that the transmittance of the transmission area 2 is not deteriorated. In the meantime, the reflection common electrodes 28a, 28b and the reflection pixel electrodes 29a, 29b of the reflection area 1 come to have an interference effect due to the reflection common electrode 28b and the reflection pixel electrode 29b. Thus, the reflectance for the light that makes incident on the liquid crystal layer 9 becomes 9%, thereby providing an effect for reducing the reflectance. Further, the reflection common electrode 28a and the reflection pixel electrode 29a also have an effect of shielding the light reflected by the reflection plate 4a. As a result, the contrast ratio of the reflection area 1 became about 22, and a large improvement was achieved compared to the contrast ratio of about 13 in the case of using the Ti single layer.

Further, in the fabricating steps of the reflection plate 4c, the reflection plate 4c is formed in the same step as that of the reflection common wiring 80c, the gate, the scanning line 21c, and the transmission common wiring 23c. Thus, the number (once) of each step for depositing the film, performing resist patterning, and etching can be cut compared to the case of forming the reflection plate 4c individually, so that the resist patterning in this exemplary embodiment is performed nine times as a whole. As a result, the manufacturing time and cost can be reduced.

Exemplary Embodiment 8-7

Figure 39:
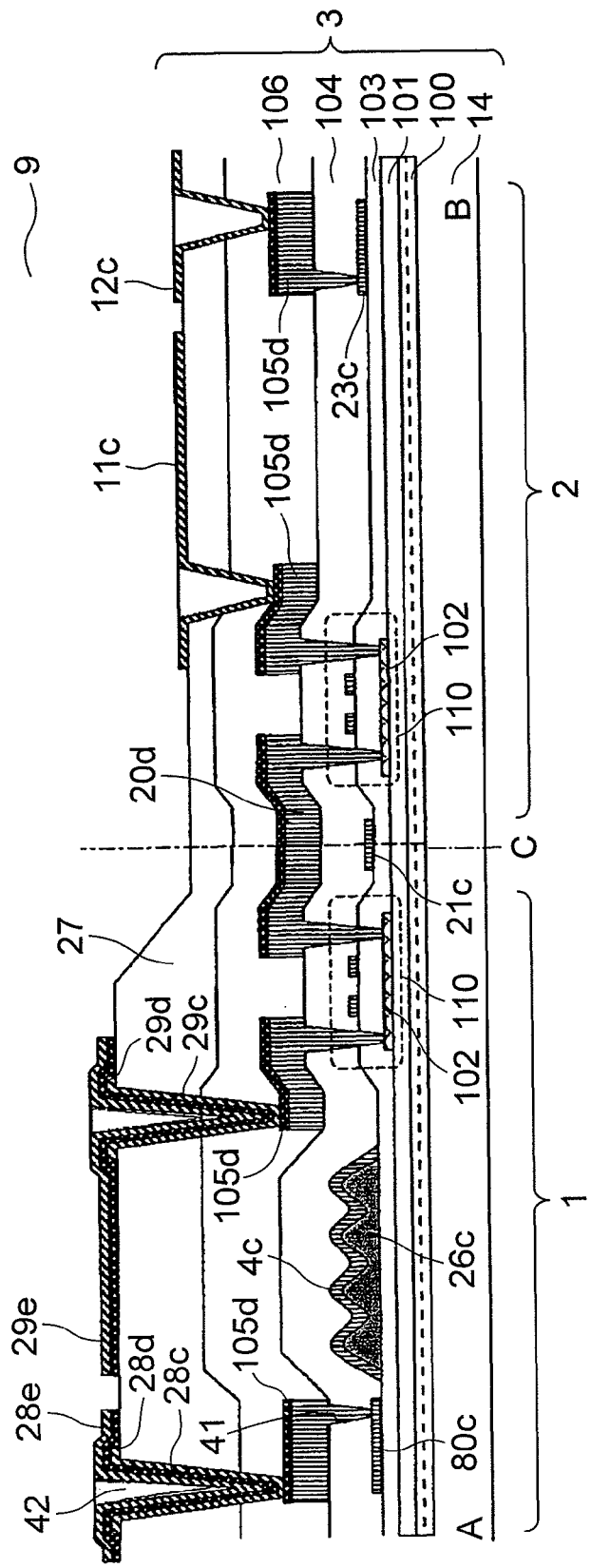
FIG. 39 is a sectional view taken along A-C-B of a unit pixel according to an exemplary embodiment 8-7.

FIG. 39 is a sectional view taken along a thick line A-C-B, when the plan view structure shown in FIG. 30 is formed in still another configuration. The procedures until formation of the gate oxide film 103 in this exemplary embodiment are the same as those of the exemplary embodiment 8-1, so that the procedures thereafter will be described.

(Reflection Plate Fabricating Method 2')

After forming the gate oxide film 103, activation treatment is performed (at a temperature of 450 degrees Celsius for 60 minutes). Subsequently, after performing hydrogenation treatment at 390 degrees Celsius for 30 minutes, a novolac organic film in a thickness of 1 μm is applied to the part corresponding to the reflection area 1. Resist patterning is performed, and calcination is performed at 230 degrees Celsius for 2 hours to form the uneven film 26c having smooth uneven shapes on its surface.

Next, Al—1.5 wt % Si in a thickness of 200 nm is sputtered. Then, after performing resist patterning and dry etching, the resist is exfoliated. Through these steps, the reflection common wiring 80c, the reflection plate 4c, the gate electrode, the scanning line 21c, and the transmission common wiring 23c are formed.

The reflection plate 4c (to be formed at the part corresponding to the reflection area 1) is formed on the uneven film 26c, so that the surface thereof comes to have uneven shapes by conforming to the surface shapes of the uneven film 26c. Thus, the light that makes incident on the liquid crystal panel can be reflected diffusively. After exfoliating the resist, the interlayer silicon oxide film 104 is formed on the top.

Then, resist patterning for forming the first contact hole 41 is performed. After performing dry etching and wet etching, the resist is exfoliated. Subsequently, Al—1.5 wt % Si in a thickness of 300 nm is sputtered and Ti in a thickness of 75 nm is sputtered to form a laminated structure. Then, resist patterning and dry etching are performed. Through these steps, a transfer wiring 105d and a data line 20d are formed.

After exfoliating the resist, the nitride film 106 is deposited by plasma CVD. Further, PMMA is applied in a thickness of 1 μm, and calcination is performed at 250 degrees Celsius for 1 hour to form the flattening film 27. Thereafter, resist patterning for forming the second contact hole 42 is performed, and the resist is exfoliated after performing dry etching to form the second contact hole 42 on the transfer wiring 105d. The uneven film 26c and the flattening film 27 also have a function of setting the thickness of the liquid crystal layer 9 in the transmission area 2 and the reflection area 1. A step (difference) between the transmission area 2 and the reflection area 1 is in a thickness of about 1 μm, considering the phase difference of the reflection area 1. The resist patterning is performed for seven times until the second contact hole 42 is formed.

Further, the transfer wiring 105, the data line 20, the reflection common wiring 80, the reflection plate 4, the uneven film 26 (not shown) formed in the lower layer of the reflection plate 4, the scanning line 21, and the transmission common wiring 23 shown in FIG. 30 correspond, respectively, to the transfer wiring 105d, the data line 20d, the reflection common wiring 80c, the reflection plate 4c, the uneven film 26c, the scanning line 21c, and the transmission common wiring 23c of FIG. 39 that shows the reflection plate fabricating method, and those have the same functions.

(Electrode Fabricating Method)

Subsequently, after forming the second contact hole 42, the electrodes are fabricated by using the electrode fabricating method 2 of the exemplary embodiment 8-2.

Effects of Exemplary Embodiment 8-7

With this method, the transmission common electrode 12c and the transmission pixel electrode 11c of the transmission area 2 are formed with ITO, so that the transmittance of the transmission area 2 is not deteriorated. In the meantime, the reflection common electrodes 28d, 28e and the reflection pixel electrodes 29d, 29e of the reflection area 1 come to have an interference effect due to the reflection common electrode 28e and the reflection pixel electrode 29e. Thus, the reflectance of the light that makes incident on the liquid crystal layer 9 becomes 9%, thereby providing an effect for reducing the reflectance. Further, the reflection common electrode 28d and the reflection pixel electrode 29d also have an effect of shielding the light reflected by the reflection plate 4c. As a result, the contrast ratio of the reflection area 1 became about 22, and a large improvement was achieved compared to the contrast ratio of about 13 in the case of using the Ti single layer.

Further, in the fabricating steps of the reflection plate 4c, the reflection plate 4c is formed in the same step as that of the reflection common wiring 80c, the gate, the scanning line 21c, and the transmission common wiring 23c. Thus, the number (once) of each step for depositing the film, performing resist patterning, and etching can be cut compared to the case of forming the reflection plate 4c individually, so that the resist patterning in this exemplary embodiment is performed nine times as a whole. As a result, the manufacturing time and cost can be reduced.

Exemplary Embodiment 8-8

Figure 40:
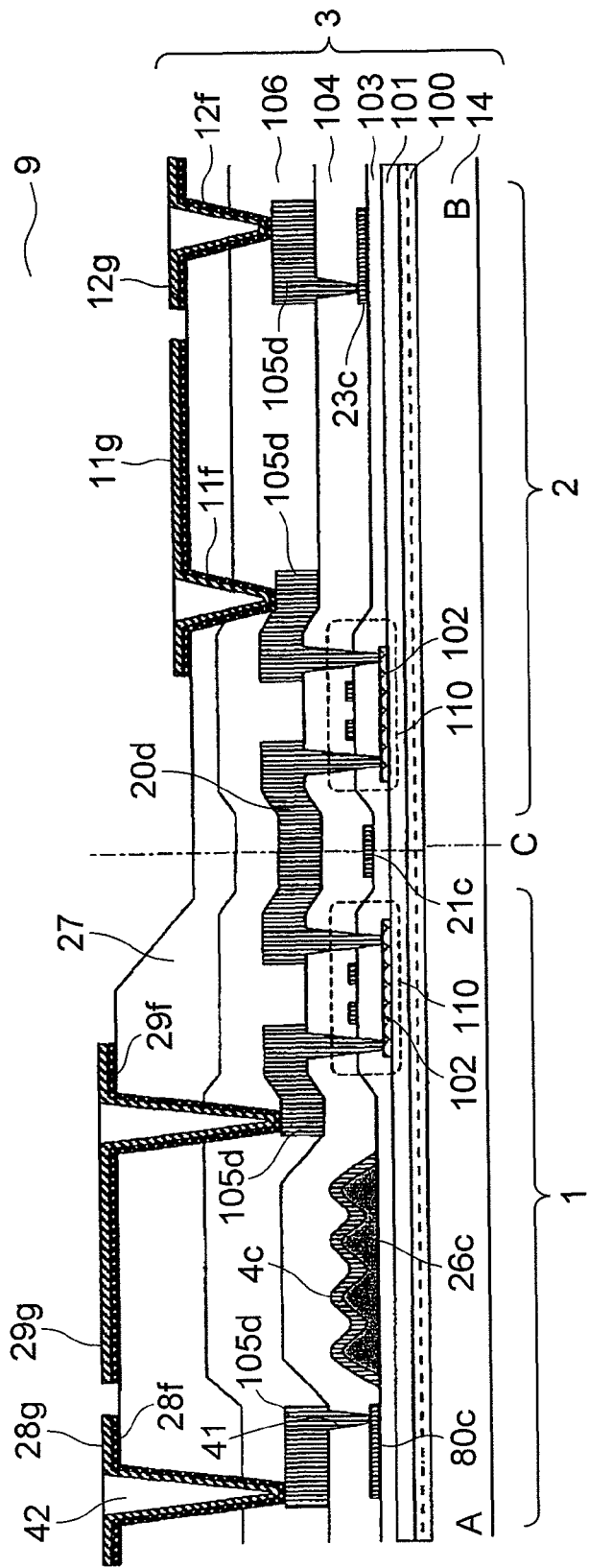
FIG. 40 is a sectional view taken along A-C-B of a unit pixel according to an exemplary embodiment 8-8.

FIG. 40 is a sectional view taken a long a thick line A-C-B, when the plan view structure shown in FIG. 30 is formed in still another configuration. This exemplary embodiment is a combination of the reflection plate fabricating method 2 of the exemplary embodiment 8-6 and the electrode fabricating method 3 of the exemplary embodiment 8-3.

Effects of Exemplary Embodiment 8-8

With this method, as in the case of the exemplary embodiment 8-1, the reflection common electrodes 28f, 28g and the reflection pixel electrodes 29f, 29g of the reflection area 1 come to have an interference effect due to the reflection common electrode 28g and the reflection pixel electrode 29g. Thus, the reflectance for the light that makes incident on the liquid crystal layer 9 becomes 9%, thereby providing an effect for reducing the reflectance. Further, the reflection common electrode 28f and the reflection pixel electrode 29f also have an effect of shielding the light reflected by the reflection plate 4c. As a result, the contrast ratio of the reflection area 1 became about 22, and a large improvement was achieved compared to the contrast ratio of about 13 in the case of using the Ti single layer.

Further, in the fabricating steps of the reflection plate 4c according this exemplary embodiment, the reflection plate 4c is formed in the same step as that of the reflection common wiring 80c, the gate, the scanning line 21c, and the transmission common wiring 23c. Thus, the number (once) of each step for depositing the film, performing resist patterning, and etching can be cut compared to the case of forming the reflection plate 4c individually. Further, in the electrode fabricating steps, the reflection common electrodes 28f, 28g and the reflection pixel electrodes 29f, 29g as well as the transmission pixel electrodes 11f, 11g and the transmission common electrodes 12f, 12g are fabricated by the one-time resist patterning. Thus, the number (once) of each step for resist patterning and etching can be cut. Therefore, the resist patterning in this exemplary embodiment is performed eight times as a whole. As a result, the manufacturing time and cost can be reduced further.

Exemplary Embodiment 8-9

Figure 41:
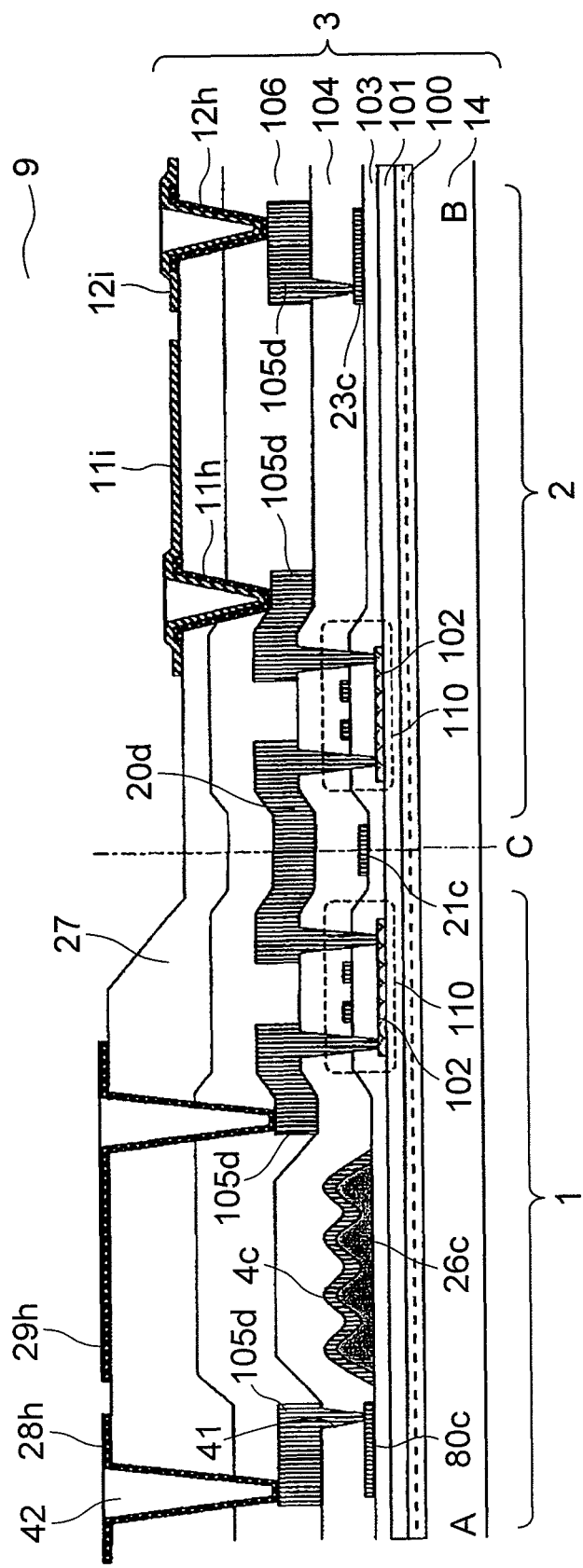
FIG. 41 is a sectional view taken along A-C-B of a unit pixel according to an exemplary embodiment 8-9.

FIG. 41 is a sectional view taken along a thick line A-C-B, when the plan view structure shown in FIG. 30 is formed in still another configuration. This exemplary embodiment is a combination of the reflection plate fabricating method 2 of the exemplary embodiment 8-6 and the electrode fabricating method 4 of the exemplary embodiment 8-4.

Effects of Exemplary Embodiment 8-9

With this method, the transmission common electrode 12i and the transmission pixel electrode 11i of the transmission area 2 are formed with ITO, so that the transmittance of the transmission area 2 is not deteriorated. In the meantime, the reflection common electrode 28h and the reflection pixel electrode 29h of the reflection area 1 come to have an effect of shielding the light reflected by the reflection plate 4c. As a result, the contrast ratio of the reflection area 1 became about 13, and a large improvement was achieved compared to the contrast ratio of about 5 in the case of using the ITO single layer.

Further, in the fabricating steps of the reflection plate 4c, the reflection plate 4c is formed in the same step as that of the reflection common wiring 80c, the gate, the scanning line 21c, and the transmission common wiring 23c. Thus, the number (once) of each step for depositing the film, performing resist patterning, and etching can be cut compared to the case of forming the reflection plate 4c individually, so that the resist patterning in this exemplary embodiment is performed nine times as a whole. As a result, the manufacturing time and cost can be reduced.

Exemplary Embodiment 8-10

Figure 42:
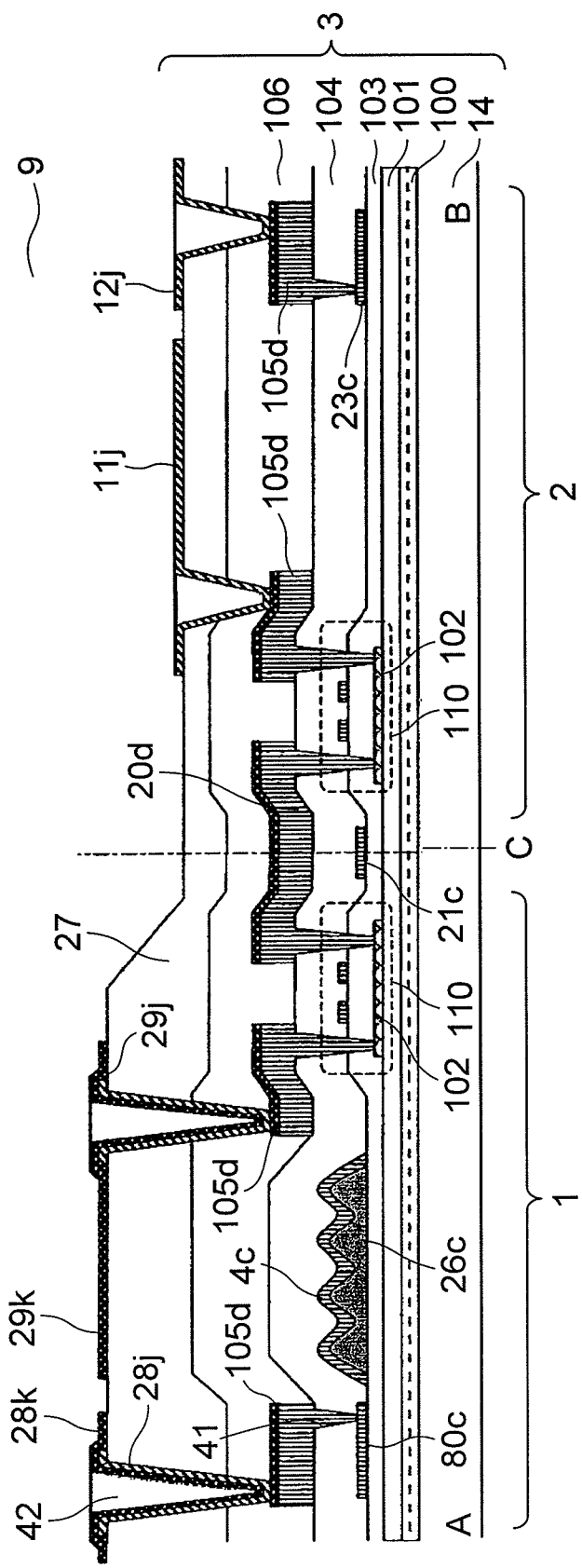
FIG. 42 is a sectional view taken along A-C-B of a unit pixel according to an exemplary embodiment 8-10.

FIG. 42 is a sectional view taken along a thick line A-C-B, when the plan view structure shown in FIG. 30 is formed in still another configuration. This exemplary embodiment is a combination of the reflection plate fabricating method 2' of the exemplary embodiment 8-7 and the electrode fabricating method 5 of the exemplary embodiment 8-5.

Effects of Exemplary Embodiment 8-10

With this method, the transmission common electrode 12*j* and the transmission pixel electrode 11*j* of the transmission area 2 are formed with ITO, so that the transmittance of the transmission area 2 is not deteriorated. In the meantime, the reflection common electrode 28*k* and the reflection pixel electrode 29*k* of the reflection area 1 come to have an effect of shielding the light reflected by the reflection plate 4*c*. As a result, the contrast ratio of the reflection area 1 became about 13, and a large improvement was achieved compared to the contrast ratio of about 5 in the case of using the ITO single layer.

Further, in the fabricating steps of the reflection plate 4*c*, the reflection plate 4*c* is formed in the same step as that of the reflection common wiring 80*c*, the gate, the scanning line 21*c*, and the transmission common wiring 23*c*. Thus, the number (once) of each step for depositing the film, performing resist patterning, and etching can be cut compared to the case of forming the reflection plate 4*c* individually, so that the resist patterning in this exemplary embodiment is performed nine times as a whole. As a result, the manufacturing time and cost can be reduced.

Exemplary Embodiment 8-11

(Reflection Plate Fabricating Method 3)

Figure 43:
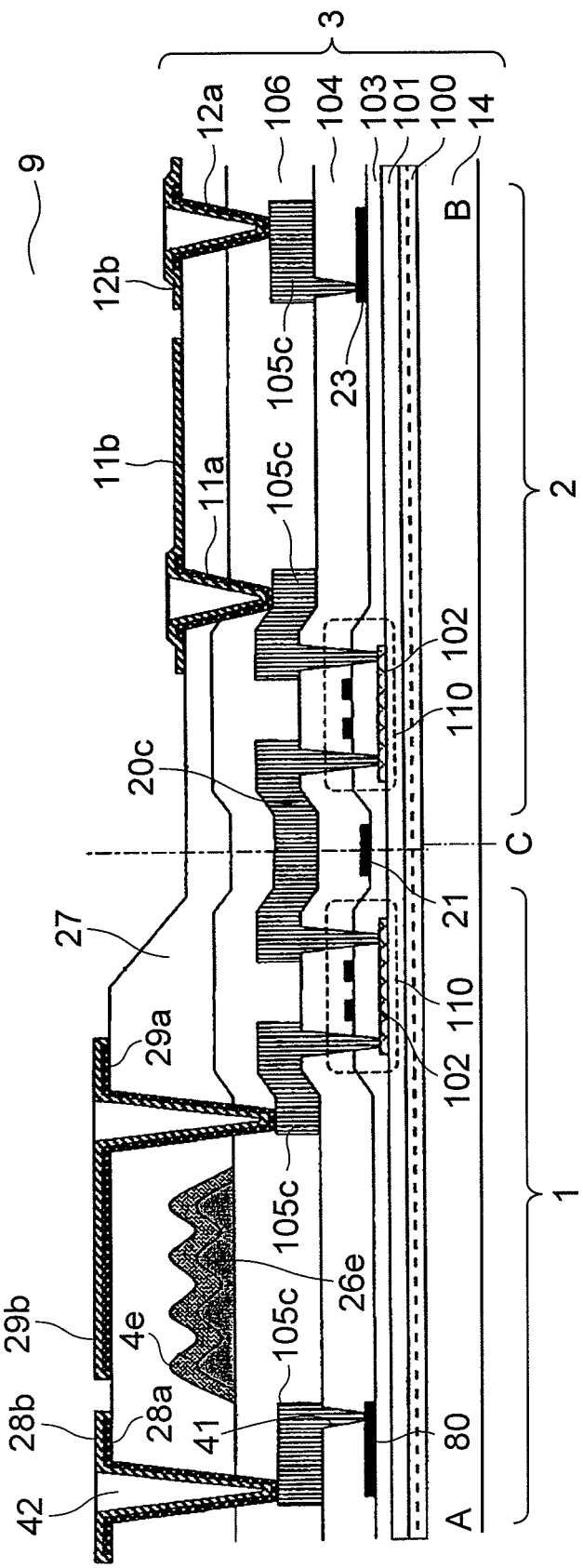
FIG. 43 is a sectional view taken along A-C-B of a unit pixel according to an exemplary embodiment 8-11.

FIG. 43 is a sectional view taken along a thick line A-C-B, when the plan view structure shown in FIG. 30 is formed in still another configuration. The procedures until formation of the gate oxide film 103 in this exemplary embodiment are the same as those of the exemplary embodiment 8-1, so that the procedures thereafter will be described.

After forming the gate oxide film 103, microcrystal silicon in a thickness of 100 nm is deposited by plasma CVD, and Cr in a thickness of 200 nm is deposited by sputtering. Thereafter, resist patterning is performed, and the gate, the scanning line 21, the reflection common wiring 80, and the transmission common wiring 23 are formed by dry etching. After exfoliating the resist, an LDD structure of the thin film transistor is formed by ion implantation (boron with a concentration of about $3 \times 10^{13}$ cm$^{-2}$). Then, an interlayer silicon oxide film 104 in a thickness of 400 nm is deposited by plasma CVD, and activation treatment is performed further (at a temperature of 450 degrees Celsius for 60 minutes). Subsequently, hydrogenation treatment is performed at a temperature of 390 degrees Celsius for 30 minutes. Then, resist patterning for forming the first contact hole 41 is performed. Thereafter, dry etching and wet etching are performed, and the resist is exfoliated thereafter.

Then, Al—1.0 at % Si in a thickness of 300 nm is sputtered. After performing resist patterning and dry etching, the resist is exfoliated. Through these steps, the data line 20*c* and the transfer wiring 105*c* are formed. Thereafter, the nitride film 106 of 400 nm is formed by plasma CVD.

Further, a novolac organic film is applied in a thickness of 1 μm to a part corresponding to the reflection area 1. Then, resist patterning is performed, and calcination is performed at 230 degrees Celsius for 2 hours to form an uneven film 26*e* having smooth uneven shapes on its surface. Then, Ti of 300 nm and Al—Nd of 100 nm in thickness are deposited by sputtering to form a laminated structure, and resist patterning is performed. Then, dry etching is performed and resist is exfoliated to form a reflection plate 4*e*. Since the reflection plate 4*e* (to be formed in a part corresponding to the reflection area 1) is formed on the uneven film 26*e*, the surface thereof comes to have uneven shapes by conforming to the shapes on the surface of the uneven film 26*e*. Thus, the reflection plate 4*e* diffusively reflects the light that makes incident on the liquid crystal panel.

Further, PMMA is applied in a thickness of 1 μm, and calcination is performed at 250 degrees Celsius for 1 hour to form the flattening film 27. Thereafter, resist patterning for forming the second contact hole 42 is performed, and the resist is exfoliated after performing dry etching to form the second contact hole 42 on the transfer wiring 105*c*. The uneven film 26*e* and the flattening film 27 also have a function of setting the thickness of the liquid crystal layer 9 in the transmission area 2 and the reflection area 1. A step (difference) between the transmission area 2 and the reflection area 1 is in a thickness of about 1 μm, considering the phase difference of the reflection area 1. The resist patterning is performed for eight times until the second contact hole 42 is formed.

Further, the transfer wiring 105, the data line 20, the reflection plate 4, and the uneven film 26 (not shown) formed in the lower layer of the reflection plate 4 shown in FIG. 30 correspond, respectively, to the transfer wiring 105*c*, the data line 20*c*, the reflection plate 4*e*, and the uneven film 26*e* of FIG. 43 that shows the reflection plate fabricating method, and those have the same functions.

(Electrode Fabricating Method)

Subsequently, after forming the second contact hole 42, the electrodes are fabricated by using the electrode fabricating method 1 of the exemplary embodiment 8-1.

Effects of Exemplary Embodiment 8-11

With this method, the transmission common electrode 12*b* and the transmission pixel electrode 11*b* of the transmission area 2 are formed with ITO, so that the transmittance of the transmission area 2 is not deteriorated. In the meantime, the reflection common electrodes 28*a*, 28*b* and the reflection pixel electrodes 29*a*, 29*b* of the reflection area 1 come to have an interference effect due to the reflection common electrode 28*b* and the reflection pixel electrode 29*b*. Thus, the reflectance for the light that makes incident on the liquid crystal layer 9 becomes 9%, thereby providing an effect for reducing the reflectance. Further, the reflection common electrode 28*a* and the reflection pixel electrode 29*a* also have an effect of shielding the light reflected by the reflection plate 4*e*. As a result, the contrast ratio of the reflection area 1 became about 22, and a large improvement was achieved compared to the contrast ratio of about 13 in the case of using the Ti single layer.

Exemplary Embodiment 8-12

(Reflection Plate Fabricating Method 3')

Figure 44:
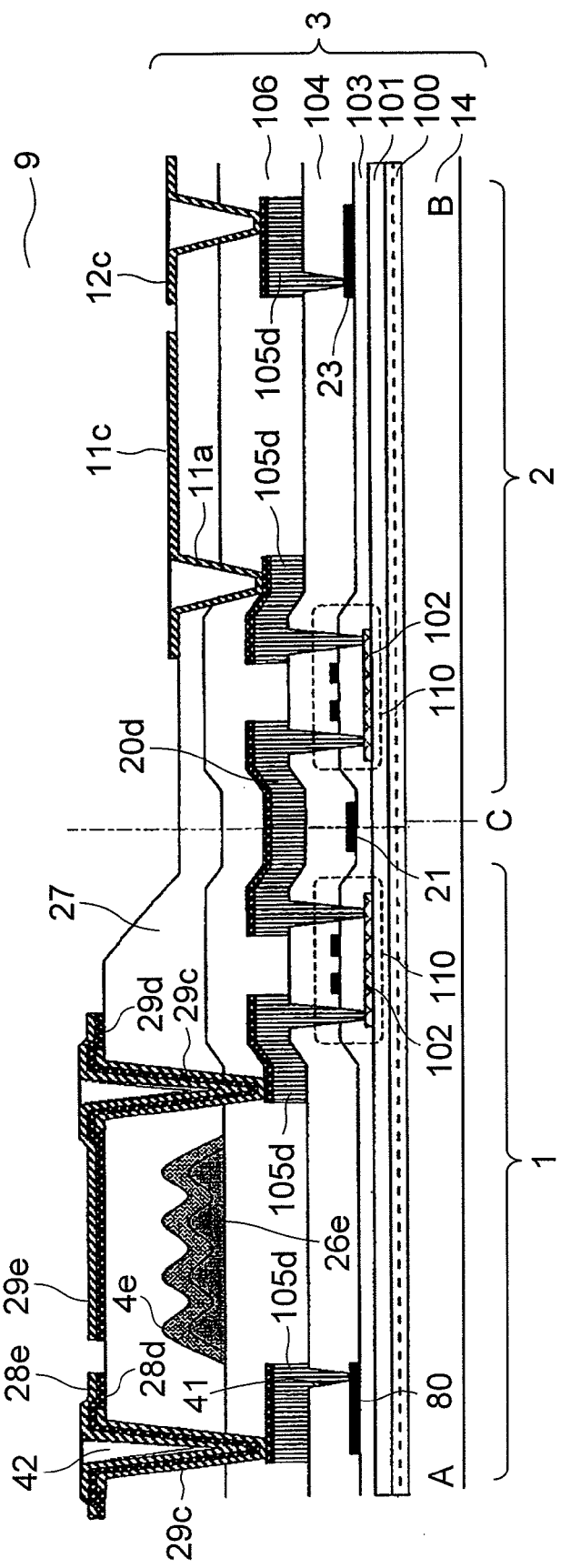
FIG. 44 is a sectional view taken along A-C-B of a unit pixel according to an exemplary embodiment 8-12.

FIG. 44 is a sectional view taken a long a thick line A-C-B, when the plan view structure shown in FIG. 30 is formed in still another configuration. The procedures until formation of the gate oxide film 103 in this exemplary embodiment are the same as those of the exemplary embodiment 8-1, so that the procedures thereafter will be described.

After forming the gate oxide film 103, microcrystal silicon in a thickness of 100 nm is deposited by plasma CVD, and Cr in a thickness of 200 nm is deposited by sputtering. Thereafter, resist patterning is performed, and the gate, the scanning line 21, the reflection common wiring 80, and the transmission common wiring 23 are formed by dry etching. After exfoliating the resist, an LDD structure of the thin film transistor is formed by ion implantation (boron with a concentration of about $3\times10^{13}$ cm$^{-2}$). Then, an interlayer silicon oxide film 104 in a thickness of 400 nm is deposited by plasma CVD, and activation treatment is performed (at a temperature of 450 degrees Celsius for 60 minutes). Subsequently, hydrogenation treatment is performed at a temperature of 390 degrees Celsius for 30 minutes. Then, resist patterning for forming the first contact hole 41 is performed. Thereafter, dry etching and wet etching are performed, and the resist is exfoliated thereafter.

Then, Al—1.0 at % Si of 300 nm and Ti of 75 nm in thickness are sputtered to form a laminated structure. After performing resist patterning and dry etching, the resist is exfoliated. Through these steps, a data line 20d and a transfer wiring 105d are formed. Thereafter, the nitride film 106 of 400 nm is formed by plasma CVD.

Further, a novolac organic film is applied in a thickness of 1 µm to a part corresponding to the reflection area 1. Then, resist patterning is performed, and calcination is performed at 230 degrees Celsius for 2 hours to form the uneven film 26e having smooth uneven shapes on its surface. Then, Ti of 300 nm and Al—Nd of 100 nm in thickness are deposited to form a laminated structure, and resist patterning is performed. Then, dry etching is performed and resist is exfoliated to form the reflection plate 4e. Since the reflection plate 4e (to be formed in a part corresponding to the reflection area 1) is formed on the uneven film 26e, the surface thereof comes to have uneven shapes by conforming to the shapes on the surface of the uneven film 26e. Thus, the reflection plate 4e diffusively reflects the light that makes incident on the liquid crystal panel.

Further, PMMA is applied in a thickness of 1 µm, and calcination is performed at 250 degrees Celsius for 1 hour to form the flattening film 27. Thereafter, resist patterning for forming the second contact hole 42 is performed, and the resist is exfoliated after performing dry etching to form the second contact hole 42 on the transfer wiring 105d. The uneven film 26e and the flattening film 27 also have a function of setting the thickness of the liquid crystal layer 9 in the transmission area 2 and the reflection area 1. A step (difference) between the transmission area 2 and the reflection area 1 is in a thickness of about 1 µm, considering the phase difference of the reflection area 1. The resist patterning is performed for eight times until the second contact hole 42 is formed.

Further, the transfer wiring 105, the data line 20, the reflection plate 4, and the uneven film 26 (not shown) formed in the lower layer of the reflection plate 4 shown in FIG. 30 correspond, respectively, to the transfer wiring 105d, the data line 20d, the reflection plate 4e, and the uneven film 26e of FIG. 44 that shows the reflection plate fabricating method, and those have the same functions.

(Electrode Fabricating Method)

Subsequently, after forming the second contact hole 42, the electrodes are fabricated by using the electrode fabricating method 2 of the exemplary embodiment 8-2.

Effects of Exemplary Embodiment 8-12

With this method, the transmission common electrode 12c and the transmission pixel electrode 11c of the transmission area 2 are formed with ITO, so that the transmittance of the transmission area 2 is not deteriorated. In the meantime, the reflection common electrodes 28d, 28e and the reflection pixel electrodes 29d, 29e of the reflection area 1 come to have an interference effect due to the reflection common electrode 28e and the reflection pixel electrode 29e. Thus, the reflectance for the light that makes incident on the liquid crystal layer 9 becomes 9%, thereby providing an effect for reducing the reflectance. Further, the reflection common electrodes 28d and the reflection pixel electrode 29d also have an effect of shielding the light reflected by the reflection plate 4e. As a result, the contrast ratio of the reflection area became about 22, and a large improvement was achieved compared to the contrast ratio of about 13 in the case of using the Ti single layer.

Exemplary Embodiment 8-13

Figure 45:
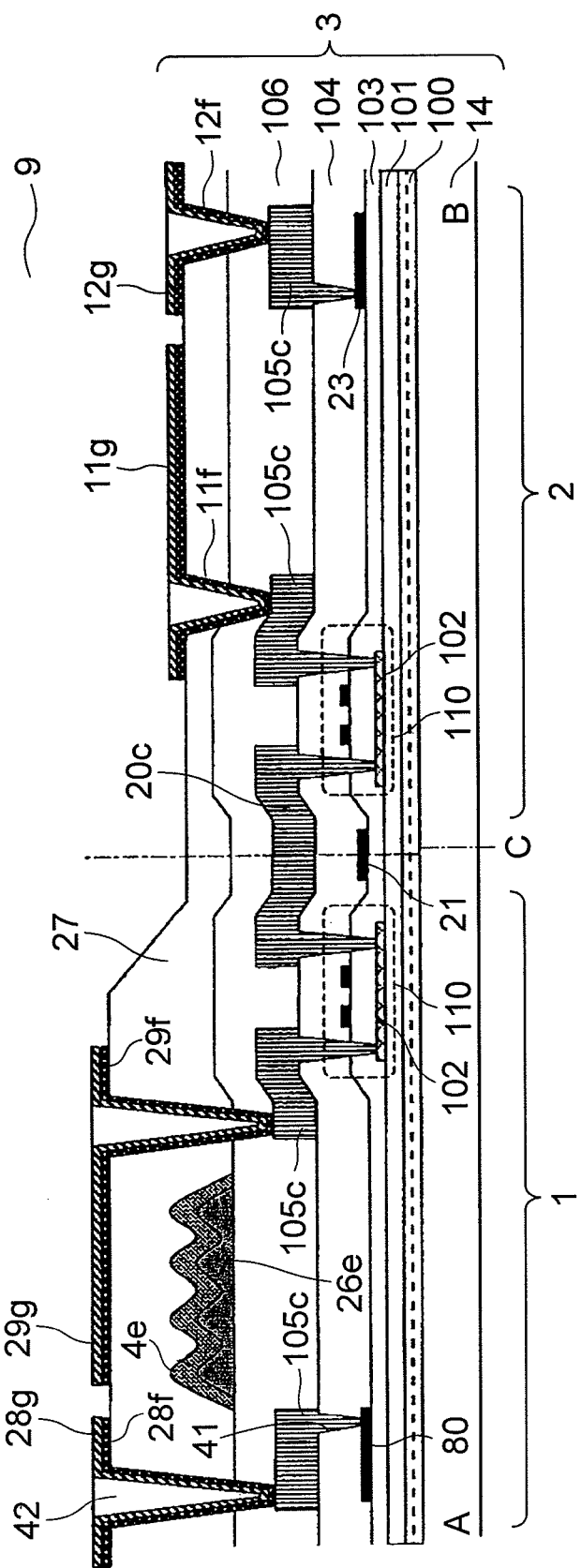
FIG. 45 is a sectional view taken along A-C-B of a unit pixel according to an exemplary embodiment 8-13.

FIG. 45 is a sectional view taken along a thick line A-C-B, when the plan view structure shown in FIG. 30 is formed in still another configuration. This exemplary embodiment is a combination of the reflection plate fabricating method 3 of the exemplary embodiment 8-11 and the electrode fabricating method 3 of the exemplary embodiment 8-3.

Effects of Exemplary Embodiment 8-13

With this method, as in the case of the exemplary embodiment 8-1, the reflection common electrodes 28f, 28g and the reflection pixel electrodes 29f, 29g of the reflection area 1 come to have an interference effect due to the reflection common electrode 28g and the reflection pixel electrode 29g. Thus, the reflectance for the light that makes incident on the liquid crystal layer 9 becomes 9%, thereby providing an effect for reducing the reflectance. Further, the reflection common electrode 28f and the reflection pixel electrode 29f also have an effect of shielding the light reflected by the reflection plate 4e. As a result, the contrast ratio of the reflection area 1 became about 22, and that a large improvement was achieved compared to the contrast ratio of about 13 in the case of using the Ti single layer.

Further, in the reflection fabricating steps and the electrode fabricating steps, the reflection common electrodes 28f, 28g and the reflection pixel electrodes 29f, 29g of the reflection area 1 as well as the transmission pixel electrodes 11f, 11g and the transmission common electrodes 12f, 12g of the transmission area 2 are fabricated by the one-time resist patterning. Thus, the number (once) of each step for resist patterning and etching can be cut. Therefore, the resist patterning in this exemplary embodiment is performed nine times as a whole. As a result, the manufacturing time and cost can be reduced.

Exemplary Embodiment 8-14

Figure 46:
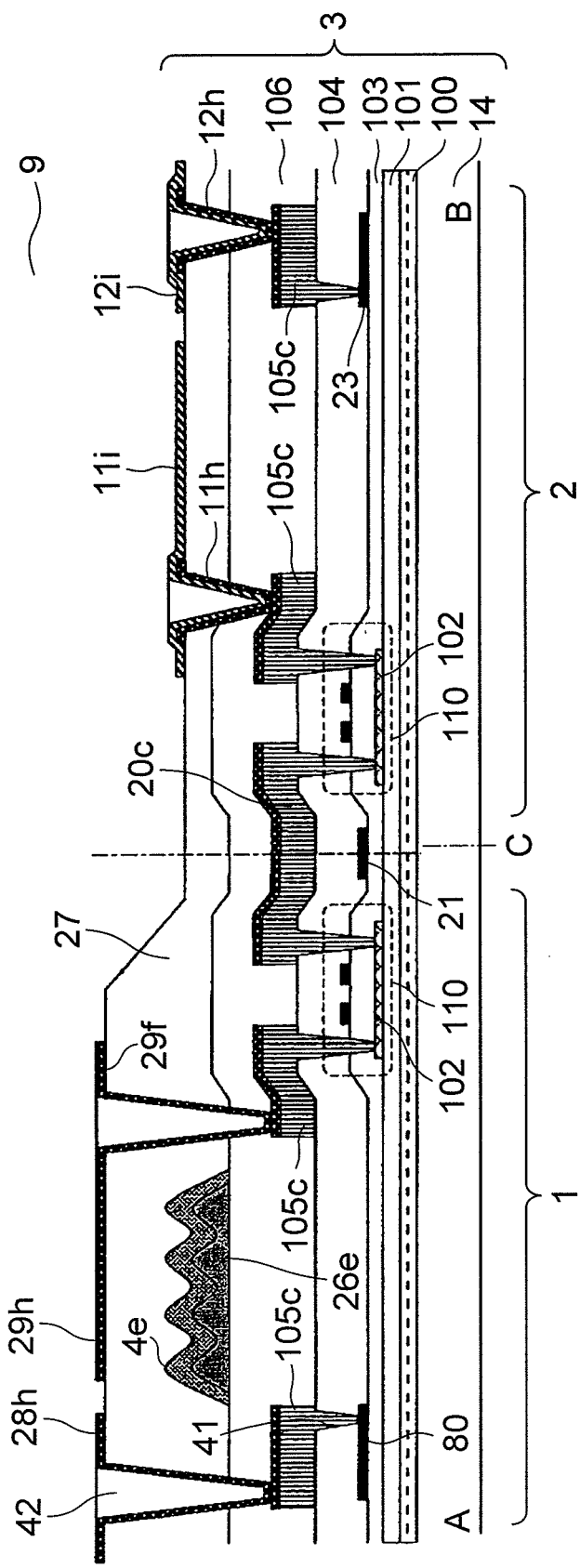
FIG. 46 is a sectional view taken along A-C-B of a unit pixel according to an exemplary embodiment 8-14.

FIG. 46 is a sectional view taken along a thick line A-C-B, when the plan view structure shown in FIG. 30 is formed in still another configuration. This exemplary embodiment is a combination of the reflection plate fabricating method 3 of the exemplary embodiment 8-11 and the electrode fabricating method 4 of the exemplary embodiment 8-4.

Effects of Exemplary Embodiment 8-14

With this method, the transmission common electrode 12i and the transmission pixel electrode 11i of the transmission area 2 are formed with ITO, so that the transmittance of the transmission area 2 is not deteriorated. In the meantime, the reflection common electrode 28h and the reflection pixel electrode 29h of the reflection area 1 come to have an effect of shielding the light reflected by the reflection plate 4c. As a result, the contrast ratio of the reflection area 1 became about 13, and a large improvement was achieved compared to the contrast ratio of about 5 in the case of using the ITO single layer.

Exemplary Embodiment 8-15

Figure 47:
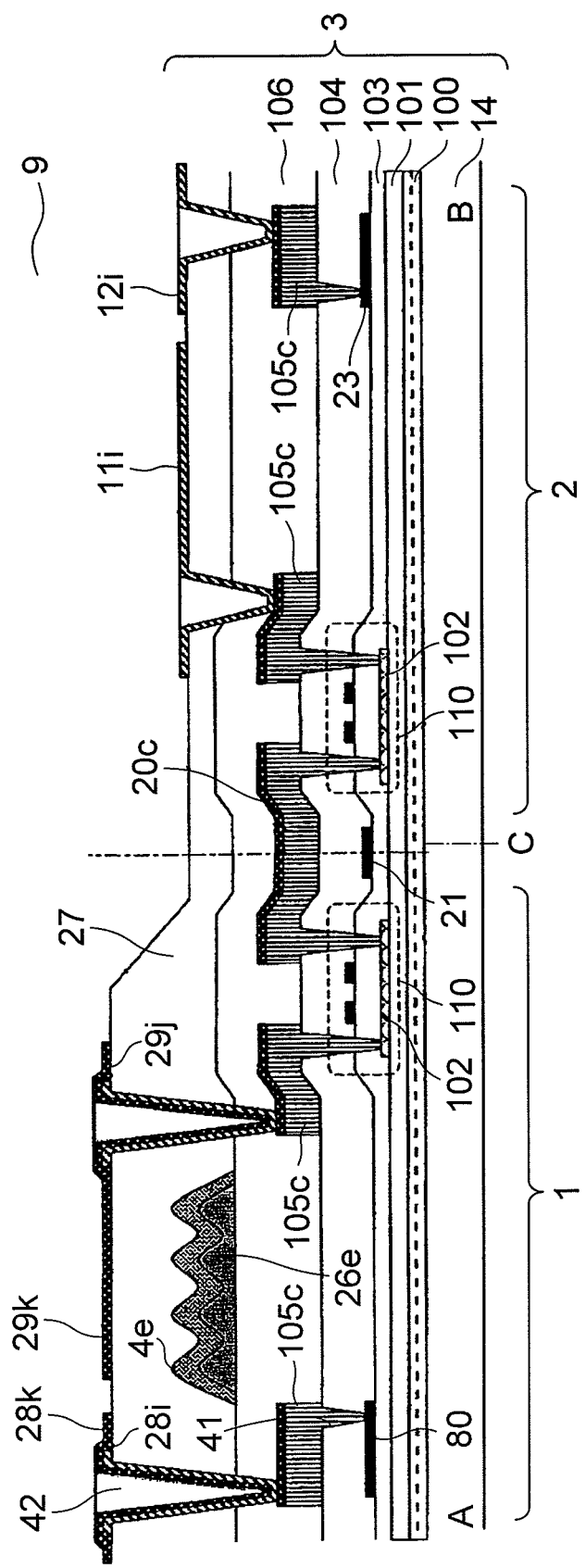
FIG. 47 is a sectional view taken along A-C-B of a unit pixel according to an exemplary embodiment 8-15.

FIG. 47 is a sectional view taken along a thick line A-C-B, when the plan view structure shown in FIG. 30 is formed in still another configuration. This exemplary embodiment is a combination of the reflection plate fabricating method 3' of the exemplary embodiment 8-12 and the electrode fabricating method 5 of the exemplary embodiment 8-5.

Effects of Exemplary Embodiment 8-15

With this method, the transmission common electrode 12j and the transmission pixel electrode 11j of the transmission area 2 are formed with ITO, so that the transmittance of the transmission area 2 is not deteriorated. In the meantime, the reflection common electrode 28k and the reflection pixel electrode 29k of the reflection area 1 come to have an effect of shielding the light reflected by the reflection plate 4e. As a result, the contrast ratio of the reflection area 1 became about 13, and a large improvement was achieved compared to the contrast ratio of about 5 in the case of using the ITO single layer.

The liquid crystal display devices according to each of the above-described exemplary embodiments may be mounted into electronic apparatuses. Examples of such electronic apparatuses may be portable telephones, personal information terminals, game machines, digital cameras, video cameras, video players, notebook personal computers, cash dispensers, vending machines, and the like.

It is to be understood that the exemplary embodiments described above merely illustrate concrete examples of the present invention, and that various changes and modifications are possible without departing from the scope of the appended claims of the present invention. Further, the present invention includes combinations of a part of or the whole part of the structures described in each of the exemplary embodiments.

What is claimed is:

1. A liquid crystal display device, comprising a reflection area within a pixel unit by corresponding to at least to a reflection plate forming part, wherein:
   the reflection area is driven with a lateral electric field mode and normally-white; and
   a driving electrode for forming an electric field to a liquid crystal layer of the reflection area is formed on the reflection plate via an insulating film by using a non-transparent electric conductor,
   an antireflection layer is on a top face of the driving electrode, wherein the antireflection layer is formed with an oxide of an element selected from Cr, Ni, Mo, Zn, and Ti, or with an oxide of an alloy containing an element selected therefrom, and with ITO, and
   the antireflection layer has refractive index n in a range of "n=1.5-3.0" and extinction coefficient k in a range of "k=0-3.5" at a wavelength of 550 nm;
   said liquid crystal display device further comprising, within a unit pixel, a transmission area, wherein the transmission area is driven with a lateral electric field mode, and
   a reflection common electrode of the reflection area and an ITO-covered transmission common electrode of the transmission area, wherein each of the reflection common electrode and the ITO-covered transmission common electrode is connected to a different signal source from each other.

2. The liquid crystal display device as claimed in claim 1, wherein the non-transparent electric conductor is formed with an element selected from Cr, Ni, Mo, and Ti, or with an alloy containing an element selected therefrom.

3. The liquid crystal display device as claimed in claim 1, wherein the insulating film directly under the driving electrode is flat.

4. The liquid crystal display device as claimed in claim 1, wherein a driving electrode for forming an electric field in a liquid crystal layer of the transmission area is formed with a same material and in a same layer structure as the material and the structure of the driving electrode of the reflection area.

5. The liquid crystal display device as claimed in claim 1, wherein the non-transparent electric conductor has refractive index n in a range of "n=1.0-4.0" and extinction coefficient k in a range of "k=0.25-5.5" at a wavelength of 550 nm.

6. The liquid crystal display device as claimed in claim 5, wherein, the non-transparent electric conductor has the refractive index n in a range of "n=1.3-2.5" and the extinction coefficient k in a range of "k=1.6-3.3" at a wavelength of 550 nm.

7. The liquid crystal display device as claimed in claim 1, wherein, the antireflection layer has the refractive index n in a range of "n=2.0-3.0" and the extinction coefficient k in a range of "k=0.01-2.0" at a wavelength of 550 nm.

8. The liquid crystal display device as claimed in claim 1, comprising, by corresponding to the reflection area, a phase difference layer for providing ½ wavelength phase difference to transmission light from a polarizing plate provided to a counter substrate, wherein
   angle θ1 between a polarizing direction of light that makes incident on the phase difference layer from the polarizing plate and an optical axis of the phase difference layer falls within a range of "0 degree<1<22.5 degrees".

9. The liquid crystal display device as claimed in claim 1, comprising, between a liquid crystal layer and a polarizing plate that is provided, respectively, to the counter substrate and a lower substrate, a phase difference layer for providing ½ wavelength phase difference to transmission light from the polarizing plate, wherein
   angle 2 between an optical axis direction of the liquid crystal layer in the transmission area under dark state and a polarizing direction of light that makes incident on the liquid crystal layer falls within a range of "0 degree<2<45 degrees".

10. The liquid crystal display device as claimed in claim 1, the reflection plate is formed with a same layer of as that of the scanning line or the data line; and
   an antireflection layer is provided on a top face of the driving electrode.

11. The liquid crystal display device as claimed in claim 1, wherein film thickness of the antireflection layer is 30-60 nm.

12. A manufacturing method of a liquid crystal display device having a reflection area within a pixel unit by corresponding at least to a reflection plate forming part, the reflection area being driven with a lateral electric field mode and normally-white, the method comprising:
   forming an interlayer insulating film on a substrate;
   forming an organic film having unevenness in the reflection area on the interlayer insulating film;
   forming the reflection plate on the organic film having the unevenness;

forming a driving electrode that forms an electric field to a liquid crystal layer of the reflection area on the reflection plate via an insulating film by using a non-transparent electric conductor;

forming an antireflection layer on a top face of the driving electrode;

forming the antireflection layer with an oxide of an element selected from Cr, Ni, Mo, Zn, and Ti, or with an oxide of an alloy containing an element selected therefrom, and with ITO;

setting, at a wavelength of 550 nm, refractive index n of the antireflection layer in a range of "n=1.5-3.0", and extinction coefficient k of the antireflection layer in a range of "k=0-3.5", forming a transmission area, within a unit pixel, wherein the transmission area is driven with a lateral electric field mode, and forming a reflection common electrode in the reflection area and forming an ITO-covered transmission common electrode in the transmission area, wherein each of the reflection common electrode and the ITO-covered transmission common electrode is connected to a different signal source from each other.

13. The manufacturing method of the liquid crystal display device as claimed in claim 12, wherein:

the reflection plate is formed with a same layer as that of a scanning line or a data line which sections a unit pixel into areas; and an antireflection layer is provided on a top face of the driving electrode.

14. The manufacturing method of the liquid crystal display device as claimed in claim 12, further comprising setting film thickness of the antireflection layer in a range of 30-60 nm.

15. A terminal device having a liquid crystal display device in a display unit, comprising, in a unit pixel that forms a liquid crystal panel of the liquid crystal display device, a reflection area corresponding at least to a reflection plate forming part, wherein:

the reflection area is driven with a lateral electric field mode and normally-white, a driving electrode that forms an electric field to a liquid crystal layer of the reflection area is formed on the reflection plate via an insulating film by using a non-transparent electric conductor, the driving electrode has an antireflection layer on a top face thereof, the antireflection layer is formed with an oxide of an element selected from Cr, Ni, Mo, Zn, and Ti, or with an oxide of an alloy containing an element selected therefrom, and with ITO⁻, the antireflection layer has refractive index n in a range of "n=1.5-3.0" and extinction coefficient k in a range of "k=0-3.5" at a wavelength of 550 nm, the liquid crystal display device further comprising, within a unit pixel, a transmission area, wherein the transmission area is driven with a lateral electric field mode, and a reflection common electrode of the reflection area an ITO-covered transmission common electrode of the transmission area, wherein each of the reflection common electrode and the ITO-covered transmission common electrode is connected to a different signal source from each other.

* * * * *